US010112345B2

(12) United States Patent
El-Siblani et al.

(10) Patent No.: US 10,112,345 B2
(45) Date of Patent: Oct. 30, 2018

(54) APPARATUS AND METHOD FOR FORMING THREE-DIMENSIONAL OBJECTS USING LINEAR SOLIDIFICATION WITH TRAVEL AXIS CORRECTION AND POWER CONTROL

(71) Applicant: Global Filtration Systems, Dearborn Heights, MI (US)

(72) Inventors: Ali El-Siblani, Dearborn Heights, MI (US); Alexandr Shkolnik, Los Angeles, CA (US); Chi Zhou, Riverside, CA (US)

(73) Assignee: Global Filtration Systems, Dearborn Heights, MI (US)

( * ) Notice: Subject to any disclaimer, the term of this patent is extended or adjusted under 35 U.S.C. 154(b) by 998 days.

(21) Appl. No.: 14/243,967

(22) Filed: Apr. 3, 2014

(65) Prior Publication Data

US 2014/0306380 A1    Oct. 16, 2014

Related U.S. Application Data

(60) Provisional application No. 61/846,345, filed on Jul. 15, 2013, provisional application No. 61/808,278, filed on Apr. 4, 2013.

(51) Int. Cl.
*B29C 64/135* (2017.01)
*B29C 67/00* (2017.01)
(Continued)

(52) U.S. Cl.
CPC ........ *B29C 67/0088* (2013.01); *B29C 64/135* (2017.08); *B29C 64/386* (2017.08); *B33Y 10/00* (2014.12); *B33Y 50/02* (2014.12)

(58) Field of Classification Search
CPC ............................. B29C 64/386; B29C 64/135
See application file for complete search history.

(56) References Cited

U.S. PATENT DOCUMENTS

| 4,849,910 A | 7/1989 | Jacobs et al. |
| 5,049,901 A | 9/1991 | Gelbart |
(Continued)

FOREIGN PATENT DOCUMENTS

| DE | 19929199 A1 | 1/2001 |
| DE | 10256672 A1 | 6/2004 |
(Continued)

OTHER PUBLICATIONS

Extended European Search Report for European Patent Application No. 14778382.3 dated Nov. 7, 2016.
(Continued)

*Primary Examiner* — Christopher T Schatz
(74) *Attorney, Agent, or Firm* — Hansen IP Law PLLC

(57) ABSTRACT

An apparatus and method for making a three-dimensional object from a solidifiable material using a linear solidification device is shown and described. The apparatus and method compensate for a non-orthogonal angle between the travel axis and scanning axis of a linear scanning device and also provide a substantially constant solidification depth along the scanning axis. In certain examples, a solidification energy control system is also provided to regulate the solidification power supplied to the solidifiable material by modulating the power supplied to the linear solidification device's solidification energy source, examples of which include laser diodes.

18 Claims, 42 Drawing Sheets

(51) Int. Cl.
    *B33Y 10/00*     (2015.01)
    *B33Y 50/02*     (2015.01)
    *B29C 64/386*     (2017.01)

(56) References Cited

U.S. PATENT DOCUMENTS

| | | |
|---|---|---|
| 5,104,592 A | 4/1992 | Hull et al. |
| 5,447,822 A | 9/1995 | Hull et al. |
| 5,521,748 A | 5/1996 | Sarraf |
| 5,631,763 A | 5/1997 | Park |
| 5,753,171 A | 5/1998 | Serbin et al. |
| 5,780,070 A | 7/1998 | Yamazawa et al. |
| 5,876,550 A | 3/1999 | Feygin et al. |
| 5,885,511 A | 3/1999 | Heller et al. |
| 5,902,537 A | 5/1999 | Almquist et al. |
| 5,991,102 A | 11/1999 | Oono et al. |
| 6,030,199 A | 2/2000 | Tseng |
| 6,031,225 A | 2/2000 | Stern et al. |
| 6,180,050 B1 | 1/2001 | Arai et al. |
| 6,267,919 B1 | 7/2001 | Tanaka et al. |
| 6,372,178 B1 | 4/2002 | Tseng |
| 6,406,658 B1 | 6/2002 | Manners et al. |
| 6,570,952 B2 | 5/2003 | Paladini |
| 6,821,473 B2 | 11/2004 | Hiizumi et al. |
| 7,006,887 B2 | 2/2006 | Nagano et al. |
| 7,048,528 B2 | 5/2006 | Ishikawa et al. |
| 7,423,236 B2 | 9/2008 | Suh |
| 7,636,610 B2 | 12/2009 | Schillen et al. |
| 7,759,230 B2 | 7/2010 | Im |
| 7,831,328 B2 | 11/2010 | Schillen et al. |
| 7,906,414 B2 | 3/2011 | Im |
| 2002/0011693 A1 | 1/2002 | Leyden et al. |
| 2002/0153640 A1 | 10/2002 | John |
| 2004/0118309 A1 | 6/2004 | Fedor et al. |
| 2005/0179772 A1* | 8/2005 | Ishikawa ............ B23K 26/0604 347/255 |
| 2005/0208168 A1 | 9/2005 | Hickerson et al. |
| 2006/0100734 A1* | 5/2006 | Huang ................ B29C 67/0059 700/119 |
| 2008/0259228 A1 | 10/2008 | Henningsen |
| 2010/0097662 A1 | 4/2010 | Churilla et al. |
| 2010/0173096 A1 | 7/2010 | Kritchman et al. |
| 2010/0262272 A1 | 10/2010 | Shkolnik et al. |
| 2010/0283188 A1 | 11/2010 | Rohner et al. |
| 2011/0009992 A1 | 1/2011 | Shkolnik et al. |
| 2012/0165969 A1 | 6/2012 | Elsey |
| 2012/0195994 A1 | 8/2012 | El-Siblani et al. |
| 2013/0001834 A1 | 1/2013 | Siblani et al. |

FOREIGN PATENT DOCUMENTS

| | | |
|---|---|---|
| EP | 1674243 A2 | 6/2006 |
| EP | 1876012 A1 | 1/2008 |
| EP | 2011631 B1 | 4/2012 |
| EP | 1262305 B1 | 1/2013 |
| JP | 08150662 | 6/1996 |
| WO | 2011064725 A1 | 6/2011 |
| WO | 2012021940 A1 | 2/2012 |

OTHER PUBLICATIONS

International Search Report and Written Opinion for PCT/US2014/032761, dated Nov. 25, 2014.
International Search Report and Written Opinion for PCT/US2014/0066120 dated Feb. 13, 2015.
Response to Opposition to EP 2 011 631, dated Jan. 14, 2013.
European Patent Office (EPO) Notice of Opposition, dated Feb. 25, 2013.
Huang, et al., "Computer Supported Force Analysis and Layer Imagine for Masked Rapid Prototyping System" Department of Mechanical Engineering, National Taiwan University of Science and technology, Taipei, Taiwan.
Huang, et al., "On-line force monitoring of platform ascending rapid prototyping system" Journal of Materials Processing Technology 159 (2005) 257-264.
English translation of JP 08150662 abstract, from: http://www.19.ipdl.inpit.go.jp/PA1/result/main/woYeaMaDA408150662P1.htm Jul. 15, 2011.
English translation of DE 10256672 from Lexis Nexis Total Patent.
English translation of DE 19929199 from Lexis Nexis Total Patent.
International Search Report and Written Opinion for PCT/US2012/044398, dated Oct. 26, 2012.
Yamazawa, Kenji, et al., "High Speed UV Laser Beam Scanning by Polygon Mirror," pp. 223-230, The Institute of Physical and Chemical Research (Riken), (1997).
U.S. Appl. No. 13/774,355, As-Filed.
U.S. Appl. No. 14/091,683, As-Filed.

* cited by examiner

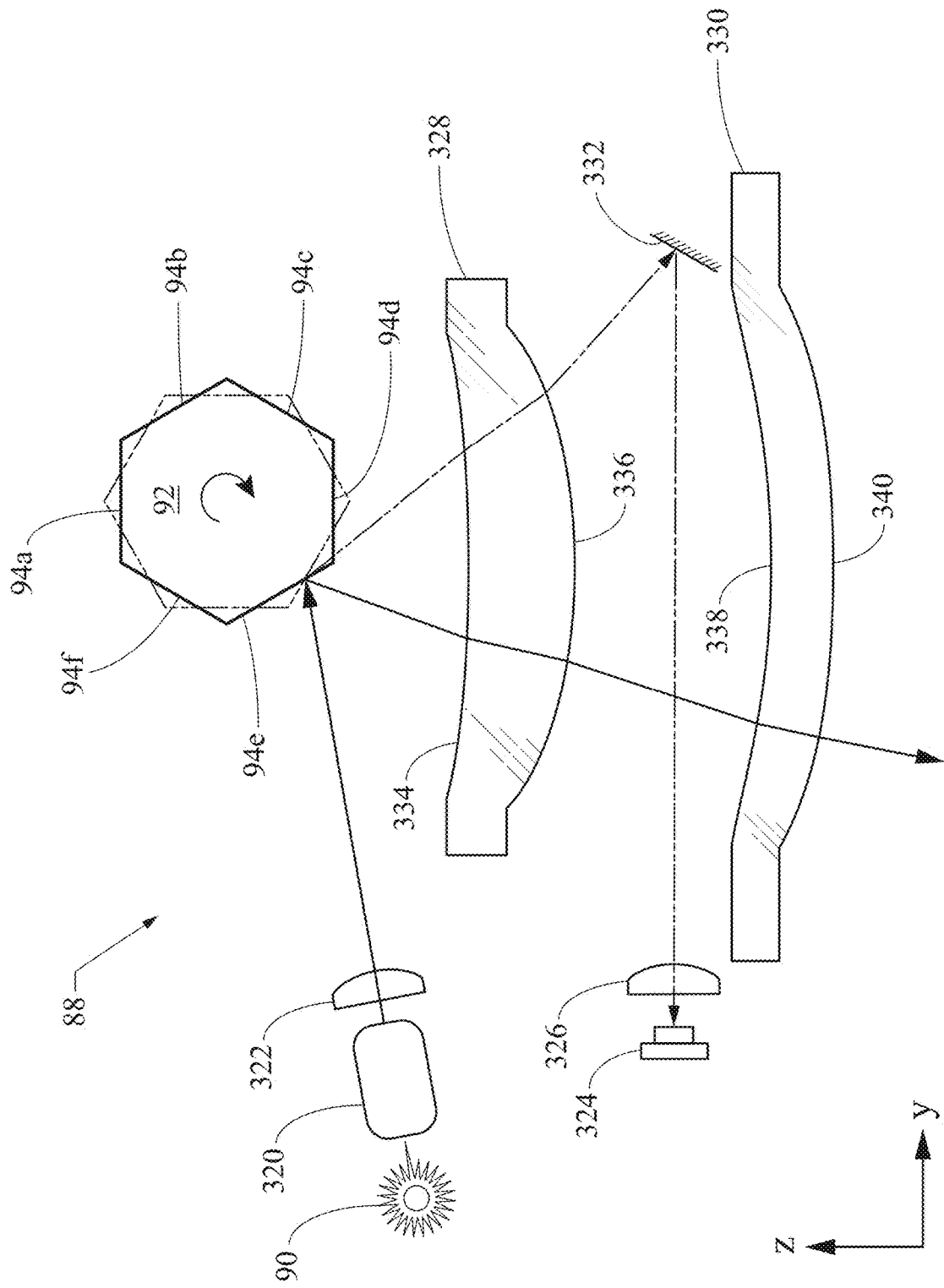

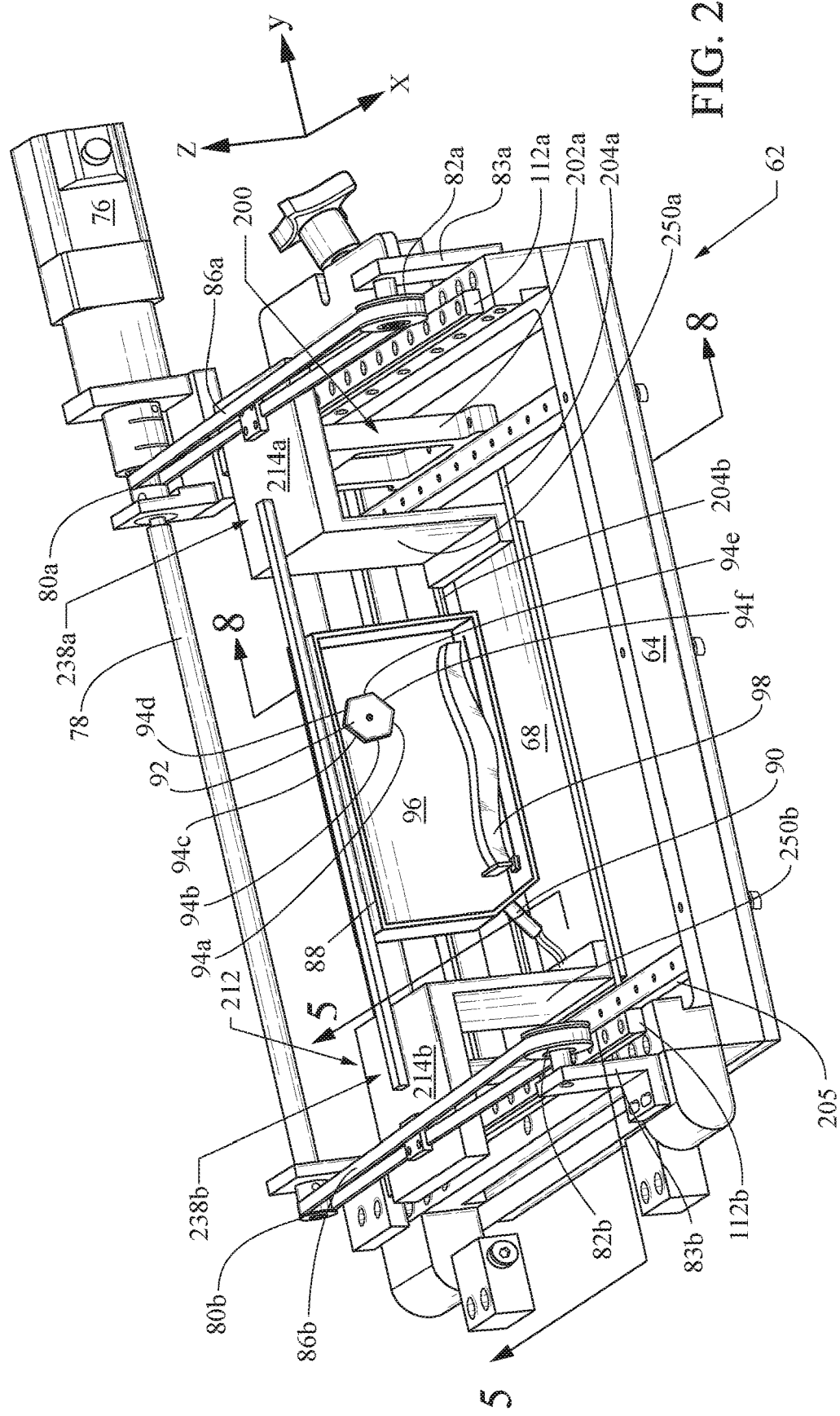

| m (computer memory index) | n (string index) | Data string |
|---|---|---|
| 0 | 20 | FFFFFFFF, 20, 22000, 44000 |
| 1 | 21 | FFFFFFFF, 21, 20000, 46000 |
| 2 | 22 | FFFFFFFF, 22, 18000, 48000 |
| ... | ... | ... |
| 6 | 26 | FFFFFFFF, 26, 0, 66000 |
| ... | ... | |
| 10 | 30 | FFFFFFFF, 30, 18000, 48000 |
| 11 | 31 | FFFFFFFF, 31, 20000, 46000 |
| 12 | 32 | FFFFFFFF, 32, 22000, 44000 |

| m | n (even) (L-R) | Data String |
|---|---|---|
| 0 | 20 | FFFFFFFF, 10, 8500, 54000 |
| 1 | 21 | FFFFFFFF, 11, 8250, 57750 |
| ... | ... | ... |
| 10 | 30 | FFFFFFFF, 30, 8250, 24750, 41250, 57750 |
| ... | ... | |
| 39 | 59 | FFFFFFFF, 59, 8250, 24750, 41250, 57750 |
| 40 | 60 | FFFFFFFF, 60, 8500, 24500, 41500, 57500 |

FIG. 11F

| m | n(odd) R-L | $(N_{max}-1) - n(odd)$ | Even layer data string for $n(even) = (N_{max}-1)-n(odd)$ |
|---|---|---|---|
| 0 | 40 | 100-40 = 60 | FFFFFFFF, 40, 8500, 24500, 41500, 57500 |
| 1 | 41 | 100-41=59 | FFFFFFFF, 41, 8250, 24750, 41250, 57750 |
| ... | ... | ... | ... |
| 30 | 70 | 100-70=30 | FFFFFFFF, 42, 8250, 24750, 41250, 57750 |
| ... | ... | ... | ... |
| 39 | 79 | 100-79=21 | FFFFFFFF, 43, 8250, 57750 |
| 40 | 80 | 100-80=20 | FFFFFFFF, 44, 8500, 54000 |

FIG. 11G

| Scanning Axis Location Index (q) | Voltage (mV) |
|---|---|
| 0 | 500 |
| 1 | 490 |
| 2 | 470 |
| 3 | 455 |
| 4 | 440 |
| 5 | 440 |
| 6 | 455 |
| 7 | 470 |
| 8 | 490 |
| 9 | 500 |

FIG. 32A

| Scanning Axis Location Index (q) | $t_{start}$ (CPU ticks) | $t_{end}$ (CPU ticks) |
|---|---|---|
| 0 | 0 | 6600 |
| 1 | 6601 | 13200 |
| 2 | 13201 | 19800 |
| 3 | 19801 | 26400 |
| 4 | 26401 | 33000 |
| 5 | 33001 | 39600 |
| 6 | 39601 | 46200 |
| 7 | 46201 | 52800 |
| 8 | 52801 | 66000 |
| 9 | 66601 | 66000 |

FIG. 32B

APPARATUS AND METHOD FOR FORMING THREE-DIMENSIONAL OBJECTS USING LINEAR SOLIDIFICATION WITH TRAVEL AXIS CORRECTION AND POWER CONTROL

CROSS-REFERENCE TO RELATED APPLICATIONS

This application claims the benefit of U.S. Provisional Patent Application No. 61/808,278, filed on Apr. 4, 2013 and U.S. Provisional Patent Application No. 61/846,345, filed on Jul. 15, 2013, the entirety of each of which is hereby incorporated by reference.

FIELD

The disclosure relates to an apparatus and method for manufacturing three-dimensional objects, and more specifically, to an apparatus and method for using linear solidification to form such objects.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

One technique that may be used to form a three-dimensional object involves the use of a linear solidification device. The linear solidification device travels along a travel axis and progressively and selectively supplies solidification energy along a scanning axis while moving along the travel axis. At slow travel axis speeds, the scanning axis may be orthogonal to the travel axis. However, slow travel axis speeds tend to slow build times, which is undesirable. At high travel axis speeds, the scanning axis is not orthogonal to the travel axis, which can produce objects that undesirably deviate from the object data used to define them.

In addition, the solidification energy supplied per unit time by a linear solidification device (e.g., the solidification power supplied to the solidifiable material) may vary over time as well as with the position along a scanning axis direction at which the solidification energy is received. Such variations may undesirably cause variations in the depth of solidification within a solidifiable material and inaccuracies in the three-dimensional object being built. Thus, a need has arisen for an apparatus and method for making three-dimensional objects using a linear solidification device which addresses the foregoing issues.

BRIEF DESCRIPTION OF THE DRAWINGS

The disclosure will now be described, by way of example, with reference to the accompanying drawings, in which:

FIG. 1C is a schematic view of a first alternate version of the linear solidification device of FIG. 1A in which the housing is removed and which includes a solidification energy synchronization sensor;

FIG. 2 is an embodiment of a solidification substrate assembly and linear solidification device for use in a system for making a three-dimensional object from a solidifiable material;

FIG. 11F is a table depicting exemplary sets of data strings corresponding to an even layer of a three-dimensional object represented by the cross-sectional strip data of FIG. 11E;

FIG. 11G is a table depicting exemplary sets of data strings corresponding to an odd layer of a three-dimensional object represented by the cross-sectional string data of FIG. 11F;

FIG. 32A is a depiction of a power compensation data table relating power compensated voltage values and scanning axis location index values from a power compensation database;

FIG. 32B is a depiction of a table of the starting and ending times at which solidification energy traverses indexed locations on a scanning axis;

Like numerals refer to like parts in the drawings.

DETAILED DESCRIPTION

Figure 1B:
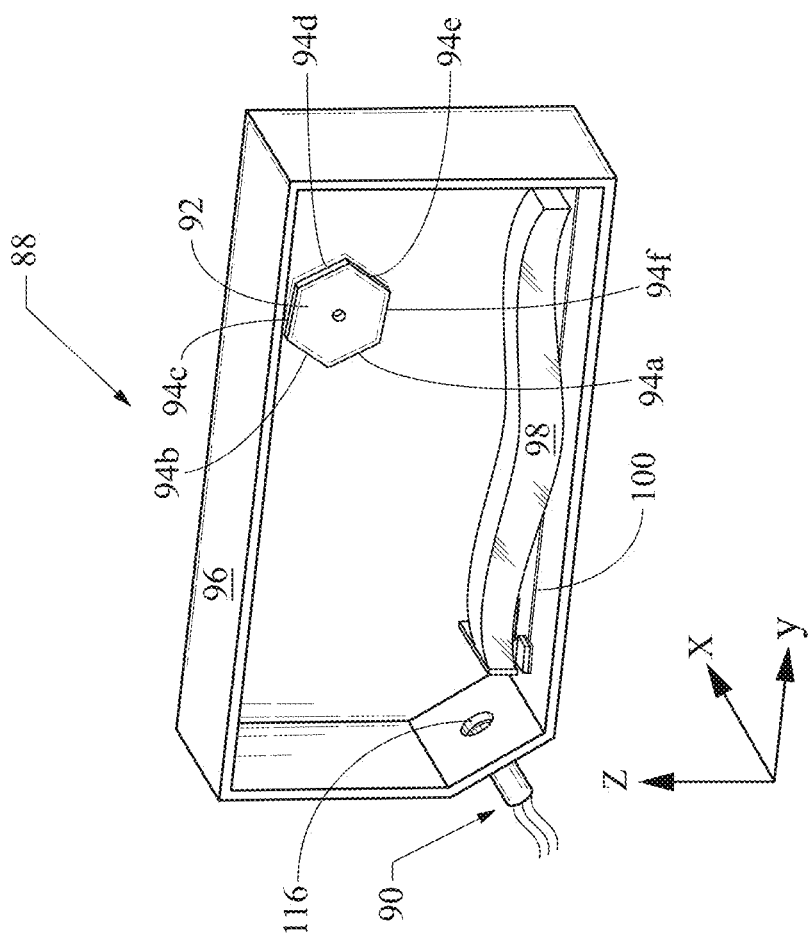
FIG. 1B is a perspective view of the front of the linear solidification device of FIG. 1B.

The Figures illustrate examples of an apparatus and method for manufacturing a three-dimensional object from a solidifiable material. Based on the foregoing, it is to be generally understood that the nomenclature used herein is simply for convenience and the terms used to describe the invention should be given the broadest meaning by one of ordinary skill in the art.

The apparatuses and methods described herein are generally applicable to additive manufacturing of three-dimensional objects, such as components or parts (discussed herein generally as objects), but may be used beyond that scope for alternative applications. The system and methods generally include a linear solidification device that applies solidification energy to a solidifiable material, such as a photohardenable resin. A linear solidification device comprising a source of solidification energy creates a series of adjacent linear images on a solidifiable material which may vary in accordance with the shape of the object being built as the device moves across the surface of the solidifiable material to selectively solidify it.

The linear solidification device applies solidification energy in a generally—and preferably substantially—linear pattern across an exposed surface of the solidifiable material and also moves in a direction other than the one defined by the length of the linear pattern while applying solidification energy. The linear solidification device includes a scanning device that progressively and selectively supplies solidification energy to a solidifiable material along a scanning axis direction as the linear solidification device moves in a travel axis direction. In certain examples, the scanning axis direction is oriented at a non-orthogonal angle with respect to the travel axis direction. Such scanning devices include without limitation rotating polygonal mirrors and linear scanning micromirrors. It has been found that when the relative ratio of the speed of travel along the travel axis to the scanning speed along the scanning axis is low, the scanning axis is generally orthogonal to the travel axis. However, at higher ratios, the axes are oriented at a non-orthogonal angle, which may produce inaccuracies in the object being built relative to the data that was originally supplied to define the object. Accordingly, the systems and methods described herein include techniques that compensate for the non-orthogonal relationship between the travel and scanning axes.

In certain implementations, the solidification power received by the solidifiable material may vary with the position along the scanning axis. This can be caused by a variety of factors, such as the variations in distance between a scanning device and the solidifiable material along the scanning axis as well as variations in the angle of incidence between the solidification energy and the solidifiable material along the scanning axis. Accordingly, systems and methods are disclosed herein that maintain a substantially constant received solidification power and/or solidification depth along the scanning axis direction. Methods and systems are also described for maintaining substantially constant solidification depth over time, which is useful when the power output of a solidification energy source deteriorates due to prolonged use.

The system is generally used for manufacturing three-dimensional objects from a solidifiable material and rapid prototyping. As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids. In one embodiment of a photopolymer paste solidifiable material, a viscosity of between 10000 cP (centipoises) and 150000 cp is preferred.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acylphosphine oxides, benzyldimethyl-ketals, α-amino ketones, and α-hydroxy ketones. Examples of suitable metallocenes include Bis (eta 5-2,4-cyclopenadien-1-yl) Bis[2,6-difluoro-3-(1H-pyrrol-1-yl)phenyl]titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl)phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The linear solidification devices described herein are generally provided as a component of a system for making a three-dimensional object. The system includes components such as a source of solidifiable material, a build platform on which the object is built, and a housing that encloses the linear solidification device, solidifiable material, and build platform. In certain examples, a solidification substrate assembly is also provided which includes a solidification substrate against which the solidifiable material is solidified and subsequently peeled or otherwise separated. The system may build objects in a vertically downward orientation or a vertically upright orientation depending on the specifics of the implementation.

FIG. 2 shows a portion of a system for making a three-dimensional object from a solidifiable material with a linear solidification device. The figure depicts linear solidification device 88 in use with a solidification substrate assembly 62. The solidification substrate assembly 62 is merely exemplary. In the example of FIG. 2, the solidification substrate assembly 62 includes a moving substrate assembly 212, a film assembly 205, a stationary frame 64, a motor 76, a shaft 78, and timing belts 86a and 86b operatively connected to respective pulleys 80a, 82a (for timing belt 86a) and 80b, 82b (for timing belt 86b). Although not shown in the figure, the solidification substrate assembly 62 is positioned over a source of solidifiable material, such as a reservoir of solidifiable material. A build platform (not shown) provides a surface on which the three-dimensional object is built and progressively moves away from the film assembly 205 as the object building process progresses. Thus, the particular exemplary system of FIG. 2 is used in a vertically upright process in which the object is vertically oriented right-side up.

In the embodiment of FIG. 2, linear solidification device 88 supplies solidification energy across a planar region that may be characterized by first and second axes, such as x and y axes. Linear solidification device 88 progressively applies solidification energy to a solidifiable material in a scanning axis direction (shown as the y-direction) as it moves in a travel axis direction (shown as the x-direction) across the surface of a solidifiable material, such as a photohardenable resin (not shown in figure). The three-dimensional object is progressively formed in a build axis direction (z-direction) as the linear solidification device 88 progressively solidifies selected regions of the solidifiable material in the x-y plane.

In the example of FIG. 2, linear solidification device 88 moves in the travel (x) axis direction while a build platform on which the object is built remains stationary in the travel axis direction and moves in the build (z) axis direction. However, the configuration may be reversed. For example, in certain implementations, the build platform may be coated with a solidifiable material and moved in the travel axis direction relative to the linear solidification device 88 which would remain stationary in the travel axis direction.

In preferred embodiments, linear solidification device 88 includes a linear scanning device, and solidification energy is "scanned" on the solidifiable material in a scanning direction that defines a scanning axis as the linear solidification device 88 moves in the x-direction. In certain examples herein, the scanning axis is not parallel to the y-axis shown in the figures, but instead is oriented at a non-orthogonal angle with respect to the travel (x) axis. Preferably, the linear solidification device 88 is not itself moved in the y-direction or any direction other than the travel (x) axis during solidification of the solidifiable material. The sequential linear scans in the scanning axis direction may be referred to as "linear scanning operations" herein. As used herein, the term "scanning axis direction" refers to a direction along which solidification energy is progressively supplied to the solidifiable material as the linear solidification device 88 travels along the travel axis α-axis) direction. In contrast, the term "y-axis" refers to an axis that is perpendicular to the travel axis, and the build axis (z-axis) along which the object is progressively built as the build platform (not shown) moves. However, the scanning axis will not necessarily be, and in certain examples herein is not, parallel to the y-axis.

Motor 76 is provided to drive housing 96 and rigid or semi-rigid solidification substrate 68 along the surface of the solidifiable material lying beneath it from one end of solidification substrate assembly 62 to the other in the travel axis (x-axis) direction. In certain examples, motor 76 is a servo motor or a stepper motor. In either case, motor 76 has a motor movement parameter associated with it that corresponds to a degree of linear movement of linear solidification device 88 in the travel axis (x-axis) direction. In certain cases the parameter is a number of motor steps corresponding to a particular linear distance that linear solidification device 88 moves in the travel axis (x-axis) direction. As housing 96 moves in the travel axis (x-axis) direction (the length direction of solidification substrate assembly 62), solidification energy source 90 and rotating energy deflector 92 move therewith. During this movement, solidification energy, preferably laser light, is periodically or continuously projected from solidification energy source 90 to rotating energy deflector 92.

In one preferred embodiment, the solidification energy received by the solidifiable material is light in the range of 380 nm-420 nm. A range of 390 nm-410 nm is preferred, and a range of from 400 nm to about 410 nm is more preferred. The solidification power received by the solidifiable material is preferably at least about 350 mW, more preferably at least about 450 mW, and even more preferably, at least about 550 mW. At the same time, the solidification power received by the solidifiable material is preferably no more than about 750 mW, more preferably no more than about 700 mW, and still more preferably no more than about 650 mW.

The solidification power received by the solidifiable material may vary from the solidification power transmitted from solidification energy source 90 (i.e., the optical output power) due to various losses, including losses attributable to optical components (e.g., lenses) used to focus or adjust the angle of incidence of the solidification energy on the solidifiable material. Examples of such optical components include flat field lenses and F-theta lenses and will be described further in the examples below. Thus, preferred solidification energy sources 90 will have a maximum transmitted solidification power higher than the preferred values of solidification power received by the solidifiable material. Preferred maximum values of solidification power transmitted by solidification energy source 90 are at least about 700 mW, preferably at least about 900 mW, and more preferably at least about 1100 mW. At the same time, preferred maximum values of solidification power transmitted by solidification energy source 90 are no more than about 1500 mW, more preferably no more than about 1400 mW, and still more preferably no more than about 1300 mW. One suitable example of such a solidification energy source 90 is a Nichia NDV7375E Violet Laser Diode, which has a maximum continuous wave (CW) optical output power of 1200 mW and a peak wavelength of 400 to 405 nm at the maximum optical output power of 1200 mW. In certain preferred examples, the solidification energy source 90 is operated to transmit a solidification power that is less than its maximum transmittable solidification power. Thus, in certain preferred examples, the solidification power that is transmitted by solidification energy source 90 is at least about 700 mW, preferably at least about 750 mW, and more preferably at least about 850 mW. At the same time, the solidification power that is transmitted by solidification energy source 90 is no more than about 1100 mW, preferably no more than about 1050 mW, and more preferably no more than about 950 mW.

In the exemplary linear solidification device 88 of FIGS. 1B and 2, rotating energy deflector 92 deflects solidification energy that is incident upon it toward flat field lens 98. Rotating energy deflector 92 preferably rotates in a rotation plane as linear solidification device 88 moves in the travel axis (x-axis) direction. In certain examples, the rotation plane is substantially perpendicular to the travel axis (x-axis) direction in which the linear solidification device 88 moves (i.e., the rotation plane is the y-z plane shown in FIGS. 1B and 2). In certain examples, rotating energy deflector 92 rotates at a substantially constant rotational speed. In other examples, the linear solidification device 88 moves at a substantially constant speed in the travel axis (x-axis) direction. In further examples, the rotating energy deflector 92 rotates at a substantially constant rotational speed and the linear solidification device 88 moves in the travel axis (x-axis) direction at a substantially constant speed. The scanning speed (in number of scans per unit time) at which solidification energy is progressively applied to selected areas of a solidifiable resin in the scanning axis direction of solidification substrate assembly 62 corresponds to the rotational speed of rotating energy deflector 92 multiplied by the number of facets 94a-f. In certain examples, the rotational speed is from about 1,000 to about 10,000 rpm, preferably from about 2,000 to about 8,000 rpm, and more preferably from about 3,000 to about 5,000 rpm.

When solidification energy source 90 is a light source, rotating energy deflector 92 is preferably a rotating light deflector capable of deflecting visible or UV light. In one exemplary embodiment, rotating energy deflector 92 is a polygonal mirror having one or more facets 94a,b,c, etc. defined around its perimeter. In the example of FIGS. 1B and 2, rotating energy deflector 92 is a hexagonal mirror having facets 94a to 94f. Each facet 94a-94f has at least one rotational position, and preferably several, at which it will be in optical communication with solidification energy source 90 to receive light projected therefrom. As the rotating energy deflector 92 rotates, solidification energy (e.g., visible or ultraviolet light) will be deflected along the length of each facet 94a-f in succession. At any one time, one of the facets 94a-94f will receive and deflect solidification energy. As the facet changes its rotational position, the angle of incidence of the solidification energy with respect to the facet will change, altering the angle of deflection, and therefore, the scanning axis location at which the deflected solidification energy strikes the solidification substrate 68 and the solidifiable material underneath it. Thus, each rotational position of rotating energy deflector 92 corresponds to a position along the scanning axis at which solidification energy may be projected at a given time. However, for a given number of rotating energy deflector facets F, there will be F rotational positions that each correspond to a particular position along the scanning axis direction. As will be discussed in greater detail below, one or more controllers or microcontrollers may be provided to regulate the activation and deactivation of the build platform (not shown), solidification energy source 90, rotating energy deflector 92, and motor 76 that drives the linear solidification device 88 across the solidifiable material.

In certain examples, the maximum length of scan in the scanning axis direction will correspond to the full length of an individual facet 94a-94f. That is, as the light progressively impinges on the entire length of any one facet 94a-94f, the deflected light will correspondingly complete a full scan length in the scanning axis direction. The number of facets 94a, 94b, etc. on the rotating energy deflector 92 will correspond to the number of scanning axis scans that are performed for one complete revolution of rotating energy deflector 92. In the case of a hexagonal mirror, six scans will occur for every complete rotation of rotating energy deflector 92. For rotating energy deflectors that maintain a constant rotational direction (e.g., clockwise or counterclockwise), the scans will be uni-directional along the scanning axis. Put differently, as light transitions from one facet 94a to another 94b, the scan will return to its starting position along the scanning axis, as opposed to scanning back in the opposite direction. However, other rotating energy deflector configurations may be used including those in which the rotating energy deflector 92 rotates in two rotational directions to produce a "back and forth" scan in the scanning axis direction.

It is useful to use the term "build envelope" to describe the maximum length (in the x-direction) and maximum width (in the y-direction) in which solidification energy may be supplied to the solidifiable material. In the embodiment of FIG. 2, the build envelope area will typically be less than the area of the exposed and upward facing surface of solidifiable material lying underneath solidification substrate 68. In the example of FIG. 2 the build envelope will comprise an x-dimension (length) that is less than or equal to the full distance that the solidification energy source 90 and rotating energy deflector 92 can travel in the x-direction. In some cases, the y-dimension (width) of the build envelope may be somewhat longer than the length of lens 98 and housing opening 100 because light projected from flat field lens 98 and through housing opening 100 may be projected outwardly from housing 96 in the y-axis direction at a non-orthogonal angle of incidence with respect to the exposed surface of the solidifiable material.

In the system of FIG. 2, solidification energy is supplied from linear solidification device 88, through moving rigid or semi-rigid transparent and/or translucent solidification substrate 68, and through film 224 (FIGS. 4A-4C) to the exposed surface of the solidifiable material. The solidifiable material solidifies in contact with film 224 and is subsequently peeled by peeling members 204a and 204b. As indicated previously, in certain examples solidifiable material such as a photohardenable resin is provided under substantially rigid or semi-rigid, transparent and/or translucent substrate 68 to receive solidification energy transmitted through substrate 68. Solidification substrate 68 is generally rigid or semi-rigid and substantially permeable to the energy supplied by linear solidification device 88. In certain examples, it is preferred that the energy from linear solidification device 88 pass through solidification substrate 68 without a significant diminution in transmitted energy or a significant alteration of the energy spectrum transmitted to the solidification material relative to the spectrum that is incident to the upper surface of solidification substrate 68. In the case where the energy from solidification energy source 90 is light (including non-visible light such as UV light), solidification substrate 68 is preferably substantially transparent and/or translucent to the wavelength(s) of light supplied by solidification energy source 90.

One example of a rigid or semi-rigid solidification substrate 68 is a translucent float glass. Another example is a translucent plastic. A variety of different float glasses and plastics may be used. Exemplary plastics that may be used include transparent acrylic plastics supplied by Evonik under the name Acrylite®. The term "translucent" is meant to indicate that substrate 68 is capable of transmitting the light wavelengths (including non-visible light such as UV light) necessary to solidify the solidifiable material and that the intensity of such wavelengths is not significantly altered as the light passes through substrate 68. In the case of photopolymers, a photoinitiator is commonly provided to start the polymerization/cross-linking process. Photoinitiators will have an absorption spectrum based on their concentration in the photopolymer. That spectrum corresponds to the wavelengths that must pass through solidification substrate 68 and which must be absorbed by the photoinitiator to initiate solidification. In one example wherein solidification energy source 90 is a blue laser light diode, Irgacure 819 and Irgacure 714 photoinitiators may preferably be used.

Figure 3:
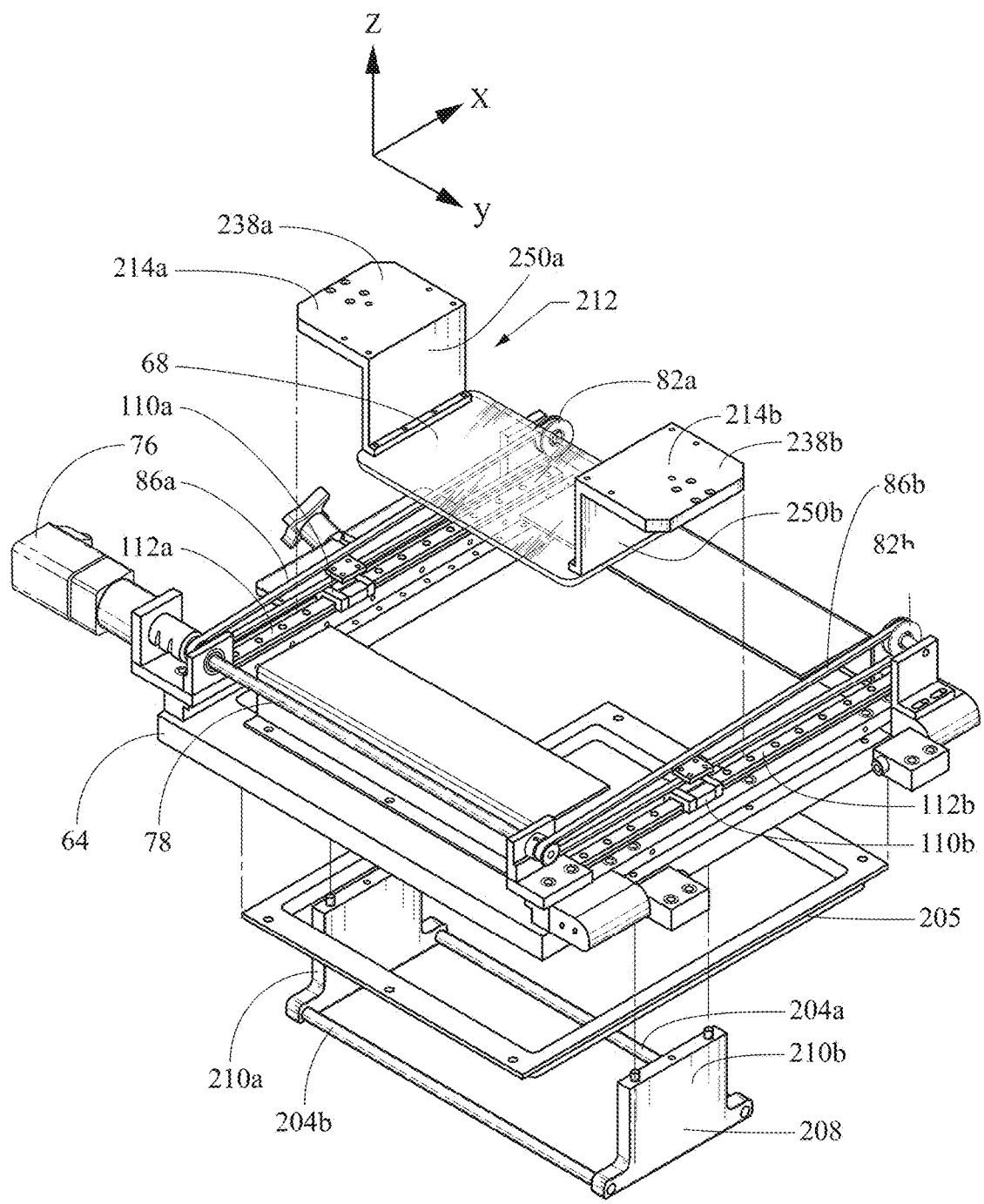
FIG. 3 is an exploded assembly view of the embodiment of FIG. 2.
Figure 6:
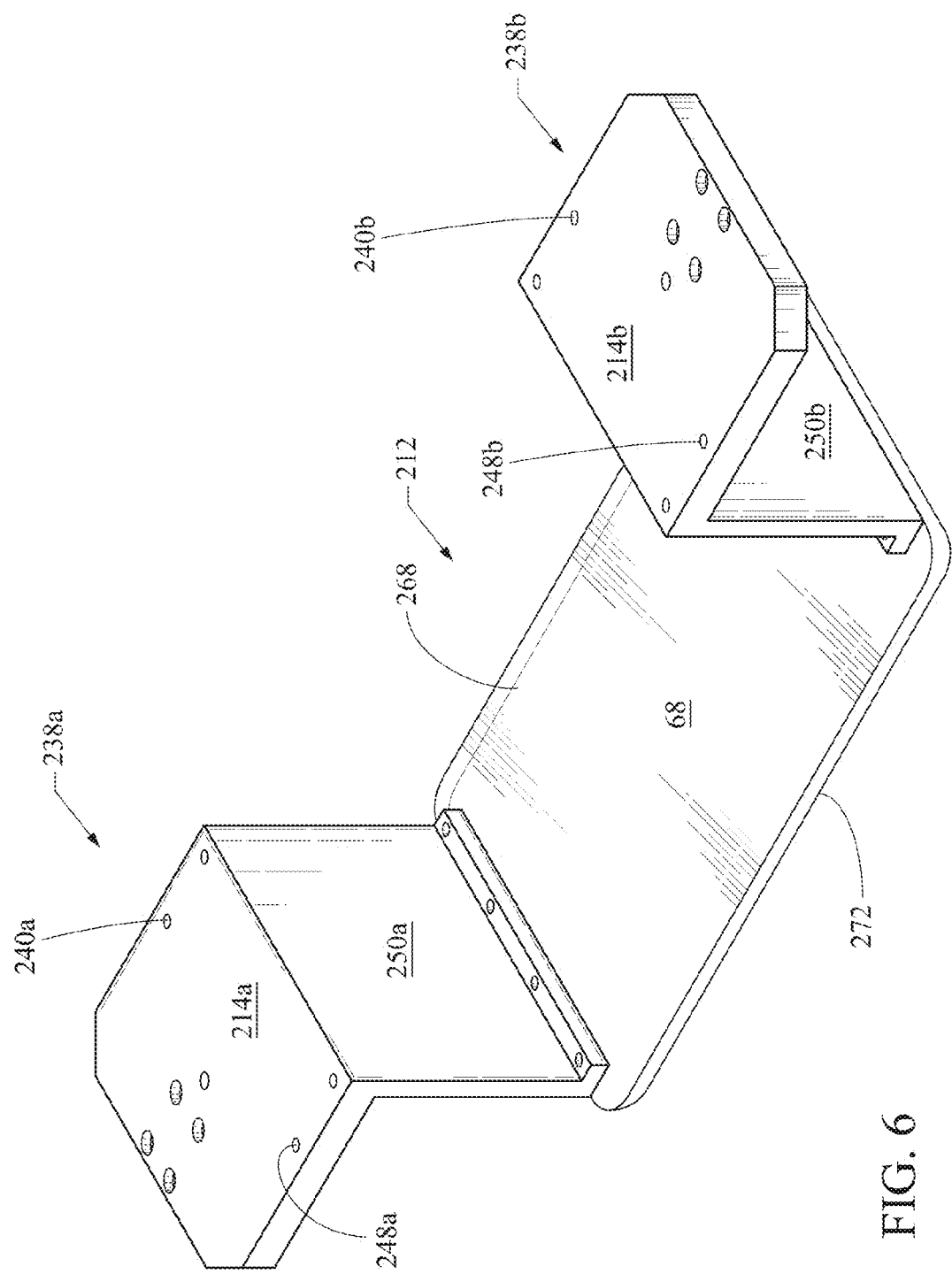
FIG. 6 is a perspective view of a movable substrate assembly used in the solidification substrate assembly of FIG. 2.

FIG. 6 is a perspective view of moving substrate assembly 212. As shown in FIGS. 2, 3 and 6, a pair of brackets 238*a* and 238*b* connects rigid or semi-rigid solidification substrate 68 (which may be transparent and/or translucent) to timing belts 86*a* and 86*b*. Brackets 238*a* and 238*b* are spaced apart from one another across the width (y-axis) direction of solidification substrate 68. Each bracket 238*a* and 238*b* includes a respective vertical panel, 250*a* and 250*b*, and a respective horizontal panel 214*a* and 214*b*. Vertical panels 250*a* and 250*b* are each connected to a respective end of rigid or semi-rigid solidification substrate 68 and to a respective horizontal panel 214*a* and 214*b*. Vertical panels 250*a* and 250*b* may be separately formed and then connected to their respective horizontal panels 214*a* and 214*b* or may be formed integrally therewith. Rigid or semi-rigid solidification substrate 68 is preferably constructed of glass or hard plastic that is transparent and/or translucent. In one example, substrate 68 is constructed of a rigid or semi-rigid transparent and/or translucent acrylic polymer. Rigid or semi-rigid solidification substrate 68 includes a first upper surface 268 that faces linear solidification device 88 and a second lower surface 272 that faces film 224 and the solidifiable material (not shown).

Referring again to FIG. 2, timing belts 86*a* and 86*b* are used to move rigid or semi-rigid solidification substrate 68 along the travel axis (x-axis) direction with respect to stationary frame 64, film assembly 205, and the build envelope (total exposable area) of the solidifiable material lying underneath film assembly 205. Timing belts 86*a* and 86*b* are connected to respective pulleys 82*a* and 82*b* at one end and to respective ends 80*a* and 80*b* of motor drive shaft 78 at another end (FIG. 2).

As best seen in FIGS. 2 and 3, moving substrate assembly brackets 238*a* and 238*b* are connected to their respective timing belts 86*a* and 86*b* on an upper surface of horizontal panels 214*a* and 214*b* and to respective linear bearings 110*a* and 110*b* (shown in FIG. 3) on a lower surface of horizontal panels 214*a* and 214*b*. Linear bearings 110*a* and 110*b* slidingly engage corresponding linear rails 112*a* and 112*b* to facilitate the sliding movement of rigid or semi-rigid solidification substrate 68 along the travel axis (x-axis) direction of solidification substrate assembly 62. Thus, as motor 76 operates, each bracket 238*a* and 238*b* slides along its respective linear rail 112*a* and 112*b* causing rigid or semi-rigid solidification substrate 68 to move along the travel axis (x-axis) direction of solidification substrate assembly 62.

Figure 4A:
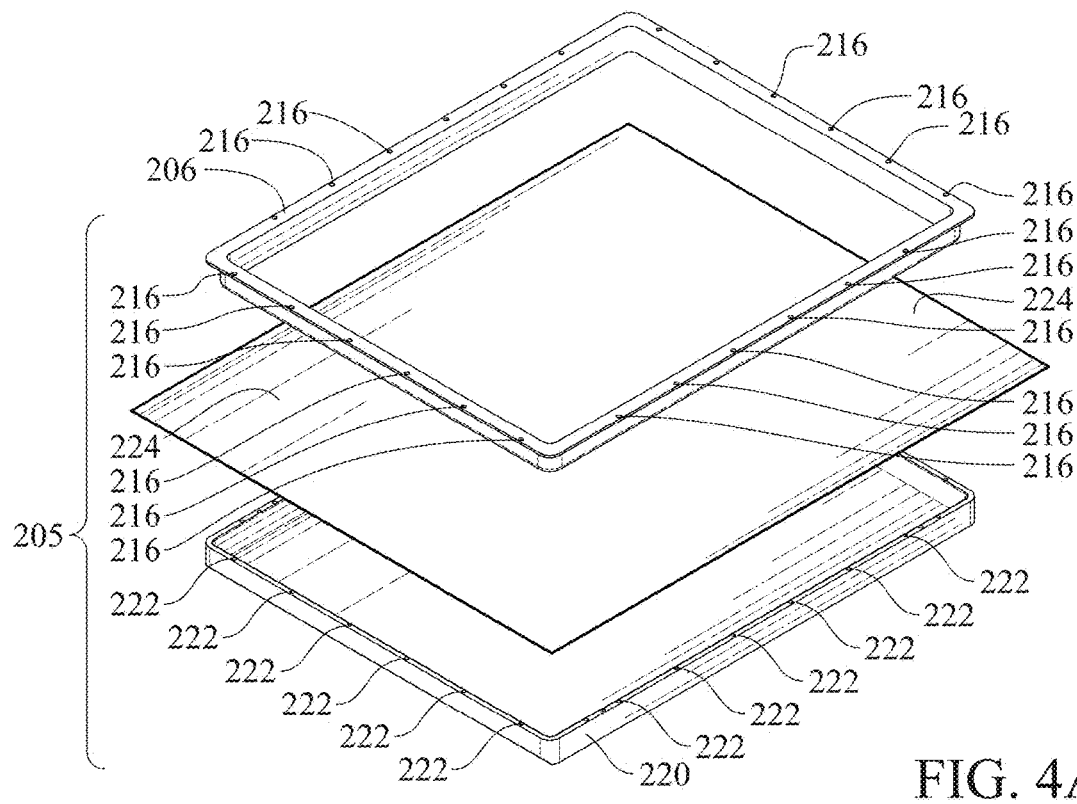
FIG. 4A is an exploded perspective view of a film assembly used in the solidification substrate assembly of FIG. 3.
Figure 4B:
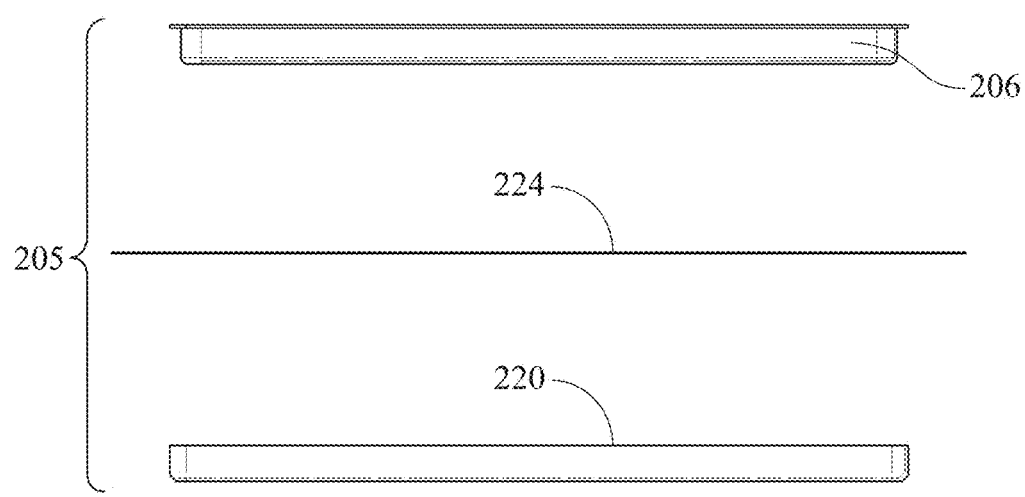
FIG. 4B is a side elevational view of the film assembly of FIG. 4A.
Figure 4C:
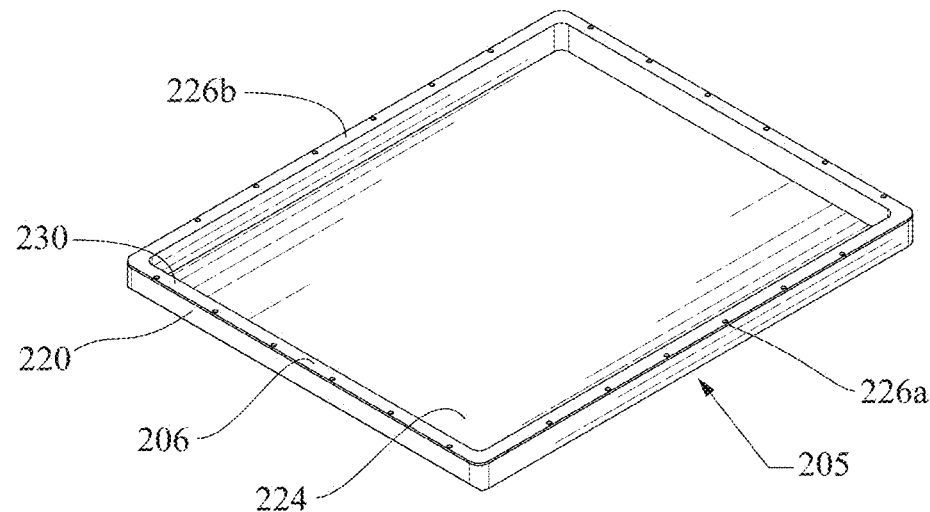
FIG. 4C is a perspective view of the film assembly of FIG. 4A in an assembled configuration.
Figure 5:
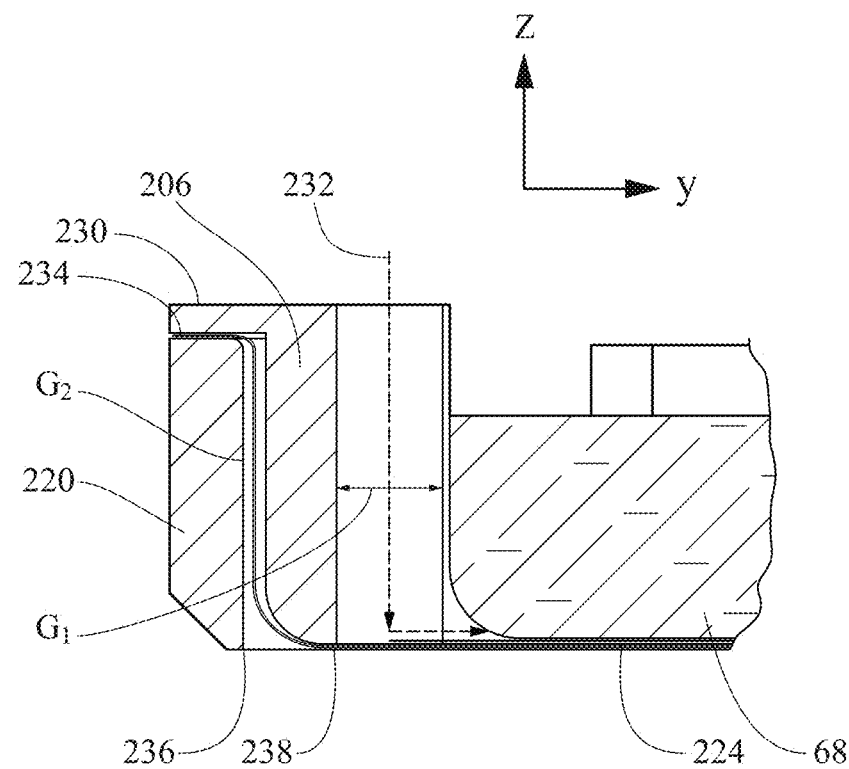
FIG. 5 is a close-up cross-sectional view of the film assembly of FIG. 2 taken along line 5-5 of FIG. 2 with the solidification substrate bracket removed.

Film assembly 205 of solidification substrate assembly 62 is shown in greater detail in FIGS. 4A-C. In the depicted example, outer frame 220 of film assembly 205 is a generally rigid and rectangular structure shaped to cooperatively engage inner frame 206. Inner frame 206 is a generally rigid and rectangular structure which includes an upper lip 230 (FIG. 5) that projects outwardly around the perimeter of inner frame 206. Outer frame 220 fits underneath upper lip 230. In certain examples, the outer edge of lip 230 and the outer perimeter of outer frame 220 are substantially flush with one another and define a substantially continuous outer surface, as illustrated in FIG. 5. Together, film 224, outer frame 220, and inner frame 206 define a film assembly 205 that is securable to stationary frame 64 (FIG. 2). In certain embodiments, it is contemplated that film assembly 205 will be replaced periodically due to the stress on film 224. Thus, film assembly 205 is preferably releasably secured to stationary frame 64 to facilitate replacement of film assembly 205. As shown in FIG. 5 (in which bracket 238*b* is removed), film 224 has a central portion that is disposed in the interior of inner frame 206. Film 224 also has an inner peripheral portion disposed between the lower edge 238 of inner frame 206 and the lower edge 236 of outer frame 220. An outer peripheral portion of film 224 is sandwiched between outwardly projecting lip 230 formed on inner frame 206 and an upper surface 234 formed on outer frame 220. Film 224 is preferably stretched tautly and its central portion is positioned underneath rigid or semi-rigid solidification substrate 68. When in use during an object building operation, rigid or semi-rigid solidification substrate 68 applies a downward force on film 224 as substrate 68 moves in the length (x-axis) direction, helping to planarize the exposed surface of the solidifiable material.

Referring to FIG. 5, outer frame 220 and inner frame 206 are preferably secured to minimize the likelihood of resin leakage through inter-frame gap $G_2$ and the area between lip 230 of inner frame 206 and the upper most surface 234 of outer frame 220. Numerous methods of minimizing or eliminating such leakage may be provided. In one example, as shown in FIG. 5, film 224 is stretched between inner and outer frames 206 and 220, so that an inner peripheral portion of film 224 is located in gap $G_2$, and so that an outer peripheral portion of film 224 is sandwiched between inner frame lip 230 and the upper most surface 234 of outer frame 220. In addition, through-holes 216 (FIG. 4A) formed on the upper surface of upper lip 230 are alignable with complementary holes 222 (FIG. 4A) formed on the upper surface of outer frame 220, allowing fasteners such as screws, bolts, etc. to secure outer frame 220 to inner frame 206. Thus, in certain examples, the fasteners are selected to minimize the amount of leakage in the area between inner frame lip 230 and the upper most surface 234 of outer frame 220. In other examples, portions of gap $G_2$ may be filled with a suitable resin blocking agent such as a cured resin. Suitable cured resins include silicones and epoxies.

Film 224 is preferably a homopolymer or copolymer formed from ethylenically unsaturated, halogenated monomers. Fluoropolymers are preferred. Examples of suitable materials for protective film 224 include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Examples of suitable film 224 materials include PVDF films sold under the Kynar® name by Arkema, ECTFE films sold under the Halar® name by SolvaySolexis, ETFE films sold under the Tefzel® name by DuPont, PFA films sold under the Teflon®-PFA name by DuPont, and MFA films sold under the name Nowofol. MFA and Teflon® films are preferred.

In certain embodiments, film 224 is configured to provide a relieved area that reduces or minimizes the likelihood of vacuum formation between film 224 and rigid or semi-rigid solidification substrate 68. In such embodiments, a portion of film 224 includes a relieved area (not shown) defined by microtextures or grooves in its upper surface (facing rigid or semi-rigid solidification substrate 68). The relieved area lies beneath rigid or semi-rigid solidification substrate 68 while also extending beyond the perimeter of rigid or semi-rigid solidification substrate 68, preferably in the width (y-axis) direction. In certain examples, film assembly 205 has a width in the y-axis direction (FIG. 2) which is longer than the width (in the y-axis direction) of rigid or semi-rigid solidification substrate 68. As shown in FIG. 5, the variation in width creates a gap $G_1$ between the edge of rigid or semi-rigid solidification substrate 68 and the inner surface of inner frame 206, creating a leak path 232 from the atmosphere to the portion of the relieved area of film 224 lying underneath and in facing opposition to rigid or semi-rigid solidification substrate 68, thereby minimizing the likelihood of vacuum formation between film 224 and rigid or semi-rigid solidification substrate 68. In the embodiment of FIG. 5, gap $G_1$ creates a leak path from the atmosphere to the film relieved area that is generally in the z-direction (i.e., substantially parallel to the direction of movement of build platform 43 and to the surface area of film 224). However, other leak path orientations are possible, such as one that is generally in the x-y plane. Film assembly 205 is attached to the underside of stationary frame 64 via fasteners connected to frame 64 and outwardly projecting lip 230 of inner frame 206 (see FIG. 5).

Referring to FIGS. 2, 3, 7, and 8, solidification substrate assembly 62 includes a peeling member assembly 208 (FIGS. 3, 7) having at least one film peeling member, which in the depicted embodiment is two film peeling members 204a and 204b. Film peeling members 204a and 204b are generally elongated rigid members which are spaced apart from one another along the travel axis (x-axis) direction of solidification substrate assembly 62 and on opposite sides of rigid or semi-rigid solidification substrate 68.

Figure 7:
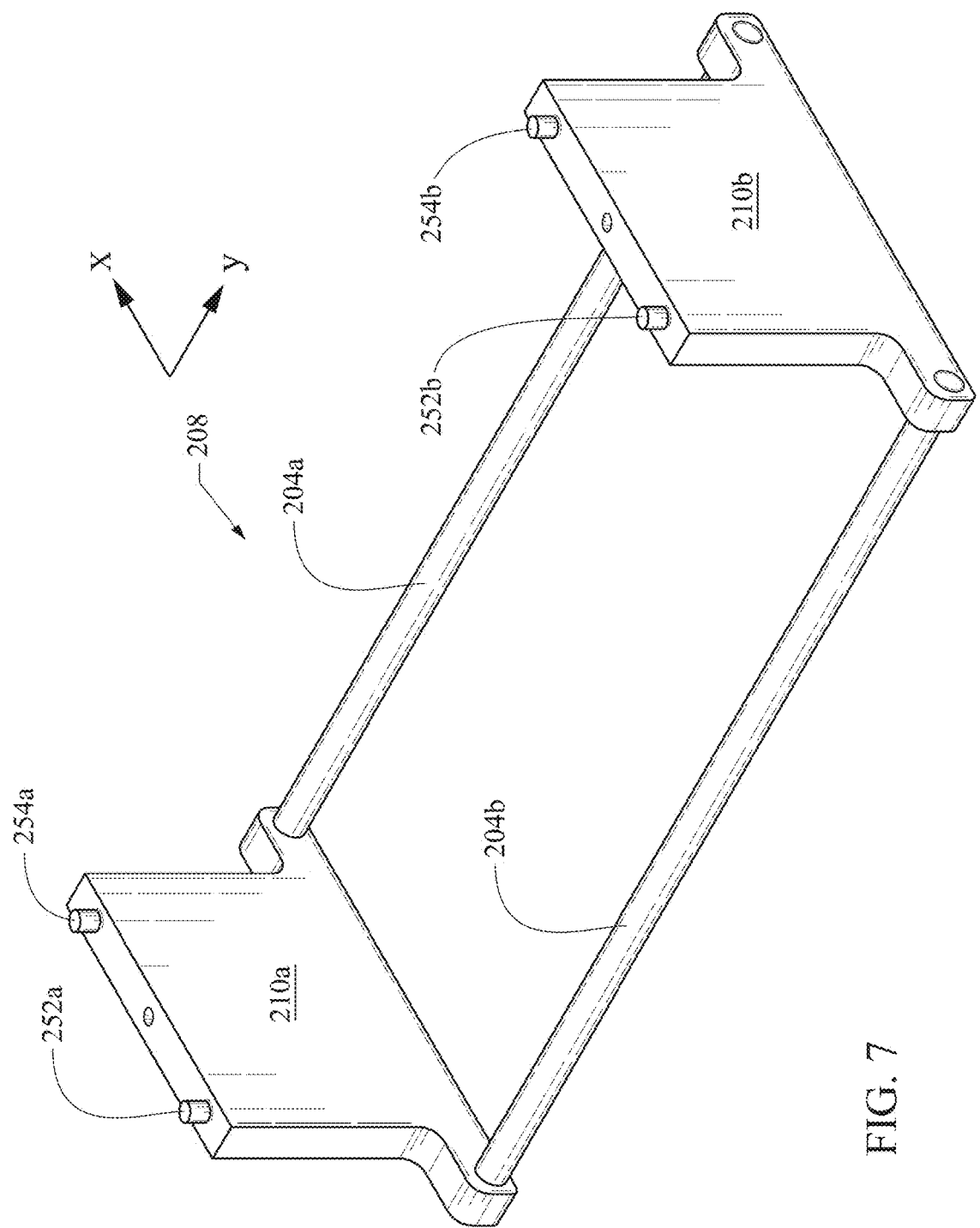
FIG. 7 is a perspective view of a peeling member assembly used in the solidification substrate assembly of FIG. 2.

In one preferred embodiment, film peeling members 204a and 204b are operatively connected to rigid or semi-rigid solidification substrate 68 to move in a coordinated fashion with rigid or semi-rigid solidification substrate 68. One exemplary apparatus for facilitating this movement is depicted in FIGS. 3 and 7. Each film peeling member 204a and 204b is connected to an opposite side of two brackets 210a and 210b. Brackets 210a and 210b are spaced apart along the width (y-axis) direction of solidification substrate assembly 62 while peeling members 204a and 204b are spaced apart along the travel axis (x-axis) direction of solidification substrate assembly 62.

Bracket 210a has an upper surface with connectors 252a and 254a (FIG. 7) which are configured for connection to complementary connectors 240a and 248a (FIG. 6) formed in horizontal panel 214a of solidification substrate assembly bracket 238a. Correspondingly, bracket 210b has an upper surface with connectors 252b and 254b (FIG. 7) which are configured for connection to complementary connectors 240b and 248b (FIG. 6) formed in horizontal panel 214b of solidification substrate assembly bracket 210b. Connectors 252a/b and 254a/b may be male or female, threaded or unthreaded. Similarly, complementary connectors 240a/248a and 240b/248b may be male or female, threaded or unthreaded. In FIG. 7, connectors 252a/b and 254a/b are male connectors suitable for insertion into corresponding female connectors (e.g., threaded or unthreaded holes) 240a/b and 248a/b.

Figure 8:
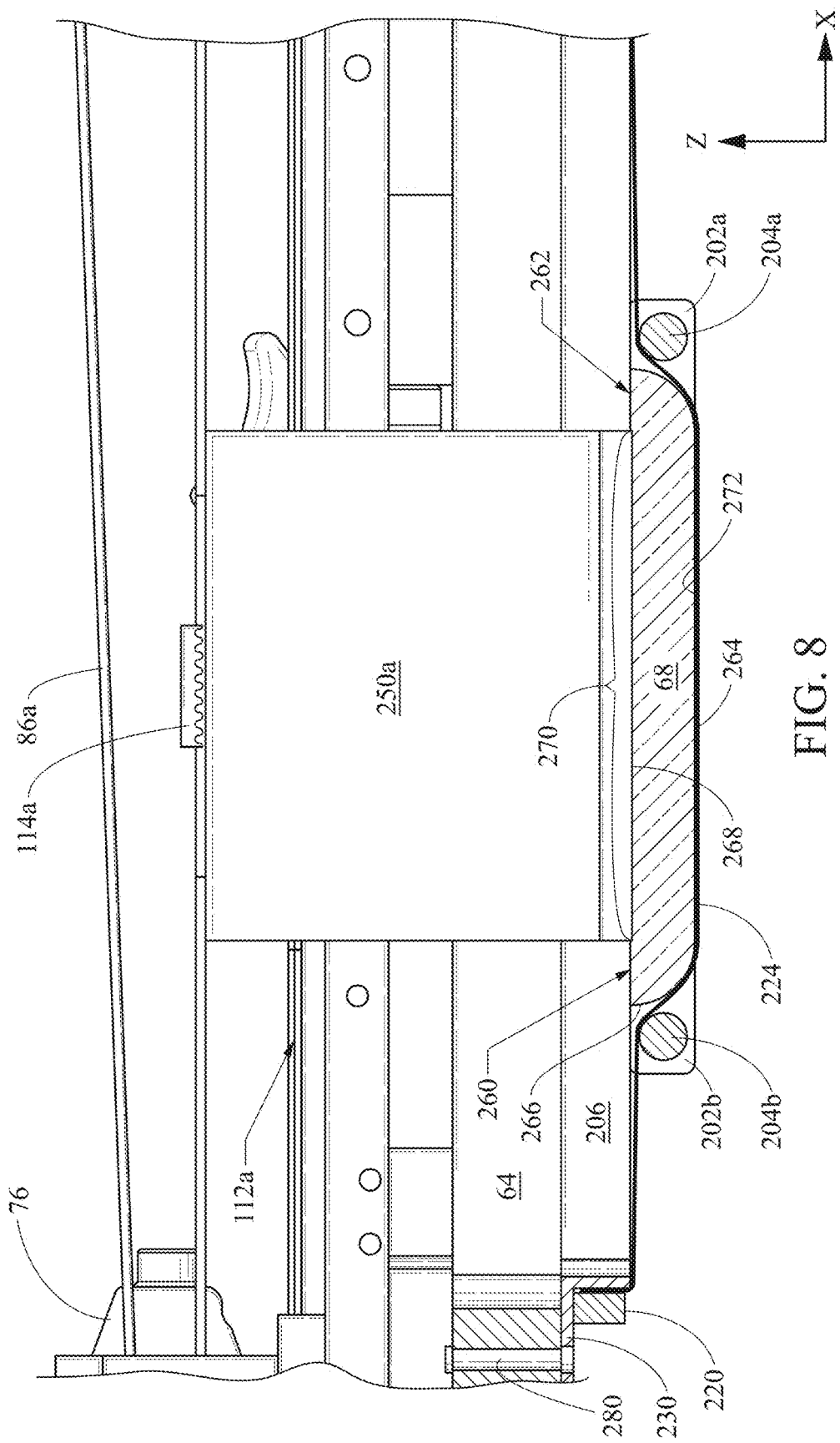
FIG. 8 is a close-up side cross-sectional view of the solidification substrate assembly of FIG. 2 taken along line 8-8 in FIG. 2.

The connections between brackets 210a/b and 238a/b allow film peeling members 204a and 204b to move in coordination with rigid or semi-rigid solidification substrate 68 as it moves along the travel (x-axis) direction of solidification substrate assembly 62. Peeling members 204a and 204b are preferably maintained at a fixed distance relative to rigid or semi-rigid solidification substrate 68. As best seen in FIG. 8, rigid or semi-rigid solidification substrate assembly 62 is preferably configured to maintain the upper surface 268 of rigid or semi-rigid solidification substrate 68 beneath inner frame 206 and outer frame 220 of film assembly 205. The lower surface 272 of rigid or semi-rigid solidification substrate 68 is in abutting engagement with film 224, which facilitates the creation of a substantially planar surface of solidifiable material to which solidification energy is supplied. As shown in FIG. 8, an inner peripheral portion of film 224 is connected to film assembly 205 at a height that is above the height of lower-most surface 272 of rigid or semi-rigid solidification substrate 68. Thus, the portion of film 224 which engages lower-most surface 272 of rigid or semi-rigid solidification substrate 68 remains below the film frame assembly 207 defined by inner film frame 206 and outer film frame 220. As best seen in FIG. 8, film assembly 205 is attached to the underside of stationary frame 64 via fasteners 280 (only one of which is visible in FIG. 8) connected to stationary frame 64 and outwardly projecting lip 230 of inner frame 206.

Referring again to FIG. 8, rigid or semi-rigid solidification substrate 68 also preferably has a beveled edge 266. Upper substrate surface 268 is positioned proximate inner and outer film frames 206 and 220 and is disposed between lower substrate surface 272 and inner and outer film frames 206 and 220. As illustrated in the figure, in certain examples, upper substrate surface 268 has a surface area greater than the surface area of lower substrate surface 272. The use of a beveled edge 266 and an upper surface 268 with a surface area greater than that of lower surface 272 improves the ability of substrate 68 to slide along film 224 as substrate 68 moves relative to film 224 and frames 206 and 220. As shown in FIG. 8, when viewed in cross-section, lower surface 272 has a substantially flat region 264 disposed inward of beveled edge 266.

In certain embodiments that include a beveled edge such as edge 266, steps are taken to reduce the likelihood of image distortion that curved substrate geometries may cause. In the embodiment of FIG. 8, linear solidification device 88 is preferably positioned inward of beveled edge 266 to avoid such distortion. Thus, in the example of FIG. 8, solidification energy is received by substantially flat upper surface 270 and transmitted from substantially flat region 264 of lower surface 272. In certain preferred examples, no solidification energy is transmitted from beveled edge 266 to the solidifiable material beneath film 224.

Figure 1A:
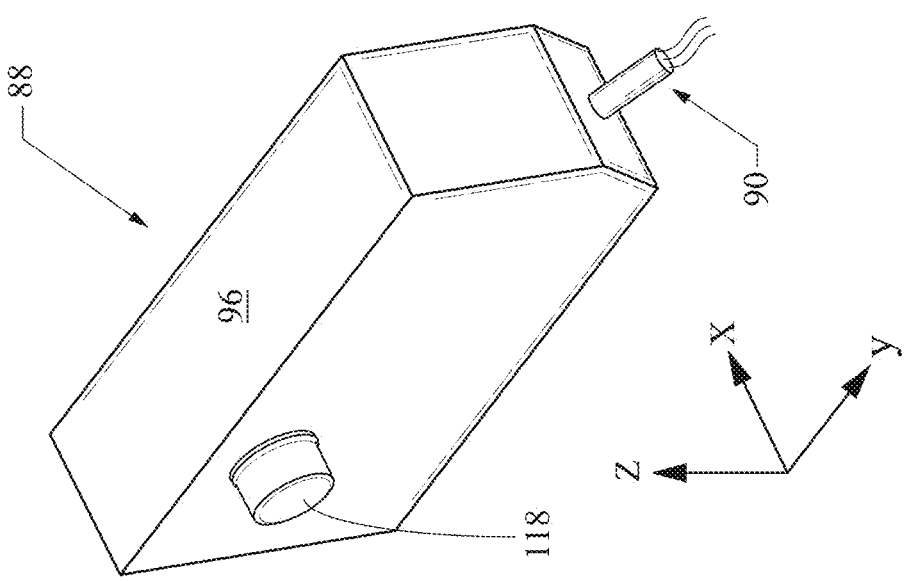
FIG. 1A is a perspective view of the rear of a linear solidification device comprising a solidification energy source and a rotating energy deflector.

The linear solidification device 88 of FIGS. 1A and 1B comprises a solidification energy source 90, a scanning device, and a housing 96. In the depicted embodiment, the scanning device is a rotating energy deflector 92. In other examples of a linear solidification device 88, the scanning device is a laser scanning micromirror that is used in place of rotating energy deflector 92. Thus, it should be understood throughout that a laser scanning micromirror may be used in place of a rotating energy deflector 92 in the exemplary embodiments described herein.

A more detailed view of linear solidification device 88 of FIG. 2 is provided in FIGS. 1A and 1B, which show opposite sides of the device 88. Housing 96 is a generally polygonal structure. As depicted in the figures, housing 96 has an open face, but the face may be closed. Rotating energy deflector 92 is spaced apart from solidification energy source 90 in both the height (z-axis) and width (y-axis) direction, and may be slightly offset from solidification energy source 90 in the travel axis (x-axis) direction as well. Rotating energy deflector 92 is rotatably mounted to housing 96 so as to rotate substantially within a plane that may preferably be oriented substantially perpendicularly to the length (x-axis) direction (i.e., the y-z plane). Solidification energy source port 116 is provided for mounting solidification energy source (e.g., a laser diode) such that it is in optical communication with at least one facet 94a-94f of rotating energy deflector 92 at one time. As indicated previously, lens 98 is spaced apart and below from rotating energy deflector 92 in the height (z-axis) direction and is located above housing light opening 100.

Motor 118 is mounted on a rear surface of housing 96 and is operatively connected to rotating energy deflector 92. Motor 118 is connected to a source of power (not shown). When motor 118 is energized, rotating energy deflector 92 rotates in the y-z plane, bringing the various facets 94a-94f sequentially into optical communication with solidification energy source 90. A control unit (not shown) may also be provided to selectively energize motor 118, solidification energy source 90 and/or motor 76. Either or both of motors 76 (FIG. 2) and 118 may be stepper or servo motors. In certain examples, either or both of the motors 76 and 118 are driven by continuous energy pulses. In the case of motor 118, in certain preferred embodiments, it is driven by continuous energy pulses such that the timing of each pulse corresponds to a fixed rotational position of a facet 94(a)-(f) of rotating energy deflector 92. As the motor is pulsed, each of the facets 94(a)-(f) will sequentially come into optical communication with solidification energy source 90, and the particular facet that is in optical communication with solidification energy source 90 will have a fixed rotational position that corresponds to the timing of the pulse.

In certain implementations, the rotational position of rotating energy deflector 92 may repeatably correspond to the timing of each motor energy pulse without being known by the operator. The fixed association of the motor energy pulse and the rotational position of the facets 92a-92f allows the motor pulse timing to be used to synchronize the transmission of a synchronization solidification energy signal from solidification energy source 90 so that a synchronization solidification energy signal is issued for each facet 94(a)-(f) at some defined rotational position while it is in optical communication with solidification energy source 90.

As mentioned previously, laser scanning micromirrors may be used as a scanning device in certain exemplary implementations of linear scanning device 88. Suitable laser scanning micromirrors include magnetically-actuated MOEMS (micro-opto-electromechanical systems) micromirrors supplied under the name LSCAN by Lemoptix SA of Switzerland. A linear scanning micromirror comprises a silicon chip with a fixed part and a movable mirror part. The mirror is electrically or magnetically actuated to tilt relative to the fixed part to a degree that corresponds to the actuating signal. As the mirror tilts, received solidification energy is scanned via deflection from the tilting mirror. Thus, the degree of tilt or tilt angle corresponds to the position along the scanning (y) axis at which the deflected solidification energy strikes the surface of the solidifiable material.

In certain preferred examples, and as shown in FIG. 1B, a lens 98 is provided between the rotating energy deflector 92 and a bottom surface of housing 96 to focus deflected solidification energy and transmit it toward the solidifiable material. In the example of FIG. 1B, lens 98 is preferably a flat field lens. In certain examples, the lens 98 is a flat field lens that is transparent to violet and ultraviolet radiation. In additional examples, the lens 98 also has a focal distance that is longer on the ends of the lens relative to the middle (referring to the y-axis scanning direction along which the lens length is oriented) to compensate for different solidification energy beam travel distances from the rotating energy deflector 92 to the solidifiable material. In certain implementations, lens 98 includes an anti-reflective coating such that the coated lens transmits at least 90%, preferably at least 92%, and more preferably at least 95% of the incident light having a wavelength ranging from about 380 nm to about 420 nm. In one example, lens 98 transmits at least about 95% of the incident light having a wavelength of about 405 nm. Suitable coatings include single layer, magnesium difluoride ($MgF_2$) coatings, including ARSL0001 MgF2 coatings supplied by Siltint Industries of the United Kingdom.

Housing 96 also includes a substantially linear opening 100 (e.g., a slit) through which light is projected to rigid or semi-rigid solidification substrate 68 and onto the solidifiable material. The substantially linear opening 100 has a length that is oriented along the y-axis and remains generally orthogonal to the travel (x) axis even if the scanning axis is oriented non-orthogonally with respect to the travel axis.

Referring to FIG. 1C, an alternate embodiment of linear solidification device 88 of FIGS. 1A and B is depicted. In FIG. 1C, housing 96 is removed. As shown in the figure, solidification energy source 90 is in optical communication with one facet 94(a)-(f) of rotating energy deflector 92 at any one time as rotating energy deflector 92 rotates in the y-z plane (i.e., the plane orthogonal to the travel axis direction of linear solidification device 88). In this embodiment, one or more solidification energy focusing devices is provided between solidification energy source 90 and rotating energy deflector 92. In the example of FIG. 1C, the one or more focusing devices comprises a collimator 320 and a cylindrical lens 322.

Collimator 320 is provided between solidification energy source 90 and cylindrical lens 322. Cylindrical lens 322 is provided between collimator 320 and rotating energy deflector 92. Collimator 320 is also a focusing lens and creates a round shaped beam. Cylindrical lens 322 stretches the round-shaped beam into a more linear form to allow the beam to decrease the area of impact against rotating energy deflector 92 and more precisely fit the beam within the dimensions of one particular facet 94(a)-(f). Thus, solidification energy transmitted from solidification energy source 90 passes through collimator 320 first and cylindrical lens 322 second before reaching a particular facet 94(a)-(f) of rotating energy deflector 92.

In certain preferred examples, collimator 320 and/or cylindrical lens 322 transmit at least 90%, preferably at least 92%, and more preferably at least 95% of the incident light having a wavelength ranging from about 380 nm to about 420 nm. In one example, collimator 320 and cylindrical lens 322 transmit at least about 95% of the incident light having a wavelength of about 405 nm. In the same or other examples, solidification energy source 90 comprises a laser diode having a beam divergence of at least about five (5) milliradians, more preferably at least about six (6) milliradians, and sill more preferably at least about 6.5 milliradians. At the same time or in other examples, the beam divergence is no more than about nine (9) milliradians, preferably no more than about eight (8) milliradians, and still more preferably not more than about 7.5 milliradians. In one example, the divergence is about 7 milliradians. Collimator 320 is preferably configured with a focal length sufficient to collimate light having the foregoing beam divergence values. Collimator 320 is preferably configured to receive incident laser light having a "butterfly" shape and convert it into a round beam for transmission to cylindrical lens 322.

In certain examples, collimator 320 has an effective focal length that ranges from about 4.0 mm to about 4.1 mm, preferably from about 4.0 mm to about 4.5 mm, and more preferably from about 4.01 mm to about 4.03 mm. In one example, collimator 320 is a molded glass aspheric collimator lens having an effective focal length of about 4.02 mm. One such collimator 320 is a Geltech™ anti-reflective coated, molded glass aspheric collimator lens supplied as part number 671TME-405 by Thorlabs, Inc. of Newton, N.J. This collimator is formed from ECO-550 glass, has an effective focal length of 4.02 mm, and has a numerical aperture of 0.60.

In certain examples, collimator 320 and/or cylindrical lens 322 are optimized based on the specific wavelength and beam divergence characteristics of solidification energy source 90. In one example, collimator 320 and/or cylindrical lens 322 are formed from a borosilicate glass such as BK-7 optical glass. In certain preferred examples, collimator 320 and/or cylindrical lens 322 are coated with an anti-reflective coating such that the coated collimator 320 and coated cylindrical lens 322 transmit at least 90%, preferably at least 92%, and more preferably at least 95% of the incident light having a wavelength ranging from about 380 nm to about 420 nm. Suitable anti-reflective coatings include magnesium difluoride ($MgF_2$) coatings such as the ARSL0001 MgF2 coating supplied by Siltint Industries of the United Kingdom.

In certain examples of a linear solidification device 88, the solidification energy defines a spot (which may or may not be circular) at the point of impingement on the solidifiable material. The angle of incidence between the solidification energy and the solidifiable material will vary with the rotational position of a given facet 94(a)-(f) relative to the solidification energy source 90. The spot dimensions and shape will also tend to vary with the angle of incidence. In some cases, this variation in spot size and/or spot dimensions can produce uneven solidification patterns and degrade the accuracy of the object building process. Thus, in certain examples, one or more lenses are provided between rotating energy deflector 92 and the solidifiable material to increase the uniformity of the spot size and/or dimensions as the rotational position of rotating energy deflector 92 changes. In certain examples, the one or more lenses is a flat field lens 98 (FIGS. 1A and 1B). In other examples (FIG. 1C), the one or more lenses is an F-Theta lens (328 or 330). In other examples, and as also shown in FIG. 1C, the one or more lenses is a pair of F-Theta lenses 328 and 330. The F-Theta lenses 328 and 330 are spaced apart from one another and from the rotating energy deflector 92 along the z-axis direction (i.e., the axis that is perpendicular to the scanning axis direction and the travel axis direction of linear solidification device 88). First F-Theta lens 328 is positioned along the build (z) axis direction between second F-Theta lens 330 and rotating energy deflector 92. Second F-Theta lens 330 is positioned along the build axis direction between first F-Theta lens 328 and the solidifiable material (as well as between first F-Theta lens 328 and light opening 100, not shown in FIGS. 1C-D).

First F-Theta lens 328 includes an incident face 334 and a transmissive face 336. Incident face 334 receives deflected solidification energy from rotating energy deflector 92. Transmissive face 336 transmits solidification energy from first F-Theta lens 328 to second F-Theta lens 330. Similarly, second F-Theta lens 330 includes incident face 338 and transmissive face 340. Incident face 338 receives solidification energy transmitted from transmissive face 336 of first F-Theta lens 338, and transmissive face 340 transmits solidification energy from second F-Theta lens 330 to housing light opening 100 (not shown in FIG. 1C) and to the solidifiable material.

In certain implementations of the linear solidification device of FIG. 1C, first F-Theta lens 328 has a refractive index that is less than that of second F-Theta lens 330. The relative difference in refractive indices helps reduce laser beam scattering losses. At the same time or in other implementations, the radius of curvature of first F-Theta lens transmissive face 336 is less than the radius of curvature of second F-Theta lens transmissive face 340. Suitable pairs of F-Theta lenses are commercially available and include F-Theta lenses supplied by Konica Minolta and HP. In certain embodiments, the F-Theta lenses 328 and 330 are preferably coated with an anti-reflective coating. The anti-reflective coating is used to maximize the amount of selected wavelengths of solidification energy that are transmitted through F-Theta lenses 328 and 330. In one example, the anti-reflective coating allows the coated F-Theta lenses 328 and 330 to transmit greater than 90 percent of the incident solidification energy having a wavelength between about 325 nm and 420 nm, preferably greater than 90 percent of the incident solidification energy having a wavelength between about 380 nm and about 420 nm, more preferably greater than about 92 percent of the incident solidification energy having a wavelength between about 380 nm and about 420 nm, and still more preferably greater than 95 percent of the incident solidification energy having a wavelength between about 380 nm and about 420 nm. In one specific example, the coated F-theta lenses transmit at least about 95% of the incident light having a wavelength of about 405 nm (i.e., blue laser light). In other preferred embodiments, collimator 320, and cylindrical lens 322 are also coated with the same anti-reflective coating. Suitable anti-reflective coatings include magnesium difluoride (MgF2) coatings such as the ARSL001 coating supplied by Siltint Industries of the United Kingdom.

In certain examples, linear solidification device 88 may comprise multiple solidification energy sources. In some implementations, the linear solidification device 88 may include multiple solidification energy sources that provide solidification energy of the same wavelength, and the device 88 may transmit a single beam of solidification energy to the solidifiable material. In other implementations, the device 88 may include solidification energy sources of different wavelengths and selectively transmit solidification energy of only one of the wavelengths to a solidifiable material at a time. This implementation may be particularly useful when a three-dimensional object is built using multiple solidifiable materials each of which solidifies in response to solidification energy of different wavelengths (e.g., because their photoinitiators are activated by different wavelengths of solidification energy).

Figure 1D:
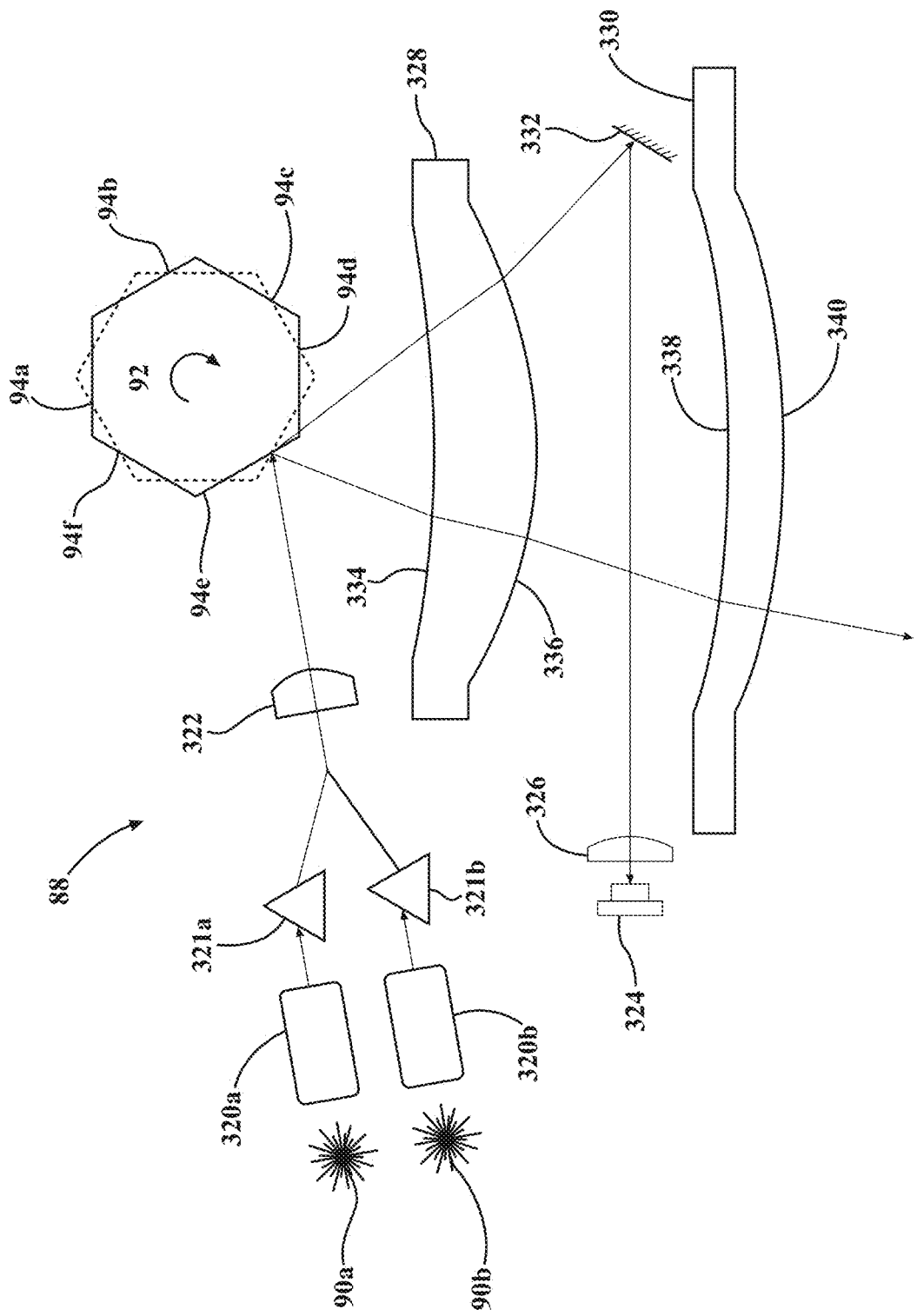
FIG. 1D is a schematic view of a second alternate version of the linear solidification device of FIG. 1A in which the housing is removed and which includes dual solidification energy sources and a solidification energy sensor.

Referring to FIG. 1D, an alternate version of linear solidification device 88 (with the housing removed) is depicted in schematic form. The linear solidification device 88 is the same as the one depicted in FIG. 1C with two exceptions. First, the linear solidification device 88 of FIG. 1D includes two solidification energy sources 90a and 90b. In the specific embodiment of FIG. 1D, solidification energy sources 90a and 90b transmit solidification energy of substantially the same wavelength. In some cases, the use of such multiple solidification energy sources 90a, 90b is desirable in order to increase the power of the solidification energy transmitted to the solidifiable material. The power of the solidification energy can affect the rate of solidification, which in turn may limit the maximum speed of travel of the linear solidification device 88 in the travel axis (x-axis) direction. In order to solidify, for example, a given volume of a solidifiable resin, the volume must receive sufficient solidification energy (e.g., in Joules). The solidification energy received by a given volume of solidifiable material is a function of the power (e.g., in Watts) of the solidification energy and the time of exposure of the volume of solidifiable material. As a result, as the power is reduced, the rate of travel of the linear solidification device 88 must be reduced to ensure that sufficient solidification energy is received at each location along the direction of travel (i.e., x-axis) of linear solidification device 88. Put differently, at a desired solidification depth in the build axis (z-axis) direction, increasing the power of the solidification energy increases the rate at which the linear solidification device 88 can be traversed in the travel axis (x-axis) direction, and hence, the speed of an object build process. In certain exemplary systems of making a three-dimensional object described herein, a solidification power control system (FIGS. 29 and 31) is provided to regulate the solidification power delivered to the solidifiable material and the depth of solidification.

The second difference between the linear solidification devices 88 of FIGS. 1C and 1D is the inclusion of prisms 321a and 321b in FIG. 1D. The linear solidification device 88 of FIG. 1D is intended to combine solidification energy from both sources 90a and 90b into a single beam for delivery to the solidifiable material. The single beam preferably has a power that is at least 1.5 times, preferably at least 1.7 times, and more preferably at least 1.95 times the average power of the individual solidification energy sources 90a and 90b. Each solidification energy source 90a and 90b transmits its respective solidification energy to a respective prism 321a and 321b. The prisms 321a and 321b receive incident solidification energy at a first angle and deflect the energy to produce transmitted solidification energy beams at a second (different) angle that allows the individual beams to be combined in a single beam. It is believed that the individual beams combine ahead of cylindrical lens 322, after which the solidification energy is received by rotating energy deflector 92 and ultimately transmitted to the solidifiable material in the same manner described previously with respect to FIG. 1C.

In certain examples, the shape information about the object being built is provided as three-dimensional object shape information that mathematically defines the shape of the object in three-dimensional space. The three-dimensional object data is then sliced or subdivided into object layer data preferably along a dimension that corresponds to a build axis. The build axis refers to an axis along which an object is progressively built and in the examples described herein is typically referred to as the "z-axis.". The object layer data may comprise information that mathematically defines the shape of the object in a plane orthogonal to the build axis. Thus, in one example wherein the build axis is referred to as the z-axis, each set of object data layer may comprise x and y coordinates that define the shape of the object cross-section at a given z-axis position. Exemplary methods of providing and using object data to drive the solidification process are described further below.

In accordance with certain implementations of the three-dimensional object manufacturing processes and apparatuses described herein, a method of representing object data for use in controlling the action of linear solidification device 88 is illustrated in FIGS. 9, 10, and 11A-11G. Typical file types used to generate object data include STL (Stereo Lithography) files or other CAD (Computer Aided Drafting) files commonly translated for rapid prototyping systems into formats such as SLC, CLI slice data files or voxelized data files which may include data formats such as BMP, PNG, etc. However, any data input type may be used and converted internally to create the object data used by the linear solidification device 88. The object data corresponds to the energy pattern supplied by linear solidification device 88 and may be generated by a control unit or by an external source or device (e.g., a network or storage device).

Figure 9:
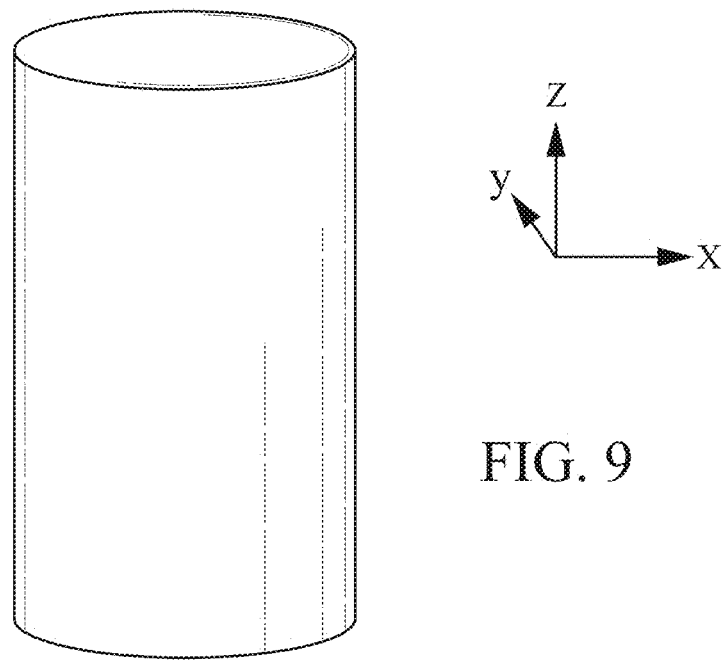
FIG. 9 is a graphical representation of three-dimensional object data for use in illustrating a method of making a three-dimensional object using a linear solidification device.
Figure 10:
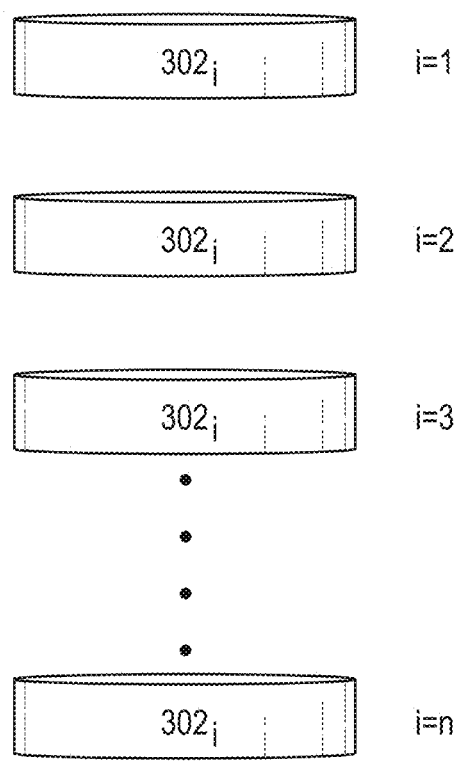
FIG. 10 is a graphical representation of sliced data representative of the three-dimensional object of FIG. 9.

As an exemplary three-dimensional object, a simple cylinder 300 is shown in FIG. 9. Locations on or within the cylinder can be characterized by x, y, and z-axes as shown. In certain linear solidification device implementations, the intensity and/or duration of solidification energy supplied at a particular x, y location cannot be controllably varied. In other implementations, varying the intensity and/or duration is undesirable, and the solidification depth is regulated. As a result, those locations in the x, y plane which receive solidification energy will solidify to substantially the same depth. In such implementations, it can be useful to perform a data "slicing" operation in which a computer representation of the three-dimensional object is sliced to create a plurality of sections in the build axis (z-axis) direction, each representing a uniform depth across at all points across the x-y plane. Each such section may mathematically correspond to or be represented by an object layer data set. One exemplary illustration of such slices is graphically depicted in FIG. 10. As shown in FIG. 10, a data representation of the object 300 can be further represented as a plurality of build axis (z-axis) slices $302_i$, wherein the total number of slices n is substantially equal to the height of the object as built divided by the depth of solidification provided by linear solidification device 88. The slices $302_i$ may be represented mathematically by object layer data sets in which each layer is defined by x, y coordinates representing its cross-sectional shape and a z-axis value representing its location along the build axis, with Δz values between adjacent slices representing the thickness of the layer.

Figure 11A:
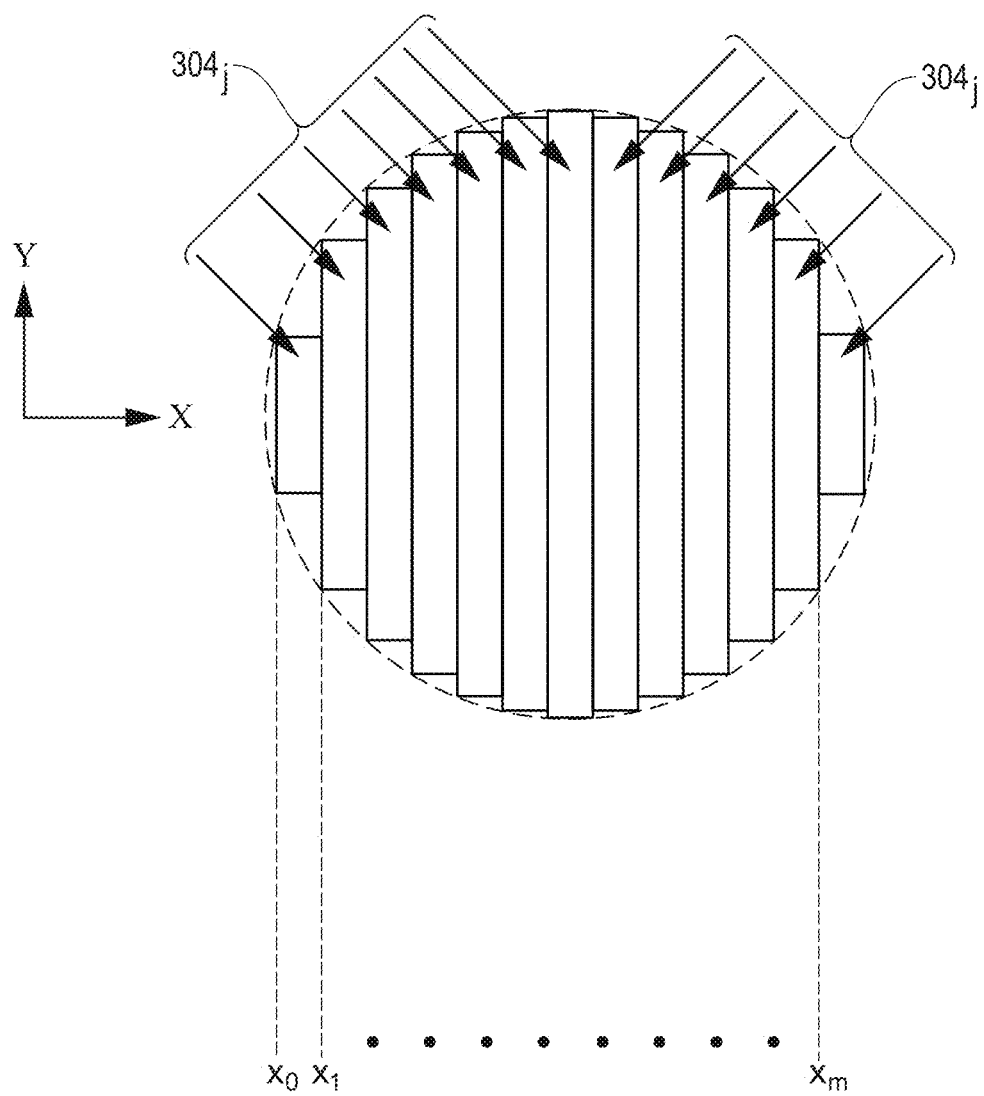
FIG. 11A is a graphical representation of object cross-section strip data corresponding to one of the slices of a three-dimensional object shown in FIG. 10.

Each object layer data set may be represented graphically as a plurality of strips having a length along the scanning axis (y-axis) direction and a width along the x-axis direction, with the strips being arranged width-wise along the x-axis direction. Referring to FIG. 11A, a view taken along the vertical (z-axis) direction of a graphical representation of an individual object data slice $302_i$ is provided. The individual slice $302_i$ may be represented as a plurality of adjacent strips $304_j$, which is represented as m strips. The dashed line is not part of the data representation, but is provided to show the generally circular shape defined by strips $304_j$. In the example of FIG. 11, the strips have a width corresponding to the travel axis (x-axis) direction of the linear solidification device 88 and length corresponding to a direction (y-axis) other than the travel axis direction. In the specific example of FIG. 11A, the strip length direction is substantially perpendicular to the x-axis direction.

Each strip $304_j$ graphically depicts a data representation (preferably provided in a form that is readable by a computer processor) of those locations of solidifiable material that will be solidified in the y-axis direction for a given x-axis location. The locations may also be defined relative to build envelope boundaries such as the scanning axis boundary 344 and the travel axis (x-axis) boundaries 343 and 345 of FIG. 11B. The control unit (not shown) receives data indicating the location of solidification energy in the travel axis (x-axis) direction, for example, as indicated by the position of linear solidification device 88 in the travel axis direction. The control unit also receives the data representation (strips 304j) and directly or indirectly associates each strip 304j with a travel axis (x-axis) position in the build envelope 342 defined within the exposed surface of the solidifiable material. Thus, a position within a strip on the data representation corresponds to a position on the exposed surface of the solidifiable material.

In FIG. 11A $x_0$ corresponds to the travel axis position of the linear solidification device 88 at which solidification will begin. The increment $x_1-x_0$ represents the width of solidification in the x-axis direction provided by linear solidification device 88. Thus, when linear solidification device is at position $x_0$, solidification energy source 90 will supply solidification energy when a facet 94a-f with which it is in optical communication has a rotational position corresponding to the y-axis locations in the build envelope 342 where the strip defined between $x_0$ and $x_1$ is present. In the illustrated embodiments of FIGS. 1A-C, the length of one facet 94(a)-(f) of rotating energy deflector 92 corresponds to the maximum scannable scanning axis dimension of the build envelope 342, i.e., the maximum length of solidification in the scanning axis direction. However, any individual strip 304j may correspond to a scanning axis solidification length less than the maximum scannable y-axis build envelope dimension.

As linear solidification device 88 moves along the travel axis (x-axis) direction of solidification substrate assembly 62, it will solidify regions of solidifiable material corresponding to each strip 304j. Each travel axis location corresponds to a particular strip 304j. In certain embodiments, a linear encoder is operatively connected to motor 76 and/or motor shaft 78 to determine the travel axis position of linear solidification device 88. The number of linear scans that can be performed within a given linear distance along the travel axis direction may depend on several variables, including the rotational speed of rotating energy deflector 92, the number of facets F on the rotating energy deflector 92, and the speed of movement of the linear solidification device 88 along the travel axis (x-axis) direction. In general, as the speed of movement of the linear solidification device 88 increases in the travel direction, the number of linear scans per unit of travel length decreases. However, as the number of facets on the rotating energy deflector 92 increases or as the rotational speed of the rotating energy deflector 92 increases, the number of linear scans per unit of travel axis length increases.

Thus, for a given build envelope travel axis (x-axis) distance L in units such as millimeters, the maximum number of line scanning operations that can be performed may be calculated as follows:

$$N_{max} = (L/S)*(RPM/60)*F \quad (1)$$

where, $N_{max}$=maximum number of line scanning operations in the x-axis direction within the build envelope;
L=desired length of the build envelope in the travel axis direction (mm);
S=speed of movement of solidification energy source in the travel axis direction (mm/sec);
RPM=rotational frequency of rotating energy deflector (revolutions/minute); and
F=number of facets on the rotating energy deflector.

Each linear scan can then be assigned a linear scan index n (which can also be called a string index when sets of data strings are used as object layer data) ranging from a value of 0 to $N_{max}-1$. Equation (1) can also be used to calculate an actual number of line scanning operations needed for a given part length in the x-axis direction. In that case, L would be the desired length of the part in the x-axis direction and $N_{max}$ would be replaced by N, which would represent the total number of line scanning operations used to form the part.

When the linear solidification device is moving at a constant speed S in the travel axis (x-axis) direction, a motor movement parameter such as a number of motor steps for motor 76 may be correlated to the build envelope length L and used to define a variable W which equals a number of motor steps/L. The microcontroller unit can then use the number of motor steps to indirectly determine the number of a linear scan (or string index as described further herein) position of the linear solidification device within the build envelope in accordance with the following equation:

$$\text{scan index } n = ((\text{number of steps from boundary})/[(W)(S)])*(RPM/60)*F \quad (2)$$

In equation (2), the number of steps from the boundary refers to the number of motor steps counted starting at build envelope boundary 343 (FIG. 11B) and moving from left to right or starting at build envelope boundary 345 (FIG. 11B) and moving from right to left. A particular three-dimensional object layer having a length may be formed by a number of linear scans performed within build envelope 342.

In certain examples, the host computer will assign scan index numbers or string data index numbers by scaling the part to the build envelope size and assigning a scan index number n based on the total number of possible scans $N_{max}$ in the build envelope 342. The scan index numbers n will then be correlated to a number of motor steps as set forth in equation (2). This relationship depends, in part, on the accuracy of the value W which is the ratio of the number of steps required for the linear solidification device 88 to traverse the build envelope length L (FIG. 11B) divided by L. As explained below, in some cases, W may deviate from the value predicted by geometry of the mechanical devices used to move the linear solidification device 88 (i.e., the value predicted by the gear ratio for motor 76, the rotational speed of motor 76, and the pulley diameter of pulleys 82a and 82b). In that case, it may be desirable to adjust the value of W to account for the deviation from the predicted value.

Figure 11B:
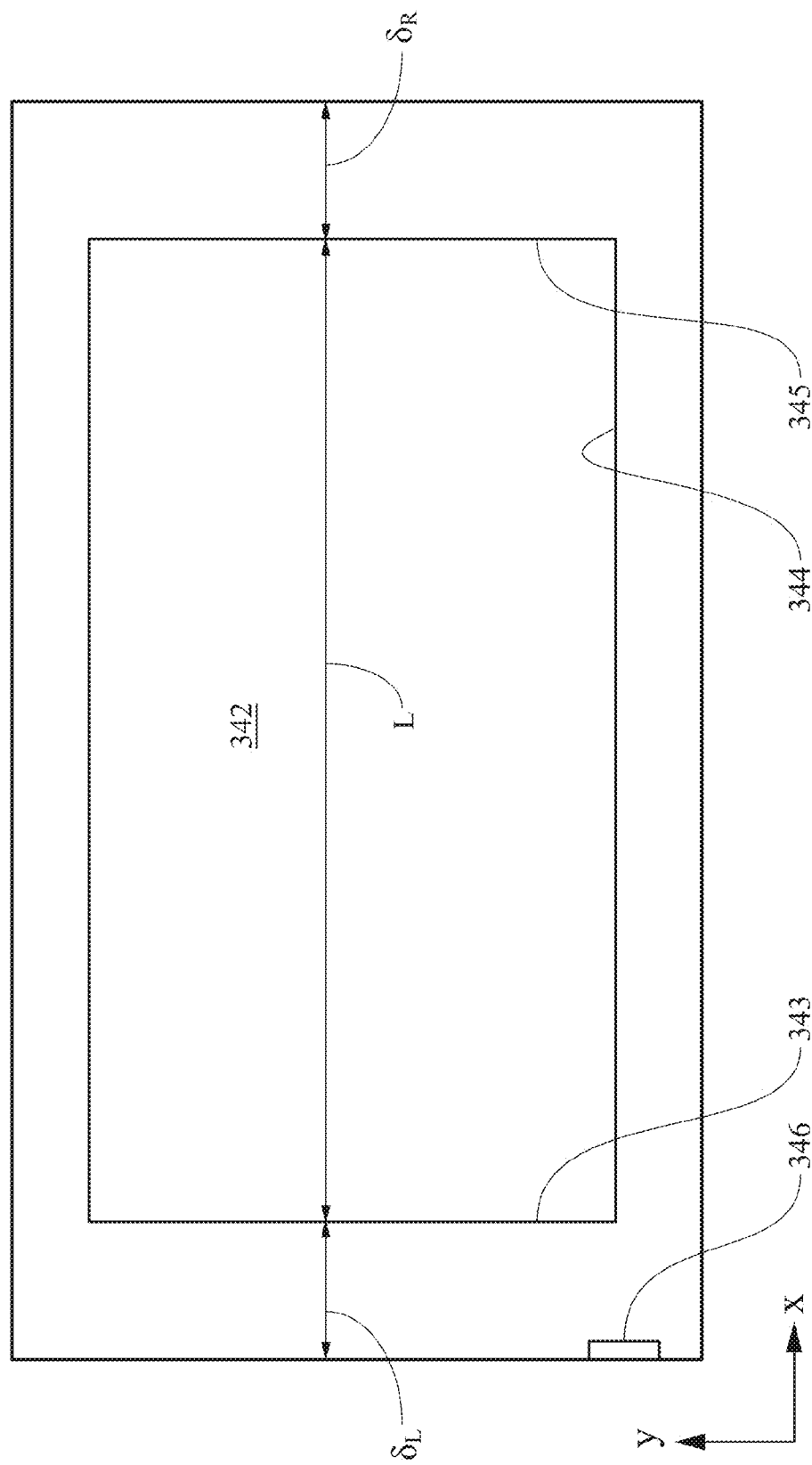
FIG. 11B is a top plan view of a source of solidifiable material comprising a build envelope and lateral offset regions.
Figure 11C:
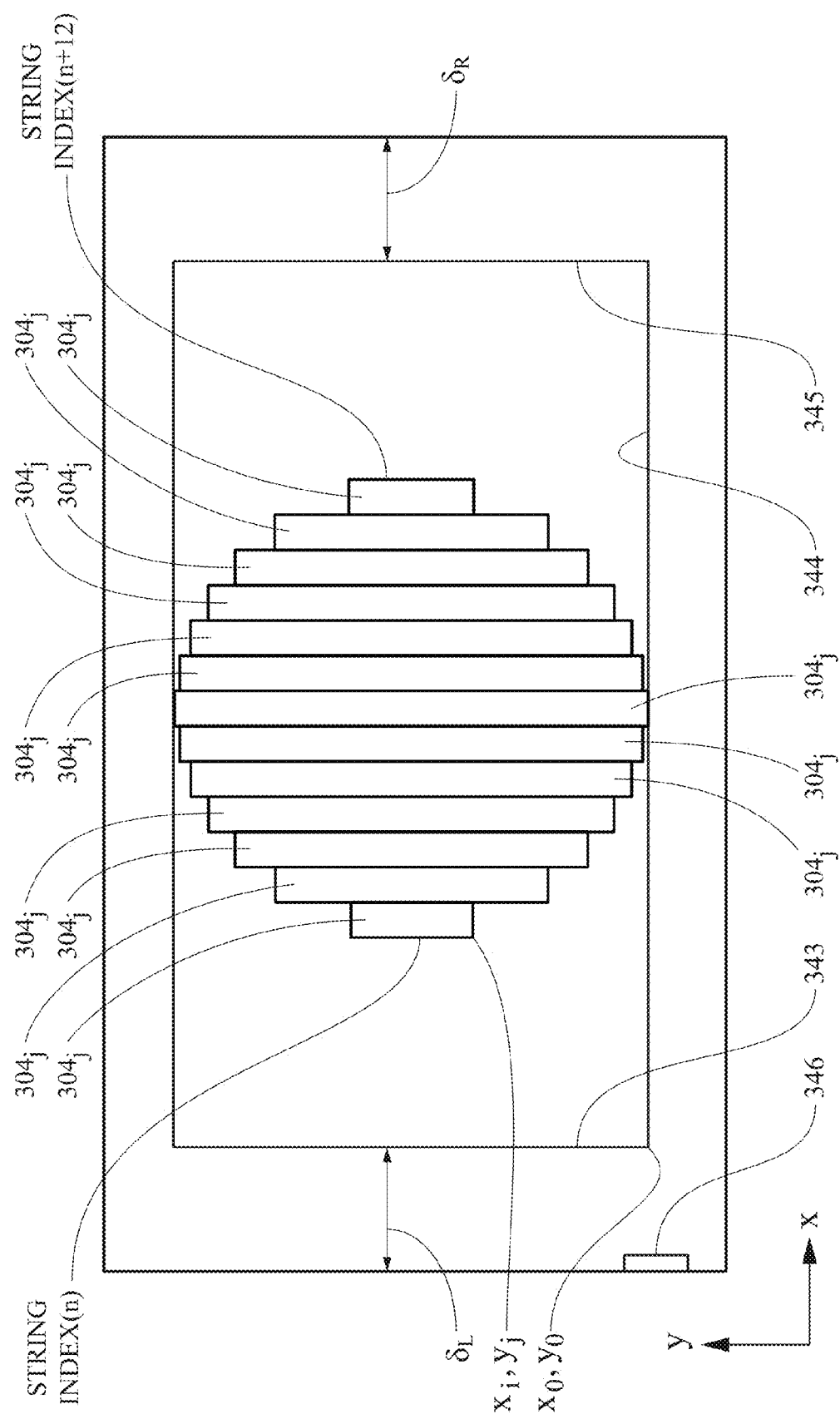
FIG. 11C is a top plan view of the source of solidifiable material of FIG. 11B with the object cross-section strip data of FIG. 11A mapped onto the build envelope.

The object layer data that is graphically illustrated in FIG. 11A may be mapped onto a build envelope 342 as shown in FIG. 11C. Each strip 304j may be defined by an x coordinate (or x-coordinate pairs) and one or more y-coordinates which define the regions of solidification at the particular travel axis (x-axis) location. In the example of FIGS. 11A-D, it is assumed that the scanning axis is orthogonal to the travel axis. Methods for modifying the object data when the scanning axis is oriented at a non-orthogonal angle with respect to the travel axis are described below.

In certain examples, each strip 304j may be represented by a corresponding set of data strings. In a preferred embodiment, the data strings comprise a set of time values. In another preferred embodiment, the data strings comprise a string number n and a set of time values. In certain cases, the string number n corresponds to a linear scan number. For example, using formula (1) described previously a maximum number of linear scans ($N_{max}$) may be calculated for a build envelope length L and each linear scan will have a corresponding string index number associated with it. For any particular object layer, regions of the build envelope 342 along the travel axis (x-axis) direction may not be solidified and may not be scanned. Nevertheless, all regions at which a unique linear scan may occur in the travel axis (x-axis) direction may be assigned a string number. Thus, for a given speed of motor 76, a given number of facets F of a rotating energy deflector 92 and a given rotational speed of rotating energy deflector 92, there will be a maximum number of linear scans $N_{max}$ within build envelope 342 and a corresponding number of sets of data strings, each of which may or may not have actual scan data (object data) in it, depending on whether any scanning is to occur at its corresponding travel axis (x-axis) location. In the example of FIG. 11C, thirteen linear scans are used to form the object layer represented by strips 304j and each linear scan corresponds to a linear scan index ranging from n to n+12 and a unique set of string data having a string index ranging from n to n+12.

Figures 11D, 11E:
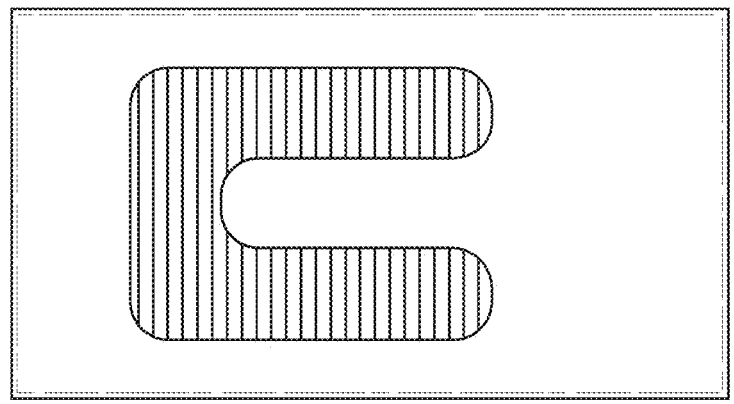
FIG. 11D is a table depicting exemplary sets of data strings which correspond to the object cross-sectional strip data of FIG. 11C.
FIG. 11E is an exemplary graphical representation of object cross-sectional strip data mapped onto a build envelope used to illustrate a method of making adjacent layers of a three-dimensional object using a linear solidification device.

FIG. 11D provides a table that illustrates exemplary sets of data strings that correspond to the object strips shown in FIG. 11C. The string indices begin with n=0 at the left-hand border ($x_0$) of build envelope 342 and end at a maximum string number $N_{max}$ at the right hand border of the build envelope 342. Thus, certain sets of data strings will not have any object data associated with them because they do not correspond to x-axis locations where solidification where occur. In FIG. 11D no solidification occurs prior to string index n=20 and no solidification occurs after the string index n+12. Thus, there are no entries in the table of FIG. 11D for the x-axis locations at which no solidification occurs within build envelope 342.

Each set of data strings depicted in FIG. 11D has a start code which is represented in hexadecimal notation by a series of eight Fs. Going from left to right, the string index n for the data string is next. Following the string index a series of time values is provided. Each time value represents a solidification energy source state event indicative of a change in the energization state of the solidification energy source. In one example, the energization states are ON or OFF. The time values may take a variety of forms. However, in one implementation they are defined as elapsed times of a CPU clock in microcontroller unit used to operate the system for making a three-dimensional object. In one example, the CPU has a clock speed of 66 MHz and the units of time are CPU ticks. In an example where the line scanning speed is 1000 lines per second, the maximum scan length of each line in the scanning axis (y-axis direction) corresponds to 66,000 ticks. Thus, the set of string data at n=20 indicates that the solidification energy source 90 will be activated at 22000 ticks and deactivated at 44000 ticks. The set of string data at n=21 indicates that solidification energy source 90 will be activated at 20000 ticks and deactivated at 46000 ticks. In a preferred embodiment a timer is provided (such as a software timer programmed into the microcontroller unit) which is reset at the beginning of each linear scan, and the beginning of each linear scan is synchronized to the build envelope scanning axis boundary 344 using sensor 324 of FIG. 11C in the manner described previously. Thus, the ticks are defined relative to a zero starting time when the timer is reset at which point the line scanning operation is at the scanning axis boundary 344 (FIG. 11B).

In certain examples, a host computer transmits sets of data strings to a microcontroller unit that operates the system for producing a three-dimensional object for each possible linear scan (i.e., for each string ranging from 0 to $N_{max}$-1) even though some of the sets of data strings may have no object data (e.g., no CPU tick values) associated with them because no solidification occurs at the x-axis location to which they correspond. While this technique may be used, it consumes excess microcontroller unit processor capacity involved in reading data strings corresponding to x-axis locations at which no solidification occurs. Accordingly, in certain examples, only data strings containing object solidification data (e.g., CPU tick values) are transmitted to the microcontroller unit. In such cases it is convenient to define a computer memory index m having values ranging from 0 to one less than the maximum number of transmitted sets of data strings $M_{max}$, where m uniquely identifies each set of string data transmitted to the microcontroller unit. In the example of FIG. 11D, there are a total of $N_{max}$ sets of string data defined for the entire build envelope 342 by the host computer. However, only 13 sets of string data include any object solidification data. Therefore, assuming that linear solidification device 88 is moving from left to right in FIG. 11C, the first data string transmitted by the host computer to the microcontroller unit will have a computer memory index of m=0 and a string index n of 20. The value of the string index n will correspond to a specific location along the x-axis within build envelope 342. However, the computer memory index m will not necessarily so correspond. Thus, the microcontroller unit need only read 13 data strings instead of $N_{max}$-1 data strings.

FIGS. 11B and C depict a top view (i.e., a view along the build axis) of a region of solidifiable material which includes a build envelope 342. The build envelope defines the maximum area of solidification, and therefore, the maximum area of the three-dimensional object in the x-y plane. As shown in FIGS. 11B and 11C, in certain cases the linear solidification device 88 is movable in the travel axis (x-axis) direction along a total distance that equals the sum of a build envelope 342 length distance L and two offset distances, $\delta_L$ and $\delta_R$. The offset distances $\delta_L$ and $\delta_R$ respectively represent the distance from the left end-of-travel (EOT) position of linear solidification device 88 to the left-hand side build envelope boundary 343 and the distance from the right-hand side EOT position to the right-hand side build envelope boundary 345. In certain examples, the offset distances, $\delta_L$ and $\delta_R$ are provided to ensure that the linear solidification device 88 has time to achieve a substantially constant speed in the travel axis (x-axis) direction before any solidification of solidifiable material will begin (i.e., before build envelope 342 is reached). In certain examples, the movement of the linear solidification device 88 at a constant travel axis (x-axis) speed avoids the necessity of directly measuring the travel axis (x-axis) position at any given moment because it allows a motor movement parameter for motor 76 to provide an indirect indication of travel axis (x-axis) position. In one particular example suitable for servo and stepper motors, the motor movement parameter is a number of motor steps. In certain examples, $\delta_L$ and $\delta_R$ are equal.

In certain examples, as rotating energy deflector 92 rotates, solidification energy source 90 will selectively project light in accordance with data that represents the object being built. At a given location in the travel axis (x-axis) direction, some y-axis locations may be solidified and others may not, depending on the shape of the object being built.

One way of selectively projecting light to the solidifiable material is to selectively activate the solidification energy source 90 depending on the travel axis (x-axis) location of the linear solidification device and the rotational position of the facet 94a-f that is in optical communication with the solidification energy source 90. While each facet 94a-94f will have a full range of locations along its length at which solidification energy may be received from solidification energy source 90, it will not necessarily be the case that each such facet location will receive solidification energy during any individual scan performed by that facet. Thus, by (directly or indirectly) coordinating the activation of solidification energy source with the rotational position of a given facet 94*a*-94*f*, solidification energy can be selectively provided to only those locations along the scanning axis where solidification is desired.

As indicated previously, the systems for making a three-dimensional object described herein may include a control unit, such as a microcontrol unit or microcontroller, which contains locally stored and executed programs for activating motors 76 (FIG. 2) and 118 (FIG. 1A) and moving a build platform (not shown), as well as for selectively activating solidification energy source 90. In certain examples, the systems include a host computer that processes three-dimensional object data into a format recognized by the microcontroller unit and then transmits the data to the microcontroller for use by the microcontroller unit's locally stored and executed programs. As used herein, the term "microcontroller" refers to a high-performance, programmable computer memory system used for special tasks. In certain examples, the microcontrollers described herein include an integrated circuit chip having a microprocessor, a read only memory (ROM), interfaces for peripheral devices, timers, analog to digital and digital to analog converters, and possibly other functional units.

In certain examples, a linear solidification controller (not shown) selectively activates and deactivates linear solidification device 88, at least in part, based on the position of linear solidification device 88 in the travel axis (x-axis) direction. The position may be directly detected or may be indirectly determined by other variables (e.g., a number of motor steps). In one implementation discussed further below, an end of travel sensor 346 (FIGS. 11B and C) is used along with a motor movement parameter to indirectly determine the travel axis (x-axis) position.

In one implementation, the linear solidification controller is a microcontroller or solidification energy source controller (not shown) which is operatively connected to solidification energy source 90 to change the energization state of solidification energy source 90 by selectively activating and deactivating it. In additional examples, the controller selectively activates the solidification energy source 90, at least in part, based on shape information about the three-dimensional object being built. In further examples, the controller selectively activates the solidification energy source based on the position of linear solidification device 88 along the travel axis (x-axis) direction (or based on another variable that correlates to the position such as a number of motor steps for motor 76) and based on shape information about the object being built which varies with the travel axis (x-axis) position. On a given exposed surface of solidifiable material, the specific x, y locations that will receive the solidification energy will be dependent on the y-axis profile of the object being built at the given travel axis (x-axis) location of solidification energy source 90 and rotating energy deflector 92. In further examples, a laser scanning micromirror selectively deflects solidification energy in linear patterns to perform a linear scanning operation.

Typical control systems, including microcontrollers, will have a built in lag time between the time when solidification data is read and when solidification energy source 90 is toggled to either an activated or deactivated condition. The lag time may be variable and may cause errors in the dimensions of the three-dimensional object being built. In one example, a microcontroller is provided with the systems for making a three-dimensional object disclosed herein which has a lag time of no more than about 80 nanoseconds, preferably no more than about 60 nanoseconds, and even more preferably no more than about 50 nanoseconds. The part error can be related to the toggle lag time as follows:

$$\text{Error} = (L_{BE})(RPM)(F)(t_{toggle\ lag})/(60\ \text{sec./min.})(0.001\ \text{mm/micron}) \quad (3)$$

wherein, Error is the maximum variation in the part dimensions (microns) due to the toggle lag time;

$L_{BE}$ is the build envelope distance in the y axis direction (mm);

RPM is the rotational frequency of the rotating energy deflector 92 (revolutions/minute);

F is the number of facets on the rotating energy deflector 92; and $t_{toggle\ lag}$ (seconds) is the time required for the microcontroller to toggle the state of the solidification energy source.

In certain preferred implementations, the Error is preferably no more than 90 microns, more preferably no more than about 90 microns, still preferably no more than about 70 microns, and even more preferably no more than about 50 microns.

Referring to FIG. 2, as linear solidification device 88 travels in the travel axis (x-axis) direction, in certain cases, the solidification energy will be scanned along an axis that is not parallel to the y-axis or orthogonal to the travel axis. Without wishing to be bound by any theory, it is believed that this phenomenon is attributable to either or both of two causes. First, due to manufacturing and assembly tolerances, in some cases the length of housing light opening 100 may not be oriented at exactly ninety degrees to the travel axis. Thus, even when the linear solidification device is stationary with respect to the travel axis, solidification energy may not be scanned in a direction that is exactly parallel to the y-axis and perpendicular to the travel axis. This first cause may be referred to as "static misalignment" between the scanning axis and the travel axis.

Figure 21A:
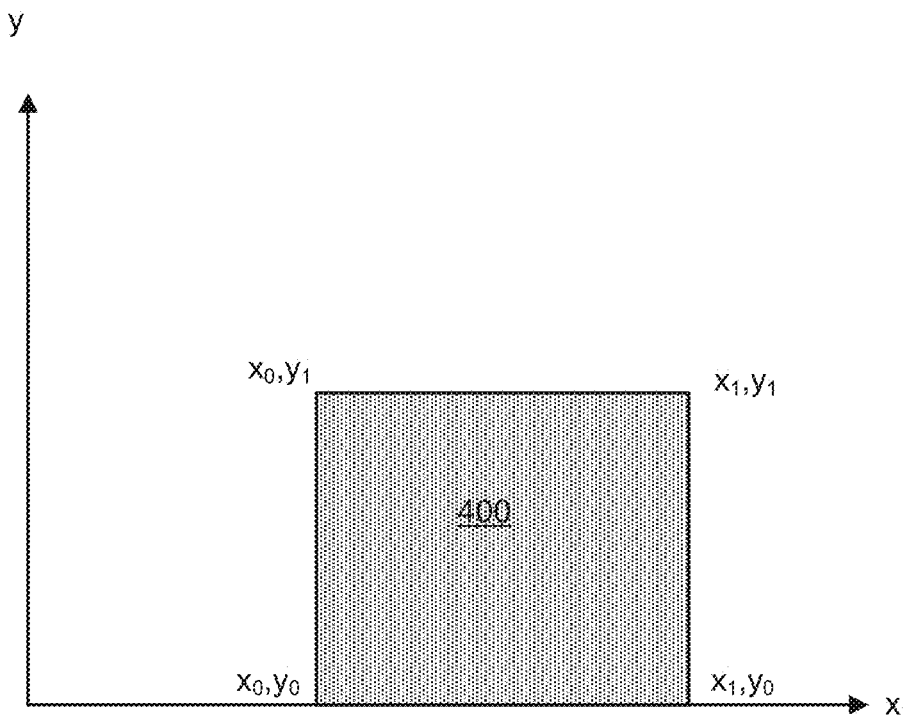
FIG. 21A is a graphical representation of object data for a first three-dimensional object mapped onto a linear solidification device travel axis and an axis perpendicular to the travel axis and viewed along a build axis.
Figure 21B:
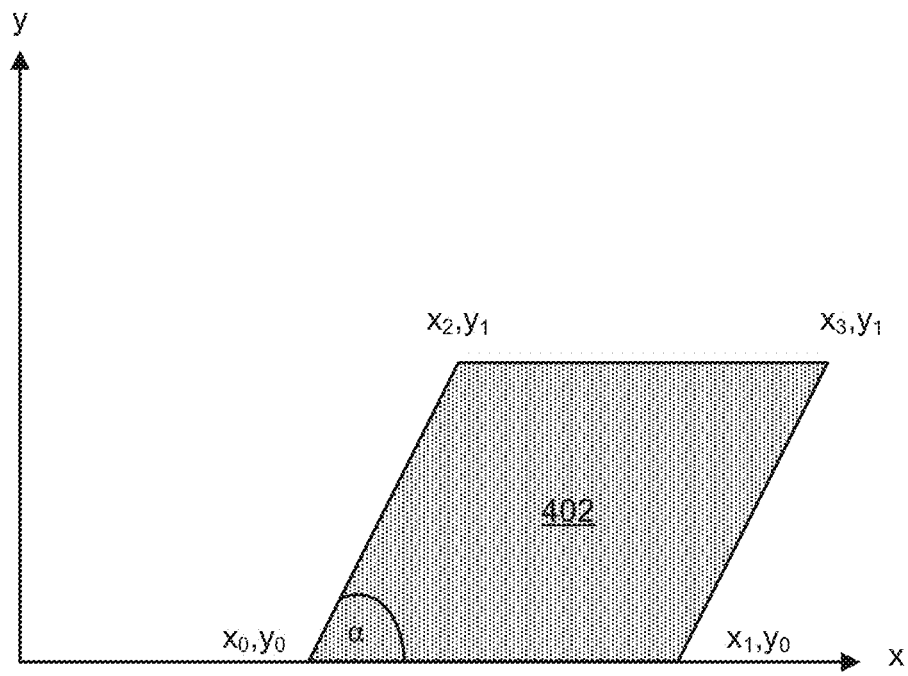
FIG. 21B is a graphical representation of the three-dimensional object of FIG. 21A following solidification with a linear solidification device having a scanning axis oriented at a non-orthogonal angle with respect to a travel axis.

A second cause of the misalignment between the scanning axis direction and the travel axis is "dynamic misalignment." As the ratio of the travel axis speed to the scanning axis speed increases, the scanning axis direction will tend to tilt away from the y-axis to define a non-orthogonal angle, a, between the scanning axis direction and the travel axis direction. This phenomenon is illustrated by FIGS. 21A-B. In FIG. 21A object data representative of a rectangular block is mapped onto a build envelope defined by x and y axes. Object 400 is a graphical depiction of the object data. Thus, the object data includes four pairs of coordinates each of which corresponds to a vertex of the object: $(x_0, y_0)$, $(x_1, y_0)$, $(x_0, y_1)$, and $(x_1, y_1)$. The object data defines right and left-hand sides that are perpendicular to the travel axis (x-axis) and parallel to the y-axis. However, because the scanning axis is not orthogonal to the travel axis, the resulting object 402 appears as shown in FIG. 21B, with the right and left hand sides tilted at a non-orthogonal angle α relative to the travel axis (x-axis).

Figure 24:
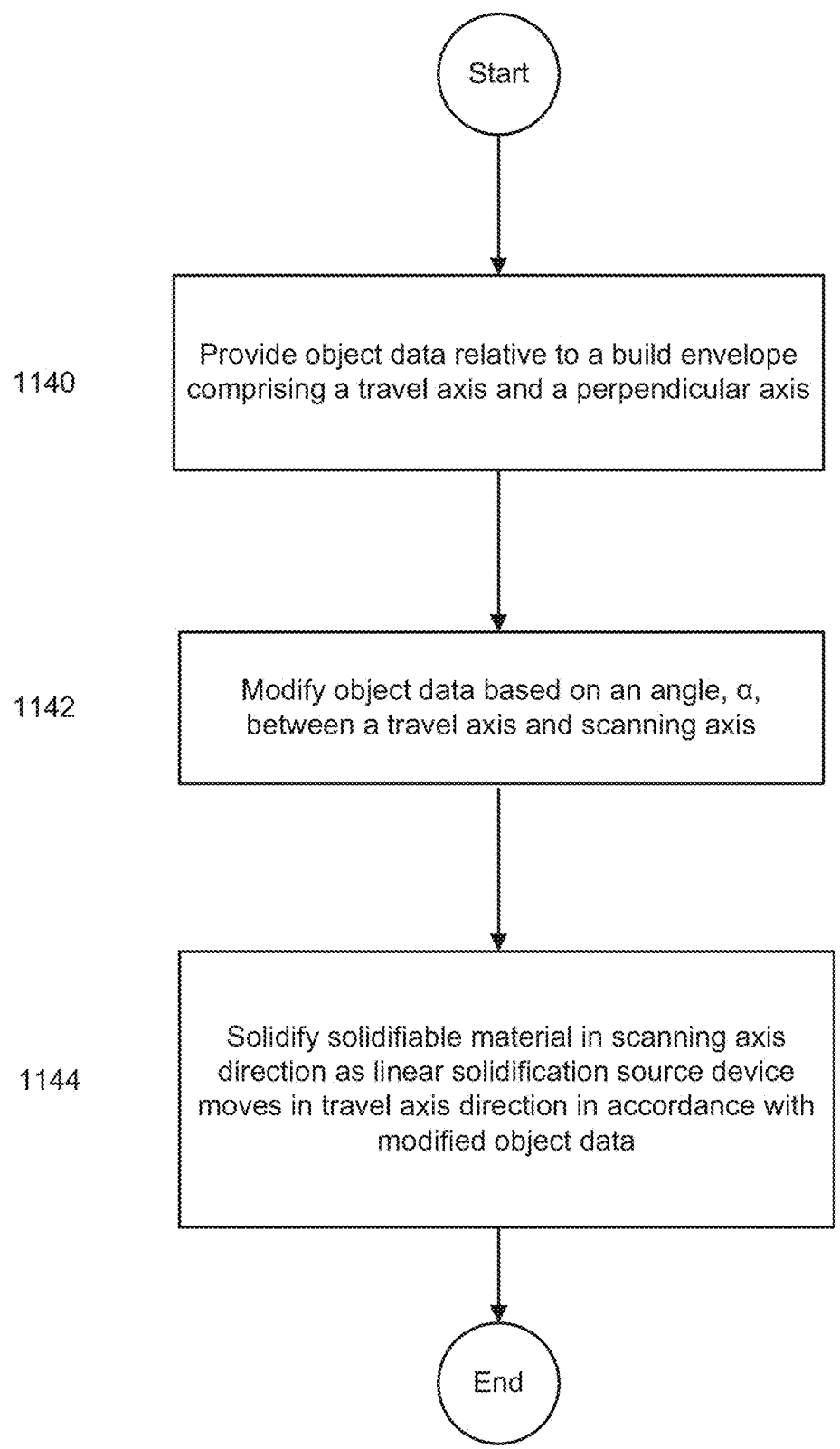
FIG. 24 is a flow chart depicting a first exemplary method of making a three-dimensional object by modifying object data to compensate for a non-orthogonal angle between a scanning axis and a travel axis.

In accordance with one method, the object data used to define the three-dimensional object is modified to compensate for the non-orthogonal angle, α. A flow chart illustrating the method is provided in FIG. 24. In certain examples, the method is embodied as a set of computer executable process instructions stored on a non-transitory computer readable medium which may perform the described method steps when executed by a computer processor. In accordance with the method, object data is provided which represents the three-dimensional object relative to a build envelope comprising a travel axis and an axis perpendicular to the travel axis (step 1140). The object data is then modified based on the non-orthogonal angle, a, between the scanning axis and travel axis of linear solidification device 88 (step 1142).

Techniques for determining the angle are described below. In step 1144 the solidifiable material is solidified in the scanning axis direction as the linear solidification device moves in the travel axis direction based on the modified object data.

Figure 21C:
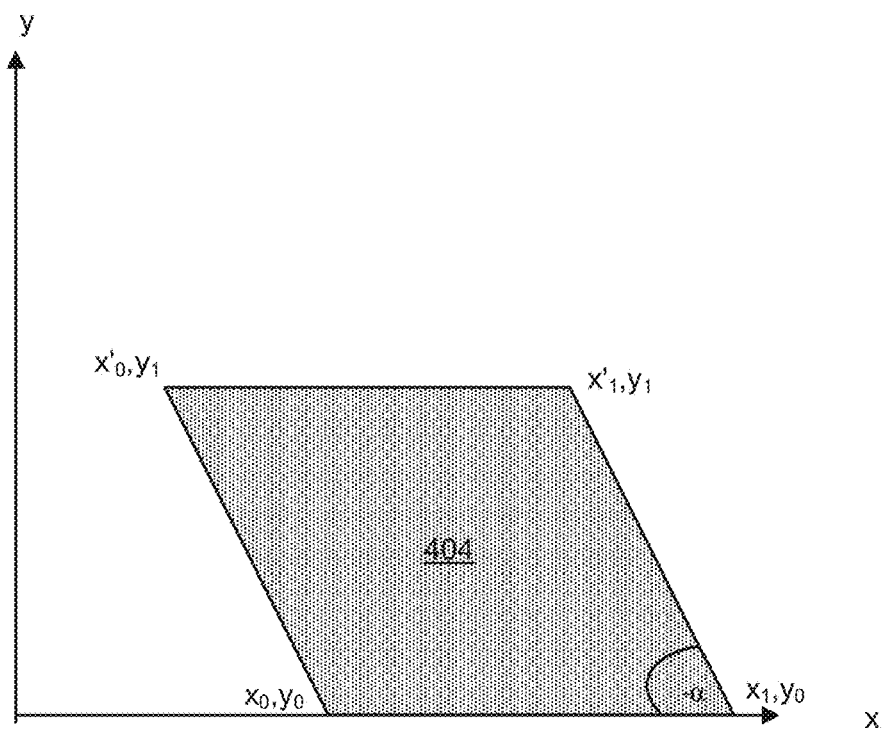
FIG. 21C is a graphical representation of sheared object data for the three-dimensional object of FIG. 21A with the object data sheared to compensate for the non-orthogonal angle between the scanning and travel axes depicted in FIG. 21B.

In one example, illustrated in FIG. 21C, the object data is modified by "shearing" (also known as "shear mapping" or "shear transformation") it in the x-y plane to compensate for the non-orthogonal angle, α, thereby yielding object data for a translated object 404. As is known to those skilled in the art, a shearing operation displaces each point linearly in a fixed direction, by an amount proportional to its signed distance from a line that is parallel to that direction. In accordance with one embodiment, certain of the coordinates $(x_i, y_i)$ are translated along the x (travel) axis based on the opposite angle, −α, of the non-orthogonal angle, α. As shown in FIG. 21C, the vertex at original coordinate $x_0, y_1$ is translated in the −x direction to a new coordinate, $(x'_0, y_1)$, and the vertex at coordinate $(x_1, y_1)$ is translated in the same direction to a new coordinate $(x'_1, y_1)$. The coordinates $(x_0, y_0)$ and $(x_1, y_0)$ are not translated. None of the y-coordinates for any of the vertices are translated.

In accordance with another example, a bounding box is defined that extends around the perimeter of the object. The bounding box is defined so that it intersects the outermost points of the object along the x and y-axes. The lowermost edge of the bounding box acts as the reference line for the shearing operation, and the extent to which any point is translated is based on its signed distance from the lowermost edge relative to the y-axis. The lowermost points of the object along the y-axis (those that intersect the lowermost edge of the bounding box) are not translated during the shearing operation. In FIG. 21A, the bounding box would be co-extensive with the object 400, and the vertices $(x_0, y_0)$ and $(x_1, y_0)$ would intersect the bounding box at its lower-most position along the y-axis. Thus, they are not translated.

Figure 21D:
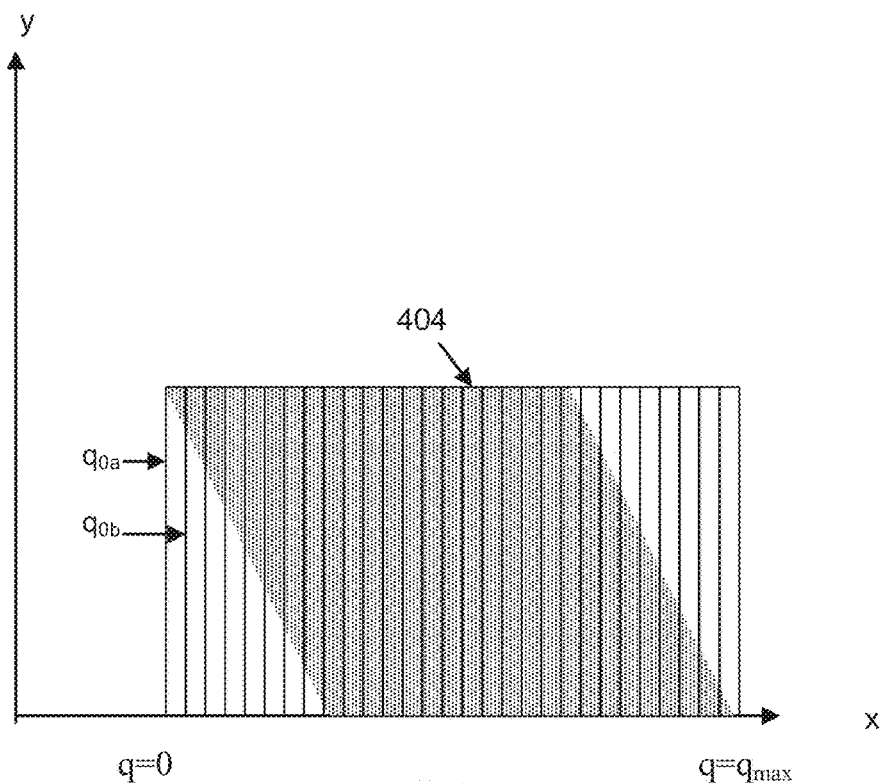
FIG. 21D is a graphical representation of object cross-sectional data strips used to define data strings based on the sheared three-dimensional object data depicted in FIG. 21C.

In FIG. 21D, the translated object data is segregated into vertically oriented, linear strips q=0 to q=$q_{max}$ to form object strip data in the same manner described previously with respect to FIG. 11A. Each of the strips intersects the object 400 at one or more locations along the y-axis, and each intersection with object data defines a solidification energy source state change event at which the energy source 90 is activated or deactivated. In certain examples, the solidification energy source state change events are converted to data strings comprising time values, for example, CPU tick values of the type shown in FIGS. 11D, 11F, and 11G. In the example of FIG. 21D, the data string corresponding to the vertical strip at q=0 would correspond to a first CPU tick value at which the energy source 90 is activated and a second CPU tick value at which the energy source 90 is deactivated. The adjacent vertical strip at q=1 would correspond to a data string with a first CPU tick value at which the energy source 90 is activated and a second CPU tick value at which the energy source 90 is deactivated. The first CPU tick value for the data string corresponding to q=0 would be greater than the first CPU tick value for the data string corresponding to q=1, while the second CPU tick values for the data strings corresponding to the strips at q=0 and q=1 would be the same. Shearing the object data for object 400 in the x-y plane based on the angle −α offsets the effect of the non-orthogonal angle α between the scanning axis and the travel axis (x-axis) to yield a final object that conforms to the object data for object 400 shown in FIG. 21A.

Figure 22:
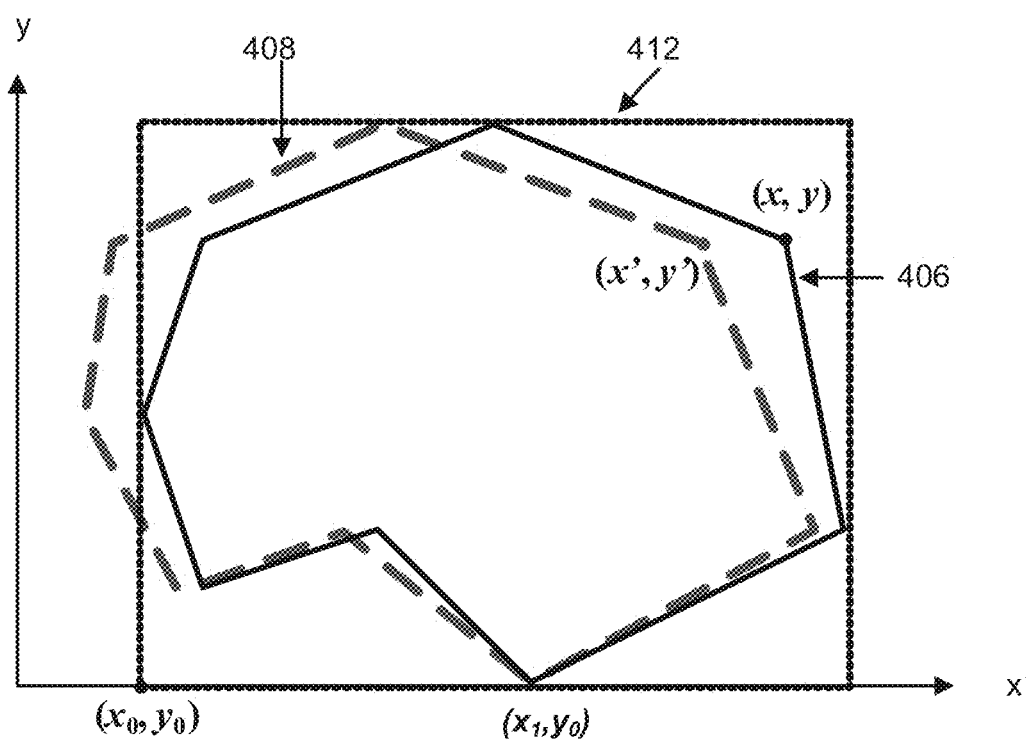
FIG. 22 is a graphical depiction of the object data for a second three-dimensional object mapped onto a travel axis and an axis perpendicular to the travel axis alongside a graphical depiction of the object data sheared to compensate for a non-orthogonal angle between the travel and scanning axes.

An example of the foregoing shearing operation as applied to an irregularly shaped object is provided in FIG. 22. The object data representative of object 406 is mathematically mapped onto a coordinate system comprising x and y axes, wherein the x axis corresponds to the travel axis of linear solidification device 88. This mapping operation and the others described herein are illustrated graphically, but in actual operation they may be carried out mathematically without any graphical representation. A bounding box 410 is placed around the object 406 to intersect the object 406 at its outermost locations along the x and y axes. Although the bounding box 410 and object 406 are graphically illustrated, the creation of the bounding box and its intersection with the object 406 would preferably be done mathematically and not graphically. It is depicted in graphical form for ease of understanding and reference.

The sheared object data is graphically represented as object 408. As FIG. 22 indicates, a single point $(x_1, y_0)$ intersects the lower-most edge of the bounding box along the y-axis. Because it intersects the lower-most edge of the bounding box, the point $x_1, y_0$ is not translated during the shearing operation. However, other points such as the point x, y are translated along the travel axis (x-axis). Thus, the point (x, y) is translated to the location (x', y') where y' is the same distance from $y_0$ as is y. Other vertices of object 408 are also translated in the travel axis (x-axis) direction relative to their positions in object 406. However, the y-coordinates of the vertices are not changed during the shearing operation. In preferred examples, the bounding box is configured so that its lowermost edge corresponds to the border 344 of the build envelope (FIG. 11B).

Figure 25:
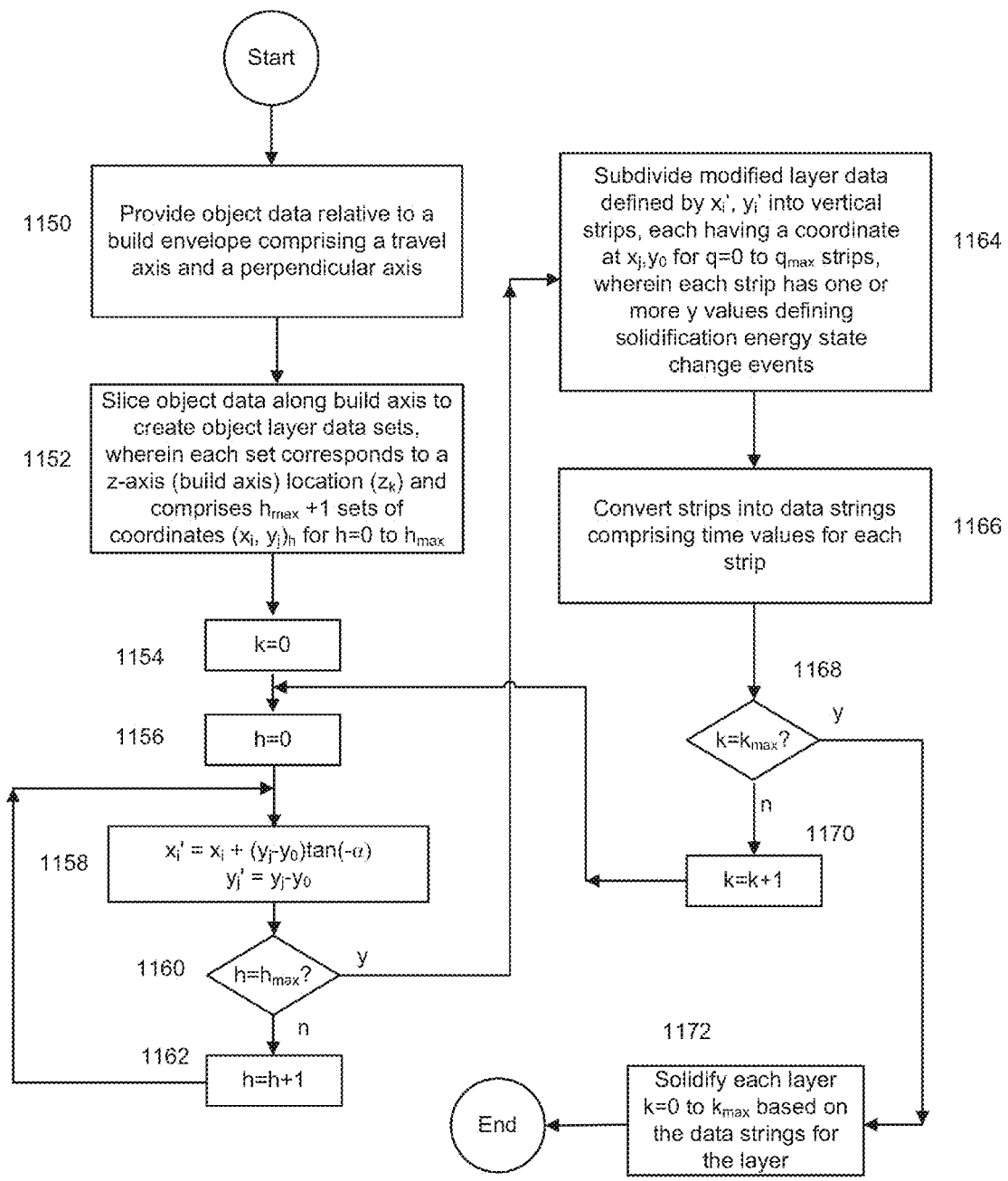
FIG. 25 is a flow chart depicting a second exemplary method of making a three-dimensional object by modifying object data to compensate for a non-orthogonal angle between a scanning axis and a travel axis.

An exemplary method of using the foregoing shearing technique will now be described with reference to the flow chart of FIG. 25. In certain examples, the method may be embodied as a set of computer executable instructions steps stored on a non-transitory computer readable medium which perform the described steps when executed by a computer processor. In accordance with the method, object data relative to a build envelope comprising a travel (x) axis and a perpendicular (y) axis is provided (step 1150). In one example, the object data comprises sets of coordinates along the x, y, and z axes that define a three-dimensional object such as the cylinder shown in FIG. 9. In step 1152, the object data is sliced or subdivided into object layer data sets along the build (z) axis to yield a set of object layers k=0 to $k_{max}$. The slicing or subdividing is a mathematical operation and is graphically depicted in FIG. 10 (in which the layer index is i instead of k). Each object layer data set will include $h_{max}+1$ pairs of coordinates, wherein h is a coordinate index that ranges from 0 to $h_{max}$, and each coordinate pair may be represented as $(x_i, y_j)$. Each value of the coordinate index h corresponds to a unique coordinate pair $x_i, y_j$. The layer index k is initialized to a value of zero (step 1154) and the travel axis coordinate index h is initialized to a value of zero (step 1156). A shearing operation such as the one depicted in FIGS. 21C and 22 is carried out in step 1158 for each coordinate pair $x_i, y_j$ using the following equations:

$$x_i' = x_i + (y_j - y_0)(\tan(-\alpha)) \quad \quad 4(a)$$

$$y_j' = y_j - y_0 \quad \quad 4(b)$$

wherein, $x_i, y_j$=coordinate pair for the unsheared object data;
$y_0$=the y-coordinate of the lower-most y-coordinate of the unsheared object data;
$x_i', y_j'$=coordinate pair of the sheared object data; and
α=a non-orthogonal angle between the scanning axis and the travel axis (x-axis)

As equations 4(a) and 4(b) indicate, the y coordinates of the object data are not shifted during the shearing operation. In addition, for any coordinate pair in which $y_j=y_0$, the x coordinate $x_i$ will not be shifted by shearing operation and $x_i'$ will equal $x_i$.

In step 1160 the coordinate index h is compared to its maximum value $h_{max}$ to determine if the shearing operation for the layer is complete. If the shearing operation is not complete, the coordinate index is incremented (step 1162) and control returns to step 1158 to carry out a shearing operation on the next set of coordinates $x_i$, $y_j$. If the shearing operation for all coordinate pairs in the layer is complete, control transfers to step 1164. In step 1164 the sheared object data is subdivided into vertical strips, each of which is parallel to and has a length along the y-axis as graphically illustrated in FIG. 21D. Each vertical strip has a strip index q which ranges from 0 for the first strip to $q_{max}$ for the last strip. The intersections between each vertical strip and the sheared object data are determined to identify y-axis locations at which a solidification energy source state event occurs. In preferred examples, each vertical strip is used to define a corresponding data string that includes one or more time values indicative of times at which the solidification energy source 90 is toggled (activated or deactivated) (step 1166).

As FIG. 21D indicates, in some cases the extent to which the sheared object 404 extends across a strip width will vary with the position along the y-axis. In one example, an average y-axis location based on the strip borders is used to define the location at which the solidification energy source state will change. For example, the strip having an index of q=0 is defined by two lines $q_{0a}$ and $q_{0b}$ spaced apart along the travel axis (x-axis). Line $q_{0a}$ (the left-most strip border of strip $q_0$ in FIG. 21D) intersects the sheared object 404 at a y-axis coordinate value that is higher than the y-axis coordinate at which line $q_{0b}$ (the right-most strip border of strip $q_0$ in FIG. 21D) intersects the sheared object 404. The object ends at y-axis coordinate $y_1$ for each of the lines $q_{0a}$ and $q_{0b}$. Thus, the mid-point along the y-axis between the y-axis locations at which the sheared object 404 intersects lines $q_{0a}$ and $q_{0b}$ may be used to determine when to activate the solidification energy source 90 for the first $q_0$. Deactivation occurs at $y_1$.

Following the conversion of a given set of object layer data to data strings, control transfers to step 1168 and the layer index k is compared to the maximum number of layers $k_{max}$ to see if the object data for the entire object has been sheared. If the object layer data for all layers has been sheared, control transfers to step 1172 and each solidifiable material for each layer is solidified based on the data strings determined in step 1166. Otherwise, the layer index k is incremented (step 1170) and control returns to step 1156 to begin shearing another set of object layer data. Alternatively, each layer can be solidified as soon as its object layer data is sheared without waiting for data for the remaining layers to be sheared.

The foregoing shearing technique is one exemplary method for modifying three-dimensional object data to compensate for a non-orthogonal angle between a scanning axis and a travel axis of a linear solidification device. An alternate method will now be described with reference to FIGS. 23 and 26. As with the shearing technique, the three-dimensional object data is first provided relative to a build envelope and a build axis (z-axis) perpendicular to the build envelope. The build envelope is characterized by a travel axis (x-axis) and an axis perpendicular to the travel axis (step 1180). The object data is sliced or subdivided into layers to define sets of object layer data, wherein each set has a layer index k ranging from 0 to $k_{max}$ (step 1182). A layer index counter k is initialized to begin processing each set of object layer data (step 1184).

In accordance with this method, the object layer data is not mapped onto a coordinate system comprising a travel axis and an axis orthogonal to the travel axis (e.g., the y-axis). Instead, the object layer data is mapped onto a coordinate system (FIG. 23) comprising the travel axis (x-axis) and a scanning axis (y'-axis) that is oriented at the non-orthogonal angle α with respect to the travel axis (step 1185). The mapped object data is modified by subdividing it into a plurality of linear strips having strip indices q ranging from 0 to $q_{max}$ which are arranged adjacent one another along the travel axis (x-axis) direction (step 1186). Each strip has a length that is parallel to the scanning axis (y' axis), and therefore, is oriented at the non-orthogonal angle α with respect to the travel axis (x-axis). The locations of the intersections between object 400 and the strips along the scanning axis (y' axis) are identified to determine the locations at which a solidification energy source energization state change occurs. In certain examples, the intersections are used to define data strings with a plurality of values that define solidification source energization state events (step 1188). The values may include time values, one example of which is CPU tick values. In those cases wherein the borders of a strip intersect the object 400 at different scanning axis locations, the points of intersection of each strip border may be averaged to arrive at a value indicative of an energization state change for the solidification energy source as discussed previously with respect to FIG. 21D. Thus, in this alternate method, the use linear strips are oriented to account for the non-orthogonal relationship between the scanning axis (y') and the travel axis (x), avoiding the need for shearing the object data. However, this alternate method requires a mathematical procedure for generating linear strips that are not vertical to the travel axis and then determining their intersection with object 400.

Once the object layer data for the particular layer has been converted to a set of data strings, the layer index is checked to see if it has reached its maximum value $k_{max}$ (step 1190). If it has, the solidifiable material is solidified in accordance with the data strings in the manner described previously (step 1194). If the layer index has not reached its maximum value, in step 1192 the layer index is incremented and control transfers to step 1185 to process the next layer. In an alternate implementation, each layer may be solidified once its data strings have been determined instead of first determining the data strings for the remaining layers.

Figure 27:
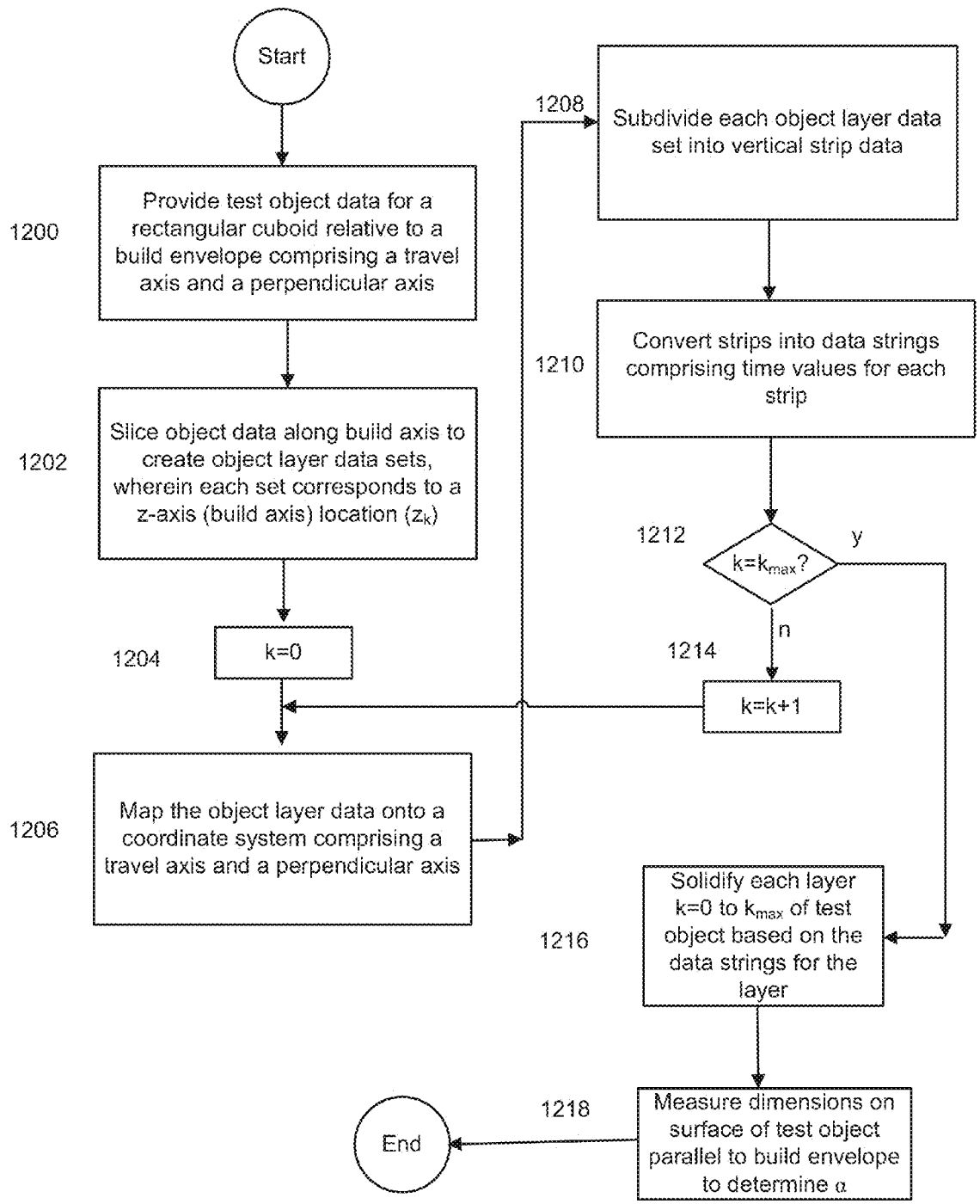
FIG. 27 is a flow chart depicting a method of determining a non-orthogonal angle between a scanning axis and a travel axis.

The foregoing methods of modifying three-dimensional object data to compensate for a non-orthogonal angle between a scanning axis and a travel axis of a linear solidification device each require a determination of the non-orthogonal angle α between the travel axis and the scanning axis. An exemplary method of determining a will now be described with reference to FIGS. 27 and 28. The method involves forming a test object and measuring dimensions on the object to determine the non-orthogonal angle α.

In accordance with the method, object data for a test object, for example, a rectangular cuboid test object (i.e., a test object that is rectangular in plan view with a uniform thickness) is provided (step 1200). The object data is sliced along the build (z) axis to define a plurality of object layer data sets, each corresponding to a location along the build axis (step 1202). A layer counter k is initialized (step 1204).

In step 1206 the object layer data for the current layer is mapped onto a coordinate system comprising a travel axis (x-axis) and a perpendicular axis (y-axis). The object layer data is subdivided into object strip data based on vertically oriented strips (i.e., strips oriented orthogonally to the travel (x) axis) (step 1208). The vertical strips each have a length along the y axis and are arranged adjacent one another along the travel axis. The object strip data is converted into data strings comprising time values (step 1210). The layer index is checked to determine if the last layer $k_{max}$ has been reached (step 1212). If it has been reached, the solidifiable material is solidified to form the test object based on the data strings for each layer (step 1216). Once the test object is formed, measurements are made on the test object to determine the non-orthogonal angle α between the scanning axis and the travel axis (step 1218). If the last layer has not been reached, the layer counter is incremented (step 1214) and control returns to step 1206.

Figure 26:
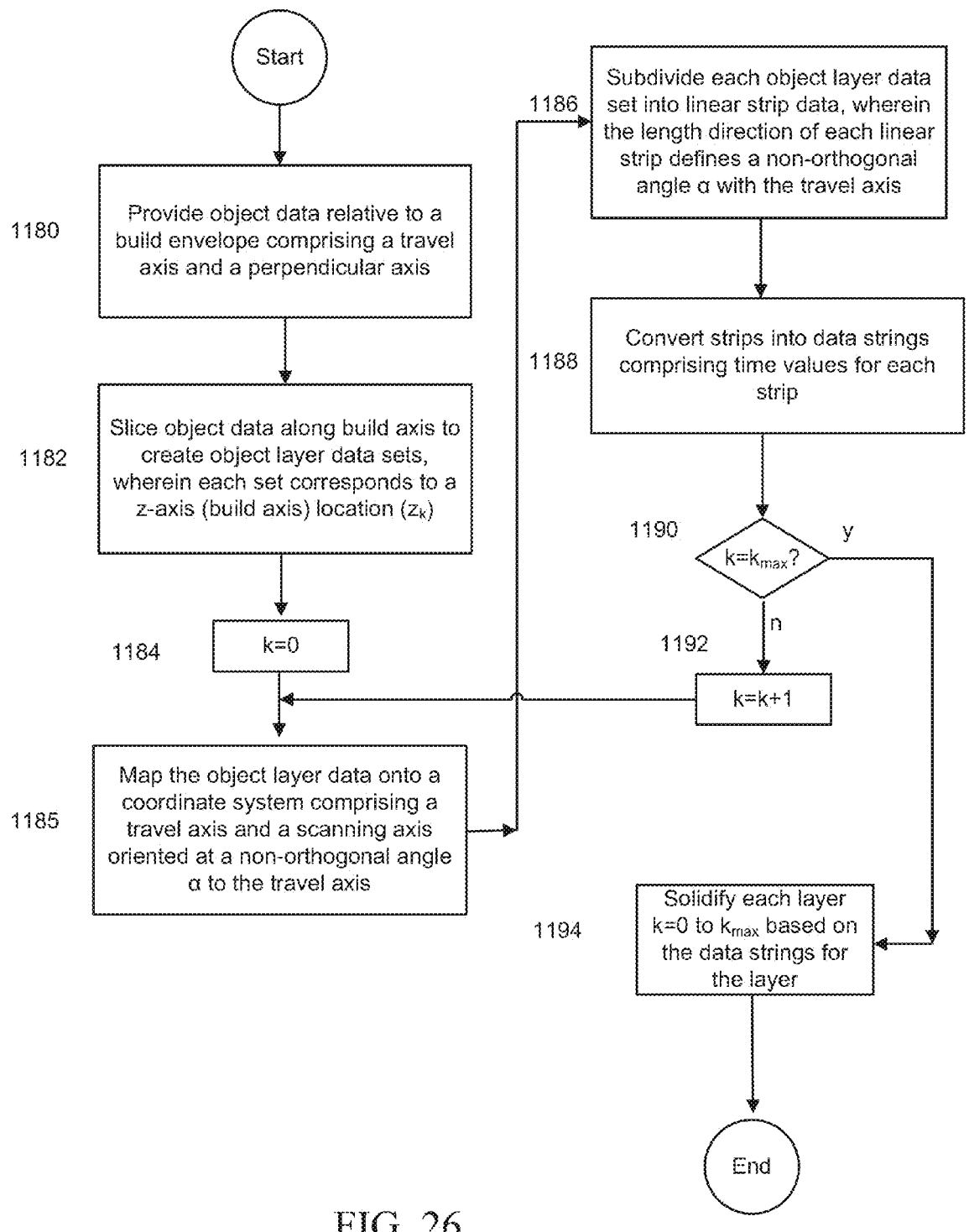
FIG. 26 is a flow chart depicting a third exemplary method of making at three-dimensional object by modifying object data to compensate for a non-orthogonal angle between a scanning axis and a travel axis.
Figure 28:
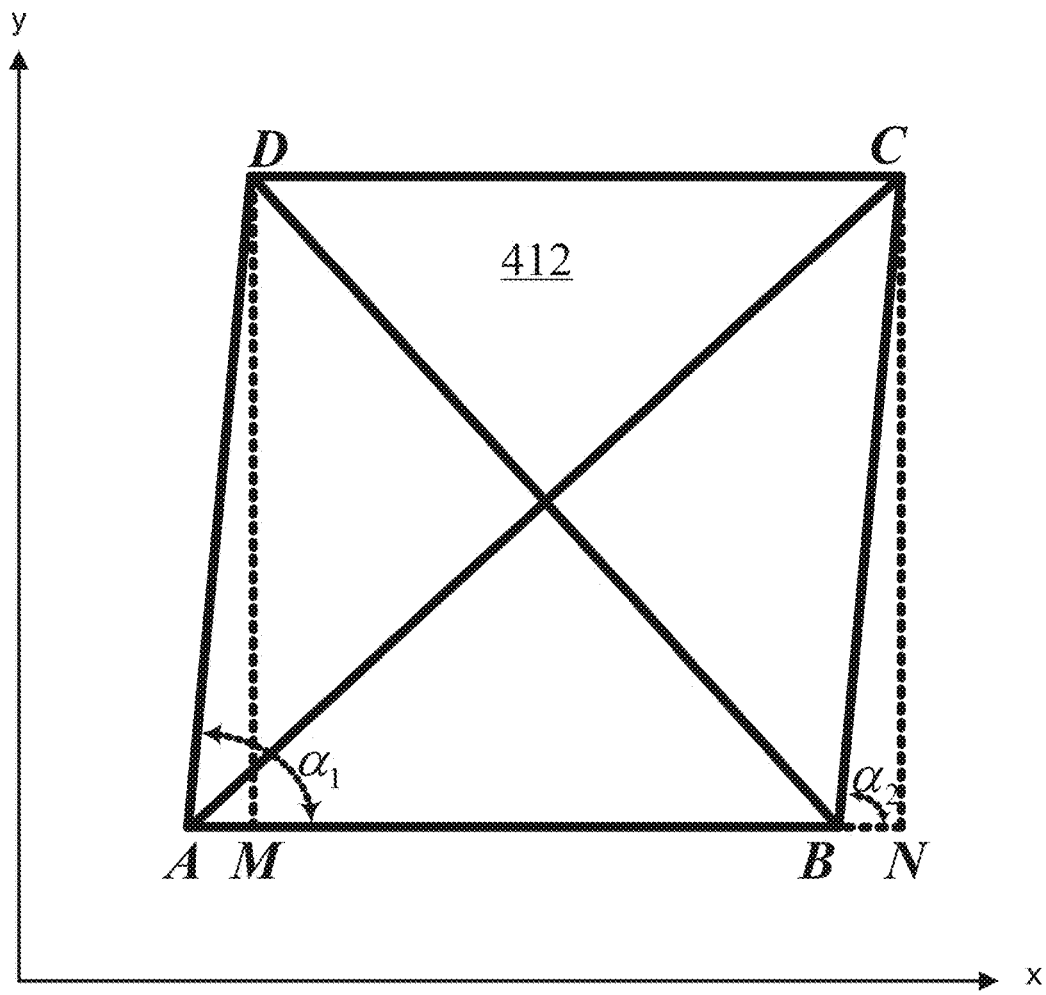
FIG. 28 is a graphical depiction of a rectangular cuboid test part mapped onto a travel axis and an axis perpendicular to the travel axis as viewed along a build axis.

There are several ways of measuring dimensions on the test object to determine the non-orthogonal angle α between the scanning axis and the travel axis (step 1218). An exemplary test object 412 is shown in FIG. 28. In the figure, the object 412 is shown aligned with the build envelope in the orientation in which it was formed. The sides of test object 412 extending along the travel (x) axis may be described as two sides, the first is side AB connecting vertices A and B, and the second is side DC connecting vertices D and C. The sides extending along the scanning axis (which is not parallel to the y-axis in this example) may be described as a first side AD connecting vertices A and D, and a second side BC connecting vertices B and C. The dashed lines in FIG. 26 are projections from the vertices C and D which are orthogonal to the travel axis (x).

In one example, a protractor may be used to measure $\alpha_1$ between side AD and side AB. In another example, a protractor may be used to measure $\alpha_2$ between side BC and a projection of the line AB along the travel axis (x-axis). In certain cases the angle α may be selected to be equal to either of $\alpha_1$ and $\alpha_2$. In other cases, the non-orthogonal angle α may be selected as the average of $\alpha_1$ and $\alpha_2$. In additional examples, the test object 412 may be photographed or scanned to create image and/or mathematical data that can be used to measure the angles $\alpha_1$ and $\alpha_2$.

In additional examples, the non-orthogonal angle α may be determined based on trigonometric relationships between various dimensions of test object 412. One illustrative embodiment of the use of such trigonometric relationships is provided by the following equations:

$$BM = \sqrt{BD^2 - DM^2} \quad \quad 4(a)$$

$$AM = AB - BM \quad \quad 4(b)$$

$$\alpha_1 = \tan^{-1}(DM/AM) \quad \quad 4(c)$$

$$AN = \sqrt{AC^2 - CN^2} \quad \quad 4(d)$$

$$BN = AN - AB \quad \quad 4(e)$$

$$\alpha_2 = \tan^{-1}(CN/BN) \quad \quad 4(f)$$

$$\alpha = (\alpha_1 + \alpha_2)/2 \quad \quad 4(g)$$

wherein, BM=the length between points B and M (mm)
AM=the length between points A and M (mm)
AB=the length between points A and B (mm)
AN=the length between points A and N (mm)
BN=the length between points B and N (mm)
DM=the length between points D and M (mm)
AC=the length between points A and C (mm)
CN=the length between points C and N (mm)
BD=the length between points B and D (mm)
$\alpha_1$=the non-orthogonal angle between lines AD and AB
$\alpha_2$=the non-orthogonal angle between lines CB and BN
α=the average non-orthogonal angle between the scanning axis and the travel axis.

The dimensions BM, AM, AB, AN, DM, AC, CN, BD, and BN may be measured directly on the part or indirectly from an image or scanned data taken from the part. Scanned data may be converted to mathematical data from which BM, AM, AB, AN, DM, AC, CN, BD, and BN may be determined. Once determined using the foregoing techniques, the non-orthogonal angle α can then be used with any of the previously described methods of making a three-dimensional object in which the object data is modified to compensate for α.

Figure 29:
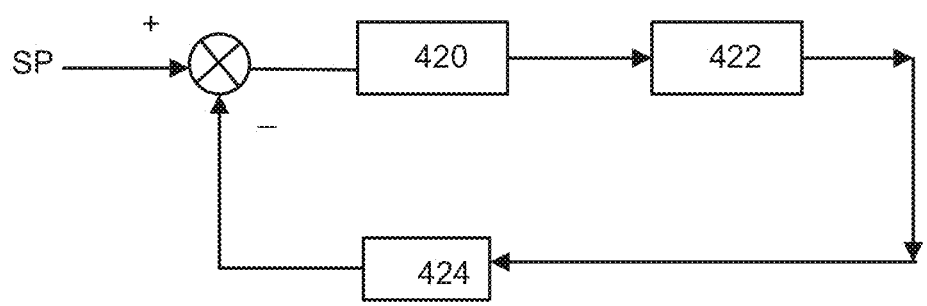
FIG. 29 is a schematic of a system for controlling the solidification power delivered to a solidifiable material.

In certain examples of systems and methods of making three-dimensional objects of the type described herein, it is desirable to ensure that the depth to which the solidifiable material is solidified along the build (z) axis remains constant while building a three-dimensional object. Variations in the solidification depth may cause the resulting three-dimensional object to undesirably deviate from the object data that defines it, especially when the three-dimensional object data is sliced into object layer data sets that correspond to a uniform object layer thickness. The solidification depth is affected by the solidification power delivered by the linear solidification device 88. Accordingly, in certain embodiments a solidification power controller is provided to regulate the solidification power delivered from linear solidification device 88 to the solidifiable material. Referring to FIG. 29, a solidification power controller 420 receives a user-set point (SP) and a signal from a solidification power sensor 424. In this example, the solidification power sensor 424 is preferably positioned outside of the build envelope and between the linear opening 100 of linear solidification device 88 and the solidifiable material lying beneath it so that it detects the solidification power as it leaves linear opening 100 and is representative of the solidification power delivered to surface of the solidifiable material. In certain examples, the solidification energy source 90 is connected to a driver 422 that receives a control signal from solidification power controller 420. The control signal varies in response the variation between the setpoint (SP) and the measured or detected solidification power signal received from the solidification power sensor 424. The manner in which the control signal varies based on the difference between the sensor signal and the setpoint may be dictated by a variety of different control algorithms, including proportional (P), proportional plus integral (PI), and proportional plus integral plus derivative control algorithms (PID). The driver 422 may adjust the power provided by the solidification energy source 90 by modifying the voltage and/or current delivered to the solidification energy source 90 using known techniques.

In certain examples, the solidification power sensor 424 is provided at one side of the build envelope (e.g., within the region $\delta_L$ or $\delta_R$ in FIG. 11B) and measures the solidification power following the solidification of a layer of solidifiable material and makes any necessary adjustments to the solidification energy power source 90 to regulate the solidification power delivered to the solidifiable material. In those examples wherein the linear solidification device 88 supplies solidification energy while traveling in both the positive and negative travel axis (x) directions, the solidification power will be measured for every other layer that is solidified. In those examples wherein the linear solidification device 88 supplies solidification energy only while traveling in one direction along the travel axis, the solidification power sensor will measure the solidification power for every layer that is solidified.

Suitable exemplary solidification power sensors 424 include photodiodes. In such cases, the photodiode is preferably designed to detect the power for the peak wavelength of solidification energy delivered by the linear solidification device 88. The solidification power sensor 424 is preferably designed to measure the power of wavelengths ranging from 380 nm to 420 nm and more preferably from 390 nm to 410 nm. In one example, the solidification power sensor 424 is designed to detect the power for a wavelength of about 405 nm. One suitable optical power sensor is the Hioki 9742 Optical Sensor, which is a silicon photodiode designed to detect wavelengths ranging from 380 nm to 450 nm supplied by Hioki Corporation of Japan. Additional examples of methods and apparatuses for controlling the solidification power received by the solidifiable material and the solidification depth are described below with reference to FIGS. 30-36C.

As mentioned previously, the linear solidification device 88 of FIGS. 1C and 1D also includes a solidification energy sensor 324, which may be an optical sensor. Suitable optical sensors include photodiodes. One exemplary photodiode that may be used is a 404 nm, 500 mW photodiode supplied by Opnext under the part number HL40023MG.

Referring again to FIG. 1C, embodiments of a method for synchronizing a timer to the position of a scan line within the build envelope 342 (FIG. 11B) will now be described. The method comprises activating a solidification energy source, such as source 90, which is in optical communication with a scanning device, such as a rotating energy deflector 92 or a linear scanning micromirror. The scanning device deflects solidification energy received from solidification energy source 90, and the deflected solidification energy is received by a solidification energy sensor, such as sensor 324. In certain examples, a mirror such as mirror 332 is provided to facilitate the transmission of deflected solidification energy from the scanning device to sensor 324.

In accordance with the method, the solidification energy sensor 324 senses the receipt of solidification energy and generates a sensing signal that is transmitted to a system microcontroller. The sensor's receipt of the solidification energy corresponds to the beginning of a line scanning operation. A timer is then initialized to a specified value (e.g., zero) based on the receipt of solidification energy by the sensor.

An example of the foregoing synchronization method will be described with reference to FIG. 1C. As illustrated in the figure, in certain examples, a solidification energy sensor 324, such as a light sensor, may be used to determine the scanning axis location of solidification energy supplied by linear solidification device 88. In one example, a solidification energy sensor 324 is in optical communication with rotating energy deflector 92 to receive solidification energy deflected therefrom. In another example, the solidification energy sensor 324 is located at one end of housing 96 to indicate when solidification energy projected in the scanning axis direction has reached its end or beginning of travel in the scanning axis direction. In accordance with the example, the solidification energy sensor 324 is positioned at a location that corresponds to a maximum solidification energy position in the scanning axis direction (i.e., at a location corresponding to the end of travel in the scanning axis direction). However, the sensor 324 can be located at other positions, but is preferably at a location at which the length of solidification energy travel between sensed events is known. In FIG. 1C, the location of mirror 332 and sensor 324 along with the depicted clockwise rotational direction of rotating energy deflector 92 cause the sensing of solidification energy by sensor 324 to correspond to the beginning of a linear scanning operation.

In accordance with such examples, a processor operatively connected to a clock (i.e., a CPU clock) receives the solidification energy sensor signals from sensor 324 and a timer operating on the clock units is synchronized to them, allowing an elapsed time between sensed solidification energy pulses to be calculated. The scanning axis maximum scan length (e.g., the length of opening 100 or a measured length of solidification energy travel in the scanning axis direction) is determined, and the speed of solidification energy beam travel in the scanning axis direction is calculated by dividing the maximum scanning axis length of travel by the elapsed time between solidification energy sensor 324 pulses:

$$s = l/\Delta t_{max} \quad (5)$$

wherein, s=speed of solidification energy beam travel in the scanning axis direction (e.g. scanning speed in cm/sec);
l=maximum length of travel (e.g., cm); and
$\Delta t_{max}$=elapsed time between sequential sensed solidification energy signals generated by solidification energy sensor (e.g., sec).

By synchronizing the clock to the sensor's receipt of solidification energy and using the last speed value (or a suitable averaged value), the position of the solidification energy beam in the scanning axis direction can be calculated:

$$SA = s\Delta t \quad (6)$$

wherein, SA=scanning axis position of solidification energy beam along solidifiable material relative to the y-axis starting point (e.g., cm);
s=speed of solidification energy beam travel from formula (5); and
$\Delta t$=elapsed time from last solidification energy signal from sensor.

Figure 23:
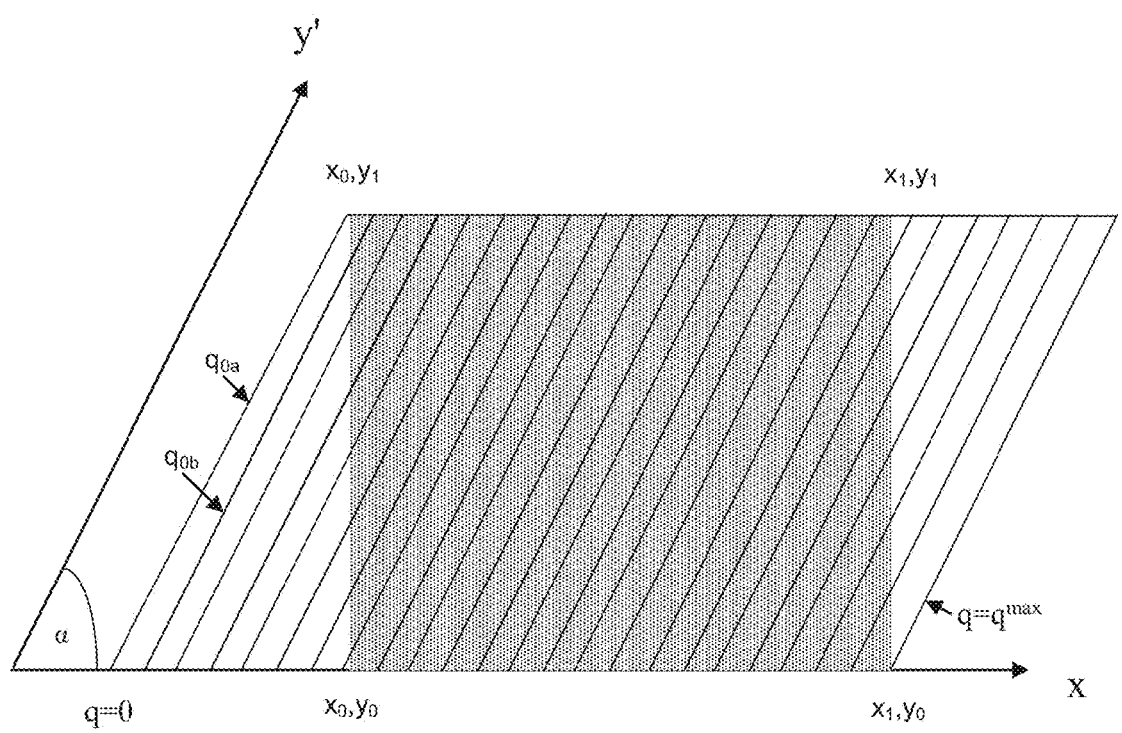
FIG. 23 is a graphical depiction of the object data for the object of FIG. 21A mapped onto a travel axis and scanning axis oriented at a non-orthogonal angle with one another and a graphical representation of object data strips used to define data strings oriented along the direction of the scanning axis.

If the scanning axis is oriented at a known value of a non-orthogonal angle α with respect to the travel axis, equation (6) may be modified to calculate the position along the y-axis based on the position along the scanning axis (SA) and the value of α using the relationship y=SA(sin(α)). A linear solidification controller (for example, as implemented in a microcontroller unit) operatively connected to solidification energy source 90 can selectively activate and deactivate solidification energy source 90 to cause solidification energy to be supplied only when linear solidification energy from linear solidification device 88 is at a travel axis (x-axis) location and the scanning device is positioned to scan a scanning axis location that corresponds to a point on one of the strips 304$_j$ shown in FIG. 11A. If the method of FIGS. 23 and 26 is used to compensate for a non-orthogonal angle α, it is preferable to use equation (6) which correlates time values to scanning axis position values. If the shearing method of FIGS. 21C-D, FIG. 22 and FIG. 25 is used, it is preferable to convert the scanning axis position (SA) to a y-axis position because the object data is specified based on the y-axis, not the scanning axis.

Figure 15:
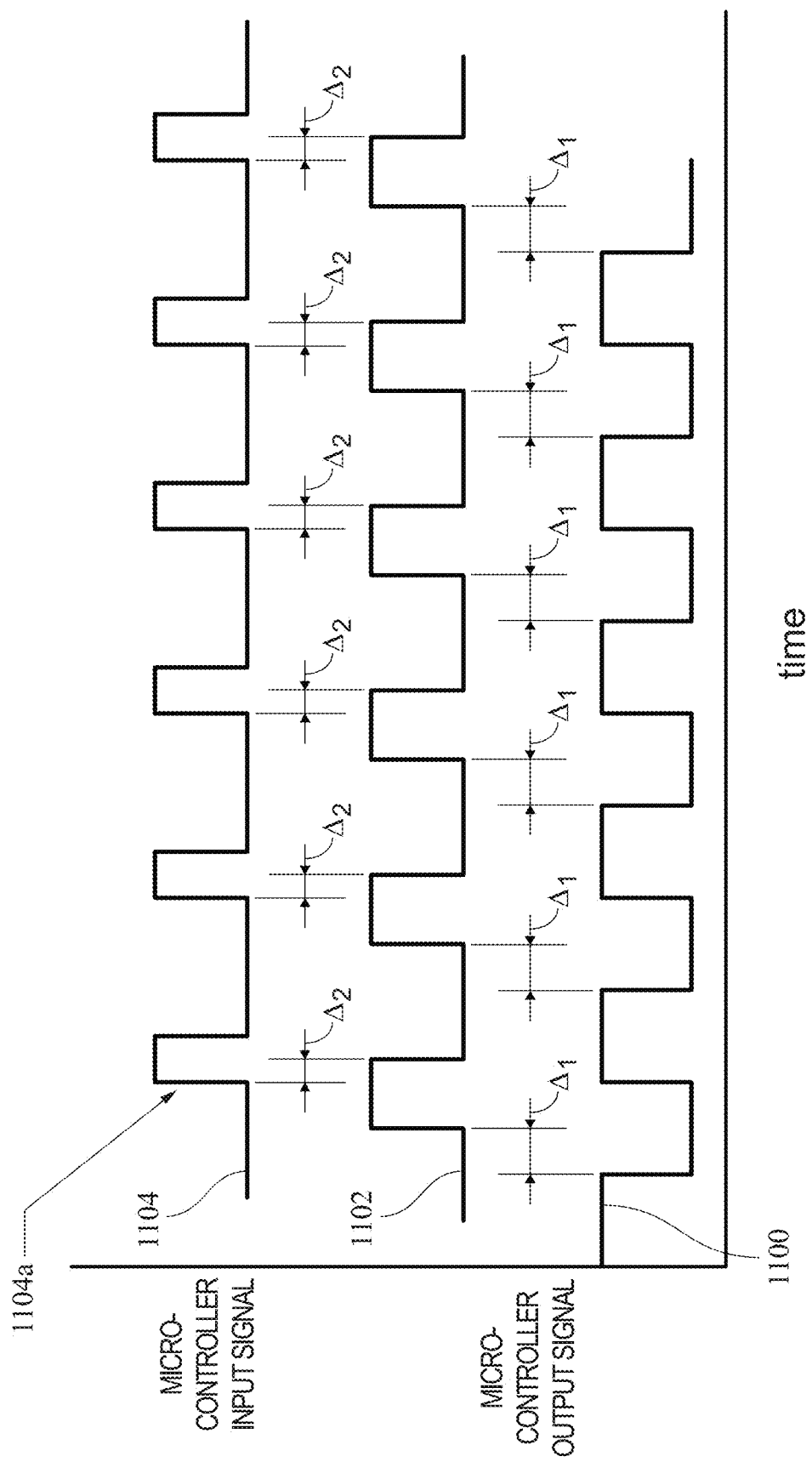
FIG. 15 is a graph depicting microcontroller output signals to a solidification energy source and a motor used to drive a rotating energy deflector and microcontroller input signals received from a solidification energy synchronizations sensor.

Using formulas (5) and (6), the linear solidification controller can receive data indicative of the scanning axis position of solidification energy. A linear encoder may provide the linear solidification controller with travel axis (x-axis) location information (for linear solidification device 88), allowing the controller to determine the desired scanning axis profile at the determined travel axis (x-axis) location from object data such as that in FIG. 11A. As mentioned previously, the object layer data may also be converted to a plurality of sets of string data such that each plurality corresponds to a given layer and position along the build axis (z-axis). In accordance with such examples, each set of string data includes a plurality of time values, each of which defines a time at which the energization state (e.g., activate or deactivate) of the solidification energy source 90 is changes. Preferably, the time values are defined relative to a zero time that is reset upon the receipt of a synchronization solidification energy generated when sensor 324 receives solidification energy, as also discussed previously. As mentioned earlier, in certain examples, the zero time of a CPU counter is set at the leading edge 1104a of the synchronization sensor signal received by sensor 324 (FIG. 15).

Solidification energy sensor 324 generates a signal upon receipt of solidification energy. Mirror 332 is provided and is in optical communication with rotating energy deflector 92 such that when each facet of rotating energy deflector 92 receives solidification energy from solidification energy source 90 while at a particular rotational position (or range of positions) in the y-z plane, the energy will be deflected toward mirror 332 (as shown by the dashed lines). Similarly, when the scanning device used in linear solidification device 88 is a linear scanning micromirror, a particular tilt angle or range of tilt angles will cause received solidification energy to be deflected toward mirror 332. The solidification energy then reflects off of mirror 332 along a path that is substantially parallel to the scanning axis between first F-Theta lens 328 and second F-Theta lens 330 to sensor 324. Sensor 324 may be operatively connected to a computer to which it will transmit the signal generated upon receipt of solidification energy. The signal may be stored as data and/or used in programs associated with a solidification energy source controller (not shown). An example of a line scanning synchronization method that makes use of the generated sensor signal is described below.

In certain examples, sensor 324 is used to determine the beginning of a line scanning operation along the scanning axis direction. However, in certain cases using the solidification energy sources described herein, the intensity of the solidification energy transmitted by solidification energy source 90 may be higher than desired, thereby reducing the sensitivity of sensor 324 due, at least in part, to the presence of scattered and ambient light. As a result, in some implementations a filter 326 (FIGS. 1C and 1D) is provided between sensor 324 and mirror 332 along the path of travel of solidification energy from mirror 332 to sensor 324. Filter 326 preferably reduces the intensity of electromagnetic radiation received by sensor 324 without appreciably altering its wavelength(s). Thus, in one example filter 326 is a neutral density filter. One such suitable neutral density filter is a 16× neutral density filter supplied by Samy's Camera of Los Angeles, Calif. under the part number HDVND58. In certain implementations, sensor 324 is used to synchronize a timer that serves as a reference for linear scanning operations. In such cases, the exposure of sensor 324 to scattered or ambient light may cause synchronization errors. Thus, filter 326 is preferably configured to ensure that only direct solidification energy from solidification energy source 90 is received by sensor 324.

Referring again to FIG. 11B, in certain implementations, linear solidification device 88 is positioned within the build envelope 342 such that the mirror 332 is located immediately proximate scanning-axis build envelope boundary 344. In such implementations, the receipt of solidification energy by sensor 324 (FIG. 1C) indicates that a line scanning operation may begin immediately thereafter because if the solidification energy source 90 remains activated and if rotating energy deflector 92 continues to rotate, solidification energy will be transmitted to the solidifiable material at the scanning axis build envelope boundary 344 (FIG. 11B) immediately after it is transmitted to mirror 332. Therefore, sensor 324 can be used to indicate the beginning of a line scanning operation for each facet 94(*a*)-94(*f*). As mentioned previously, when solidification energy source 90 remains activated while rotating energy deflector 92 completes a single revolution, a number of linear scanning operations will be completed in the scanning axis direction which equals the number of the rotating energy deflector's 92 facets 94(*a*)-(*f*).

In those cases where sensor 324 is used to indicate the beginning of a line scanning operation, it is useful to briefly activate solidification energy source 90 at a specific moment at which the transmitted solidification energy will be received by mirror 332. The brief activation of solidification energy source may be coordinated or synchronized with an actuating signal sent to the scanning device used in linear solidification device 88. For example and as mentioned previously, in certain cases motor 118 is energized by a constant frequency pulse, the timing of which corresponds to a fixed rotational position for the particular facet 94(*a*)-(*f*) that is in optical communication with solidification energy source 90. Therefore, through a process of trial and error, a lag time may be determined between the leading or trailing edge of the motor pulses and the receipt of solidification energy by sensor 324. More specifically, the source of solidification energy 90 can be selectively activated at a number of times relative to the leading or trailing edge of the pulse to determine which lag time results in the generation of a solidification energy sensor signal by sensor 324. In one preferred embodiment, the solidification energy source 90 is activated at or within a specified time following the trailing edge of the energy pulse used to drive motor 118.

In certain examples, it is preferable to dynamically adjust or calibrate the timing of the synchronization energy pulses. In accordance with such examples, the synchronizing energy pulses are activated at a dynamically calibrated time relative to an internal microprocessor clock (i.e., in the microcontroller) without linking the synchronizing energy pulses to the actuation pulses sent to motor 118 to rotate rotating energy deflector 92. One implementation of the dynamic calibration of the synchronization energy pulse timing is as follows: When rotating energy deflector motor 118 is first activated during a part building process, one or more trial synchronization pulses are performed by a program resident in the microcontroller that activates solidification energy source 90 at one or more trial times with respect to the microprocessor clock. The initial trial time will be selected based on a lag time relative to the actuating pulses sent to motor 118 which is believed to cause the transmitted solidification energy to strike the sensor 324. The trial times are progressively adjusted until the dynamic calibration of the synchronization energy pulses is complete. The program resident in the microcontroller compares the time that the microcontroller sends an output signal to activate the solidification energy source 90 to the time that sensor 324 indicates that solidification energy has been received. The program adjusts the timing of the output signal (relative to the CPU clock) sent to solidification energy source 90 to the earliest possible time that results in the transmission of a signal from synchronization sensor 324, as this time indicates that the solidification energy has been transmitted as close as possible to the time at which the solidification energy contacts the sensor 324. The ultimate timing of the synchronization energy pulses determined by this adjustment process is then saved and used in subsequent synchronization operations. As indicated previously, the timing of the pulses is defined relative to the cycles of a CPU clock in the microprocessor to ensure that they are repeatable. In certain cases, the use of this dynamic adjustment process to arrive at the synchronization energy pulse timing is more accurate than timing the synchronization energy pulses based on a fixed time relative to the motor 118 pulses, including because in certain cases the relationship between the motor 118 pulses and the rotational position of rotating energy deflector 92 may fluctuate or vary despite the fact that the rotating energy deflector 92 rotates at a substantially constant frequency.

The activation of the solidification energy source 90 relative to the pulses sent to motor 118 in accordance with one example is depicted in FIG. 15. Waveform 1100 represents the microcontroller output signal sent to the motor 118 to rotate mirror 92. Waveform 1102 represents the microcontroller output signal sent to the solidification energy source 90 to toggle the energization state solidification energy source. The rising edges of each cycle indicate that the solidification energy source is activated. The falling edges indicate that it is deactivated. The time differential between each falling edge of the motor pulse waveform 1100 and rising edge of the solidification energy source activation signal waveform 1102 is represented as $\Delta_1$. In preferred embodiments, $\Delta_1$ is maintained at a substantially consistent value from pulse-to-pulse of motor 118 to better ensure that the relationship between the rotational position of each facet 94a-f (FIG. 1B) and the activation of a synchronizing pulse of solidification energy from solidification energy source 90 is substantially constant. However, in other examples, $\Delta_1$ is an initial trial time that is only used as a starting point for dynamically calibrating the timing of synchronization energy pulses sent by source 90 relative to a microcontroller CPU clock. In such examples, once the dynamically calibrated time is determined, it is used for subsequent synchronization energy pulses at which point the system no longer uses the timing of the motor 118 actuation pulses to determine when to send the synchronizing solidification energy pulses.

In certain cases, the sensor 324 may be unnecessary because a specified lag time relative to the energization pulses that drive motor 118 will reliably indicate when a line scanning operation is about to begin (assuming solidification energy source 90 remains activated). However, in some examples, the pulses cannot be used to reliably indicate when a line scanning operation is about to begin within the desired degree of precision. For example, the facets 94(a) to 94(f) of rotating energy deflector 92 may not be perfectly or consistently planar. In that case, the scanning (y) axis position of solidification energy may not correlate well with the rotational position of rotating energy deflector 92 or the pulse waveform 1100 (FIG. 24) of rotary motor 118. In addition, heat generated by solidification energy source 90 can cause slight variations in the path of the solidification energy toward the solidifiable material and the angle of incidence at which it strikes the solidifiable material. Thus, sensor 324 assists in better determining the time at which a line scanning operation may begin (or is about to begin if the solidification energy source 90 remains activated). This is particularly helpful when object data is stored as time values because the time values can be reliably correlated to specific positions along the scanning axis direction relative to the scanning axis boundary 344 of build envelope 342 (FIG. 11B). In certain examples, a timer is set to zero when sensor 324 generates a synchronization signal, and the object data is specified as time values at which the energization state of solidification energy source 90 is changed relative to the zero time value.

Referring again to FIG. 15, in certain examples, the timer is set to zero (initialized) when sensor 324 first indicates that it has received solidification energy. Waveform 1104 represents signals generated by sensor 324 and transmitted to the microcontroller. In certain examples, the timer is initialized to zero on the rising edge of the sensor signal received by the microcontroller. For the first sensor signal pulse in FIG. 15, the rising edge is identified as 1104a. Filter 326 (FIG. 1C) is intended to remove ambient light or other sources of light other than solidification energy reflected from rotating energy deflector 92. Otherwise, the microcontroller may prematurely initialize the timer, causing the microcontroller to prematurely begin applying solidification energy to solidify the solidifiable material. In certain examples, filter 326 is selected and/or adjusted to ensure that the sensor 324 generates an output signal for a period of time that is no longer than the time required for light reflected from rotating energy deflector 92 to traverse the sensing length of sensor 324 when the rotating energy deflector 92 is rotating at its operating rotational frequency. For example, if sensing length of sensor 324 is 2 mm, the build envelope distance in the y-axis direction is nine (9) inches (228.6 mm), and the rotational frequency and number of facets of rotating energy deflector 92 yields a scan rate of 2000 lines/second, the time required for solidification energy to traverse the sensor's sensing length will be 2 mm/((2000 lines/second)(228.6 mm)) or 4.4 microseconds. Thus, prior to performing an object building process, the sensor 324 may be exposed to solidification energy from solidification energy source 90 and rotating energy deflector 92. The output signals generated by sensor 324 may be observed on an oscilloscope to determine of the time required for solidification energy to traverse the sensor 324 is 4.4 microseconds. If it is not, the filter 326 may be adjusted or replaced until the correct sensing time is observed.

In certain cases, linear solidification devices 88 utilizing a rotating energy deflector 92 may be subject to variability in the linear scanning speed in the scanning (y-axis) direction. Each facet 94a-f will have a rotational position corresponding to a location along the scanning axis (i.e., a "center point") at which solidification energy will be deflected perpendicularly to the solidifiable material and to the opening 100 in the housing of the linear solidification device 88. At the center point, the distance traveled by the solidification energy from the rotating energy deflector 92 to the solidifiable material will be at a minimum relative to locations away from the center point. At rotational positions located away from the center point in the scanning axis and y-axis directions, the speed of scanning in the scanning axis and y-axis direction will be faster than proximate the center point. In addition, the speed will increase as the distance from the center point increases. At a constant rotational frequency for rotating energy deflector 92, the speed increase is directly proportional to the distance from the center point.

This variation in scanning speed as a function of scanning axis and y-axis position can produce inaccuracies in the three-dimensional object. In certain examples, a three-dimensional object is mapped within a build envelope such that the object dimensions dictate specific object coordinates in the scanning or y-axis direction. The coordinates can be translated to time values indicative of a change in the energization state of a solidification energy source if the scanning speed is constant. However, if time values are used as solidification source state event data, variable scanning speeds will cause the coordinates of the solidified object (and the object dimensions) to vary relative to the coordinates dictated by the object data because the scanning speed will vary with scanning axis and y-axis position. In addition, variable scanning speeds can result in solidification energy densities that vary with scanning axis position because areas that are scanned quickly will have reduced solidification energy exposure times—and therefore reduced solidification energy densities—relative to areas that are scanned more slowly. As a result, hardening depths that vary with scanning axis position may result.

In certain cases, it is desirable to convert original object data to modified object data to compensate for variations in scanning speed along the scanning axis. The original object data preferably comprises a plurality of original object data sets, each of which corresponds to an object cross-section and a build axis (z) location. Each original object data set comprises a plurality of original solidification energy source energization state event items, wherein each data item is indicative of a change in the energization state of a solidification energy source. The data items may be, for example, scanning axis locations or y-axis locations where an energization state change will occur or times when an energization state change will occur. In certain examples herein, it is desirable to modify object data representative of the three-dimensional object both to compensate for the non-orthogonal angle α between the scanning and travel axes (as described previously) and to compensate for variations in scanning speed and/or energy density along the scanning axis and y-axis. In the method described below, scanning axis position or y-axis position can be related to the solidification source state event data (e.g., CPU ticks). If a shearing technique such as the one described in FIGS. 21C-D, 22, and 25 is used, it is preferable to correlate the solidification source state event data to y-axis positions because the shearing process maintains the orthogonal x and y axis coordinate system and shears the object data within it. Conversely, if the object data is not sheared and the linear strips defining the object strip data are oriented at the non-orthogonal angle α with respect to the travel axis (FIGS. 23 and 26), it is preferable to correlate scanning axis positions to solidification source state event data. Thus, in the discussion that follows, while "scanning axis" or "y-axis" may be referenced, it should be understood that the object data can be related to either axis, as appropriate.

Figure 17:
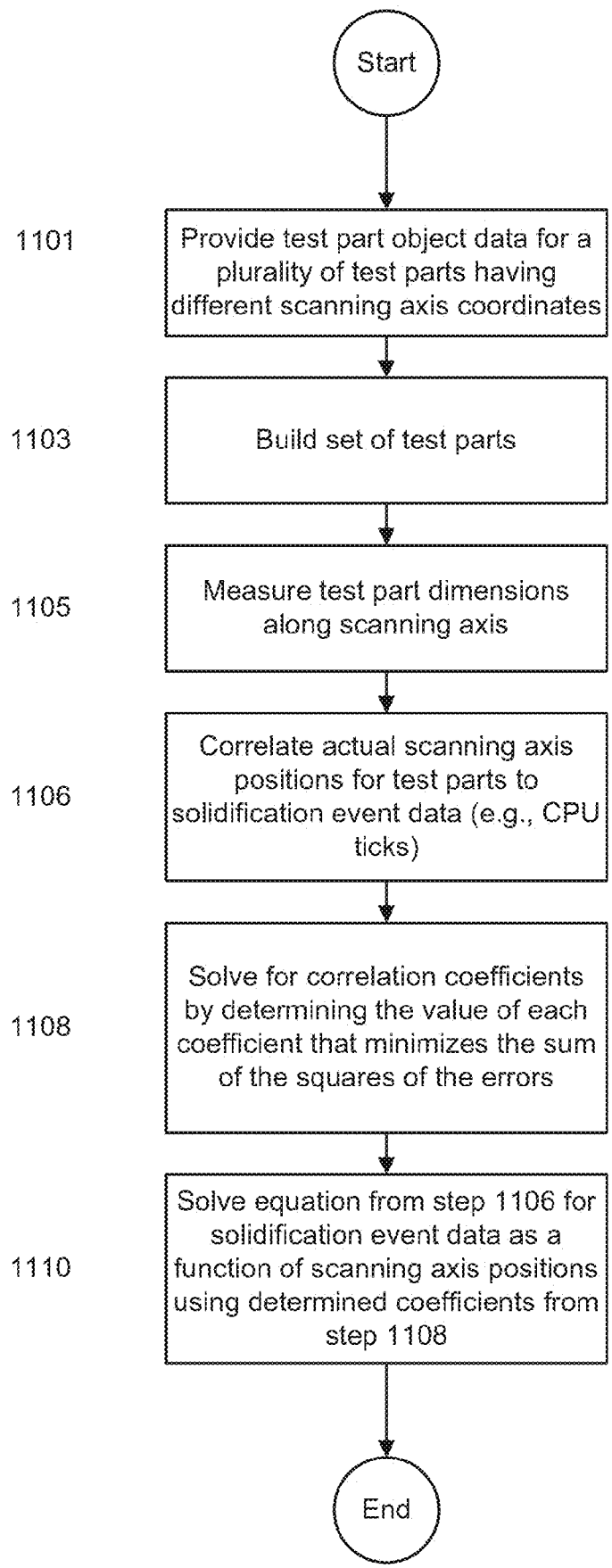
FIG. 17 is a flow chart used to illustrate a first method for providing a linear solidification device scanning speed variation compensation algorithm.

Referring to FIG. 17, a method for correlating original object data to modified object data to compensate for scanning and y-axis speed variations is depicted. In accordance with the method, a plurality of test part object data is provided in step 1101 wherein each test part has different coordinates along the scanning and y-axes. In the example of FIG. 17, the test part object data is preferably time-based (e.g., CPU ticks). The time-based object data may be determined by mapping the object onto a build envelope (see FIG. 11C) to determine the scanning axis or y-axis locations at which a solidification energy source energization state event occurs. Using an average scanning speed based on the total time required to scan one line along the entire build envelope in the scanning axis direction, the locations can be converted to time values. The time values may be converted to CPU ticks using the CPU speed (e.g., in MHz/sec). The time values are then supplied in sets of string data which are used to solidify a solidifiable material and form the test parts in step 1103. In step 1105, the actual scanning axis coordinates of each test part are measured.

Using known curve-fitting techniques, the scanning axis positions measured in step 1105 are correlated to the solidification energy source state event data (e.g., CPU ticks) in step 1106. In one example, the following equation is obtained from such curve-fitting techniques:

$$f(t)=c_3 t^3+c_2 t^2+c_1 t+c_0 \qquad (7)$$

wherein, f(t)=scanning axis or y-axis position (e.g., in mm) relative to scanning axis boundary 344 (FIG. 11B);

t=time at which f is reached relative to the time at which the line scanning operation is at the scanning axis or y-axis boundary 344 (FIG. 11B); and $c_0$, $c_1$, $c_2$, $c_3$=correlation coefficients (constants), where $c_3$ has units of mm/(CPU ticks)$^3$, $c_2$ has units of mm/(CPU ticks)$^2$, $c_1$ has units of mm/CPU ticks, and $c_0$ has units of mm.

In step 1108, any applicable correlation coefficients (e.g., $c_0$, $c_1$, $c_2$, $c_3$) are obtained, for example, by determining the value of each correlation coefficient that minimizes the sum of the square of the error in the correlation. In step 1110, the correlation from step 1106 is solved to obtain modified object data as a function of original object data and scanning axis position (or y-axis position as desired). This resulting correlation may then be stored on a non-transitory computer readable medium and used in a set of computer executable instructions to obtain modified object data from original object data. In one preferred example, the original object data comprises sets of original solidification energy source state event data items, each data item being a scanning axis or y-axis coordinate f (relative to a scanning axis boundary such as boundary 344 in FIG. 16B) at which a solidification energy source state event (e.g., activation or deactivation) occurs, and the modified object data comprises sets of modified solidification energy source event data items, each data item being a time (e.g., CPU ticks) when a solidification energy source state event occurs, wherein the modified object data items are based on the correlation of step 1106. Thus, the method of FIG. 17 provides modified object data items, each of which is a function of a corresponding original object data item and its associated scanning axis location.

Figure 18:
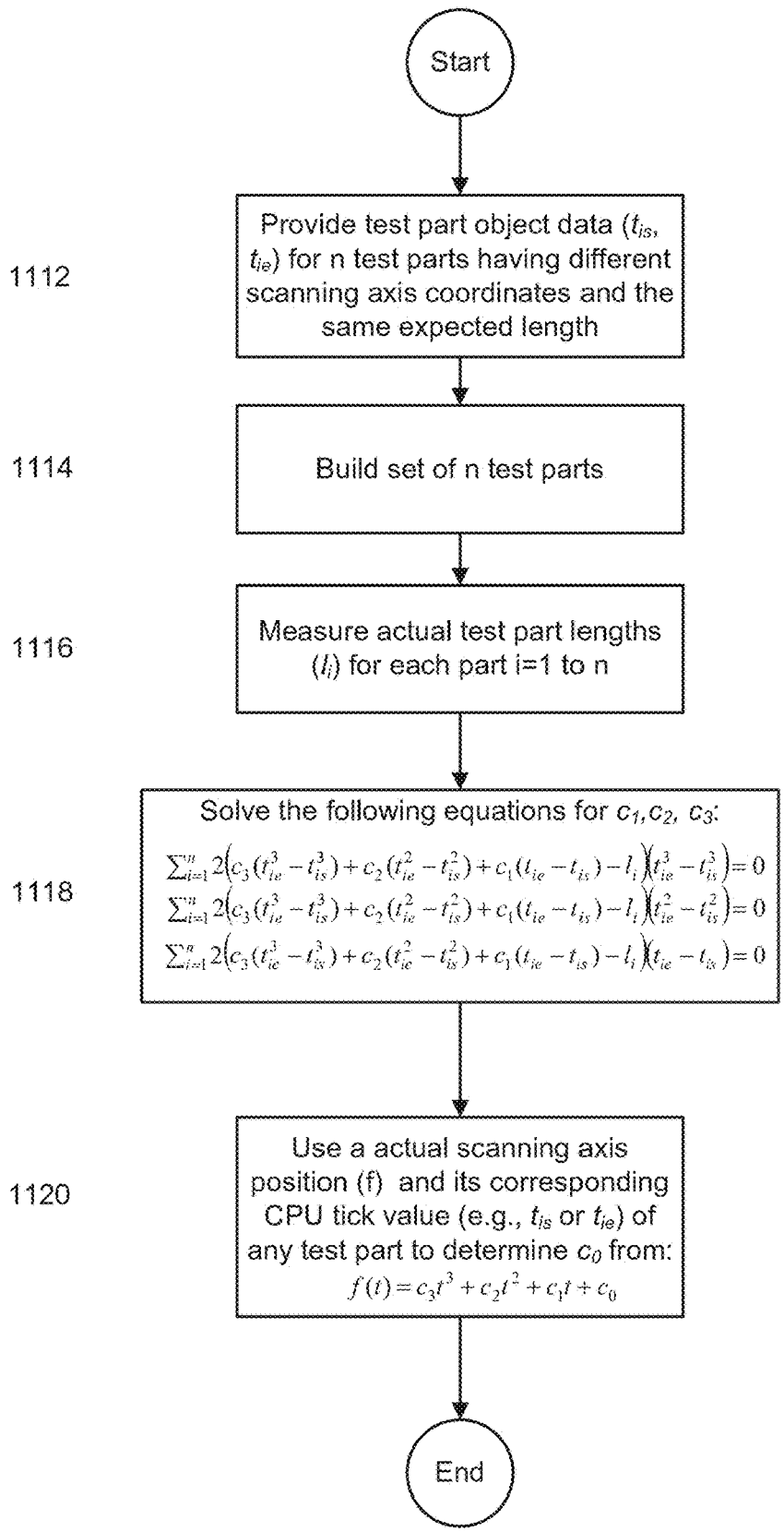
FIG. 18 is a flow chart used to illustrate a second method for providing a linear solidification device scanning speed variation compensation algorithm.
Figure 20:
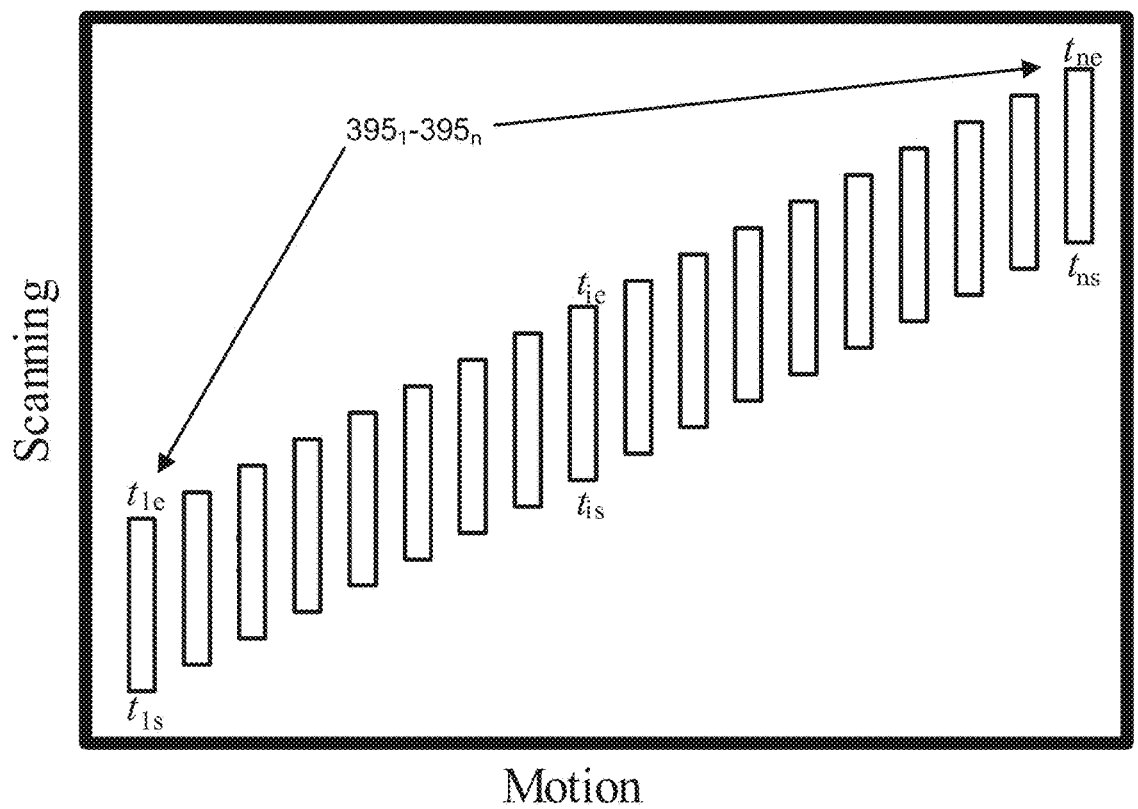
FIG. 20 is a schematic depicting a build envelope with a plurality of rectangular test parts used to provide a linear solidification device scanning speed variation algorithm.

FIG. 18 is a flow chart depicting a specific implementation of the method of FIG. 17. In the method of FIG. 18, the correlation of equation (7) is used to correlate time-based solidification energy source state event data (CPU ticks) to position based data (scanning axis or y-axis position in mm). In accordance with the method, test part object data based on the desired shape and size of test parts is obtained in step 1112. The test part object data is provided for a plurality of n test objects having a unique test object index ranging from i=1 to n. In one example, the test parts are mapped on to a build envelope as shown in FIG. 20. Test parts $395_1$ to $395_n$ are preferably rectangular bars and map onto scanning axis coordinates that define an equal length for each test part. In the example of FIG. 20, the test parts are spaced apart along the x axis and have scanning axis coordinates that overlap with their adjacent neighbors. Thus, part 1 has an ending scanning axis coordinate (at which the solidification energy source is deactivated) that has a higher value than the beginning scanning axis coordinate for its immediate neighbor, part 2.

Using a known average scanning speed of the linear solidification device (determined as described previously), the scanning axis coordinates for each test part can be converted to CPU tick values at which scanning begins and ends for each part. Thus, for part 1 scanning begins at a CPU tick value of $t_{1s}$ and ends at a CPU tick value of $t_{1e}$. The CPU tick values are provided as data strings that each correspond to a cross-section (z-axis location) and a travel axis (x-axis location), such as those shown in FIG. 11D or FIGS. 11F and 11G. Using a linear solidification device of the type described previously, a solidifiable material is solidified to create the test parts (step 1114). In step 1116 the length $l_i$ of each test part is measured.

In step 1118, the correlation coefficients $c_0$, $c_1$, $c_2$, and $c_3$ are obtained by determining the value of each correlation coefficient that minimizes the sum of the square of the error in equation (5). For example, a total error F may be defined as follows:

$$F(c_3, c_2, c_1, c_0) = \Sigma_{i=1}^{n} (c_3(t_{ie}^3 - t_{is}^3) + c_2(t_{ie}^2 - t_{is}^2) + c_1(t_{ie} - t_{is}) - l_i)^2 \quad (8)$$

wherein, F=sum of squares of error (also referred to as the sum of squared errors of prediction (SSE)) in mm;
$t_{ie}$=solidification energy source deactivation time for the test part (e.g., CPU ticks);
$t_{is}$=solidification energy source activation time for the test part (e.g., CPU ticks);
$l_i$=measured length of test part;
$c_0$, $c_1$, $c_2$, $c_3$=correlation coefficients, where $c_3$ has units of mm/(CPU ticks)$^3$, $c_2$ has units of mm/(CPU ticks)$^2$, $c_1$ has units of mm/CPU ticks, and $c_0$ has units of mm; and
i=test part index (ranging from 1 to n test parts)

The partial derivative of equation (8) with respect to each correlation coefficient may be set equal to zero to develop a system of three equations that can be solved to obtain $c_1$, $c_2$, and $c_3$:

$$\frac{\partial F}{\partial c_3} = \sum_{i=1}^{n} 2(c_3(t_{ie}^3 - t_{is}^3) + c_2(t_{ie}^2 - t_{is}^2) + c_1(t_{ie} - t_{is}) - l_i)(t_{ie}^3 - t_{is}^3) = 0 \quad 9(a)$$

$$\frac{\partial F}{\partial c_2} = \sum_{i=1}^{n} 2(c_3(t_{ie}^3 - t_{is}^3) + c_2(t_{ie}^2 - t_{is}^2) + c_1(t_{ie} - t_{is}) - l_i)(t_{ie}^3 - t_{is}^3) = 0 \quad 9(b)$$

$$\frac{\partial F}{\partial c_1} = \sum_{i=1}^{n} 2(c_3(t_{ie}^3 - t_{is}^3) + c_2(t_{ie}^2 - t_{is}^2) + c_1(t_{ie} - t_{is}) - l_i)(t_{ie}^3 - t_{is}^3) = 0 \quad 9(c)$$

Once correlation coefficients $c_1$, $c_2$, and $c_3$ are obtained, they can be used with equation (7), the known starting or ending scanning axis coordinate f and the corresponding solidification energy source state event data (e.g., $t_{ie}$ or $t_{is}$) values of any test part to obtain $c_0$ (step 1120).

Figure 19:
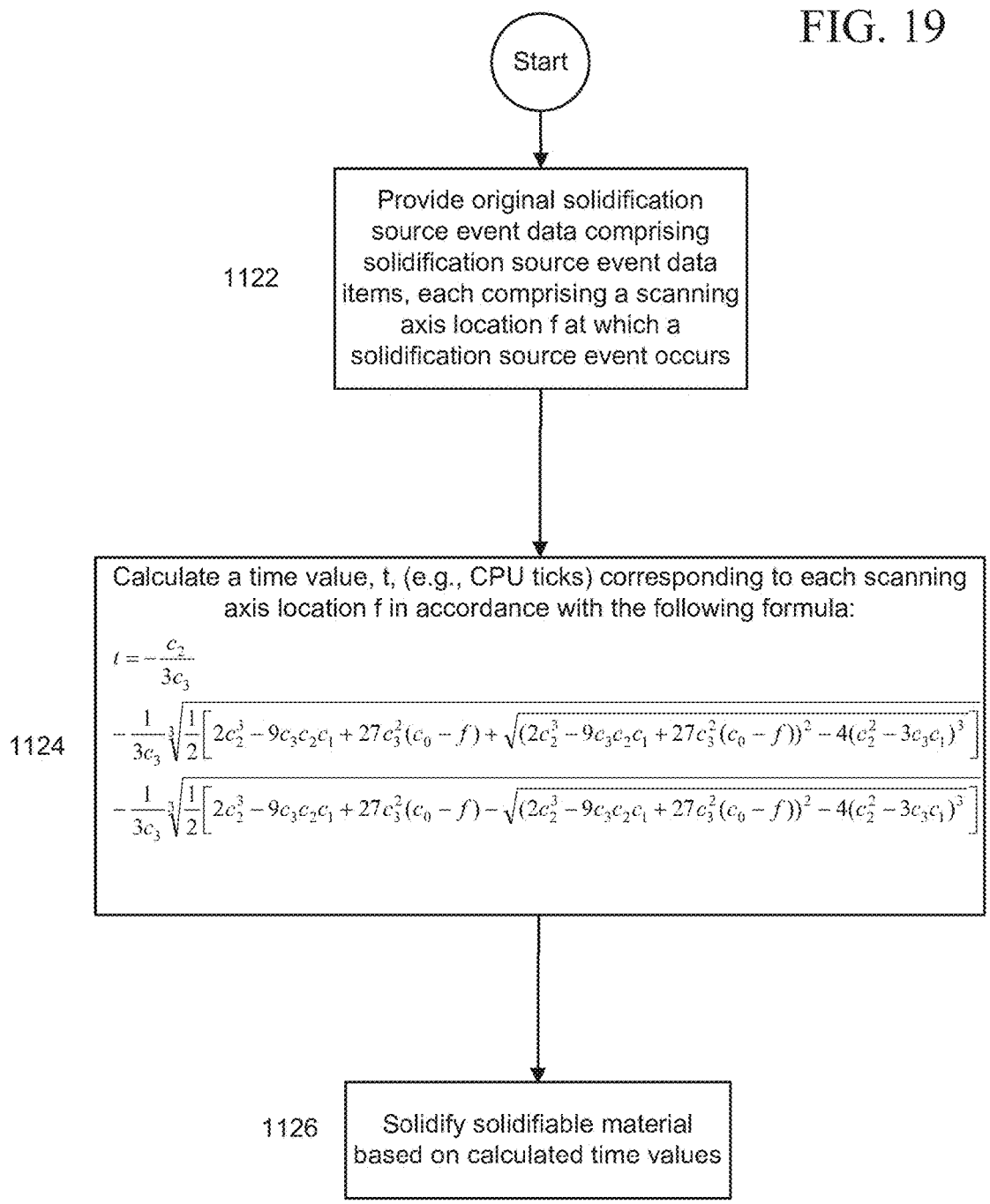
FIG. 19 is a flow chart used to illustrate a method of making a three-dimensional object from a solidifiable material using modified solidification energy source state event data to compensate for variations in linear solidification device scanning speed as a function of scanning axis position.

Referring to FIG. 19, a method of converting original object data to modified object data to compensate for variations of scanning speed as a function of scanning axis position (or y-axis position) is described. In accordance with the method, original solidification energy source state event data is provided which comprises a plurality of solidification energy source state event data items. A plurality of modified solidification energy source state event data items are calculated wherein each modified solidification energy source state event data item is calculated based on a corresponding original solidification energy source state event data item and the scanning axis position or y-axis position (relative to a scanning axis border) with which the original solidification energy source state event data item is associated. The solidifiable material is then solidified based on the modified solidification energy source state event data items.

For example, a set of original object data strings may be provided in step 1122 for each cross-section of a three-dimensional object corresponding to a particular build (z) axis location, wherein each data string corresponds to a particular travel axis (x-axis) location. Each set of data strings may correspond to a strip oriented along the y-axis as illustrated in FIG. 11C or the scanning axis as illustrated in FIG. 23. In one example, each data string includes one or more items that are indicative of a solidification energy source state event. Thus, for example, in one original object data string a scanning axis position coordinate of 15 mm may indicate a position at which the solidification energy source is activated to begin solidification, and an adjacent scanning axis position coordinate of 45 mm may indicate a position at which the solidification energy source is deactivated.

In step 1124 each scanning axis or y-axis position coordinate (f) is converted to a CPU tick value (t) using the following equation, which is equation (7) rearranged to solve for t:

$$t = -\frac{c_2}{3c_3} - \frac{1}{3c_3}\sqrt[3]{\frac{1}{2}[2c_2^3 - 9c_3c_2c_1 + 27c_3^2(c_0 - f) + \sqrt{(2c_2^3 - 9c_3c_2c_1 + 27c_3^2(c_0 - f))^2 - 4(c_2^2 - 3c_3c_1)^3}]} - \frac{1}{3c_3}\sqrt[3]{\frac{1}{2}[2c_2^3 - 9c_3c_2c_1 + 27c_3^2(c_0 - f) + \sqrt{(2c_2^3 - 9c_3c_2c_1 + 27c_3^2(c_0 - f))^2 - 4(c_2^2 - 3c_3c_1)^3}]} \quad (10)$$

wherein, f=scanning axis or y-axis position relative to the scanning axis or y-axis build envelope boundary 344 (FIG. 11B) based on part data;
t=modified solidification energy source state event data in CPU ticks that compensates for variable speed of scanning as a function of scanning axis position; and
$c_0$, $c_1$, $c_2$, and $c_3$=correlation coefficients.

As discussed previously, in certain exemplary methods of making a three-dimensional object by solidifying a solidifiable material, it is desirable to modify object data representative of the three-dimensional object both to compensate for variations in scanning speed along the scanning or y-axis as well as to compensate for a non-orthogonal angle α between the scanning axis and the travel (x) axis. For example, the method of FIG. 25 could be modified so that step 1166 utilizes step 1124 of FIG. 19 in determining the data strings for solidification. In that case, the object data strips obtained in step 1164 of FIG. 25 would be compensated to account for α and the object data strips would then be converted into data strings using step 1124 of FIG. 19 to compensate for scanning speed variations along the scanning axis. Alternatively, the method of FIG. 26 could be modified such that step 1124 of FIG. 19 is used in step 1188 of FIG. 26 to arrive at data strings that are compensated for both α and scanning speed variations along the scanning axis.

In a preferred example, an apparatus for making a three-dimensional object is provided which includes a linear solidification device, a controller, and a non-transitory computer readable medium having computer executable instructions programmed thereon for receiving original object data and calculating modified object data items based on original object data items using equation (10) or another suitable correlation, including instructions for carrying out the previously described methods of modifying object data to compensate for the non-orthogonal angle α between the scanning and travel axes. The linear solidification device is preferably configured similarly to device 88, and the controller is preferably operatively connected to the solidification energy source of the linear solidification device to selectively activate and deactivate the solidification energy source based on the modified object data determined by equation (10).

Correlations other than that of equation (10) may be used to compensate for variations in scanning speed along the scanning axis or y-axis. Such correlations may also be combined with the methods of modifying object data to compensate for the non-orthogonal angle α between the travel axis and scanning axis described previously. In another embodiment, the data values indicative of changes in the energization state (e.g., the number of CPU ticks as exemplified in FIGS. 11D, 11F, and 11G) are adjusted based on their corresponding distance from the center point of the linear solidification device 88). In one implementation, the string data at any string index value n is adjusted as follows:

$$\text{New CPU ticks} = \text{Old CPU ticks} + \Delta \text{CPU ticks} * C \tag{11}$$

wherein, ΔCPU ticks is calculated by subtracting Old CPU ticks from the center point CPU ticks, and C is a dimensionless constant. The variable "center point CPU ticks" refers to the number of CPU ticks at which the solidification energy will strike the center point. In general, it will correspond to the mid-point of a full scan line along the scanning axis direction.

Thus, in equation (11), the values of old CPU ticks comprise original object data items, and the values of new CPU ticks comprise modified object data items. Equation (11) may be used following step 1166 of the method of FIG. 25 or following step 1188 of the method of FIG. 26 to yield object data that has been modified to compensate both for the non-orthogonal angle α between the scanning and travel axes and for scanning speed variations along the scanning axis.

Equation (11) may also be modified for use with linear distances before they are converted to CPU ticks. For example, referring to FIG. 10, a three-dimensional object may be sliced into a plurality of slices such as 302i where i ranges from 1 to the maximum number of slices n. A given slice may be projected onto the build area as shown in FIG. 11C. Each object strip 304j will have locations that define a distance relative to a reference location along the scanning axis direction (e.g., border 344 where y=y₀) where the energization state of the solidification energy source 90 changes. The center point may also be defined relative to the same reference location. For each location along the travel axis (x-axis), there will be a plurality of y-axis values (relative to y₀ border 344) at which the energization state changes. For each strip shown in FIG. 11C, the energization state will change twice. Thus, for a given position along the travel axis (x-axis), each scanning axis value at which the solidification energy source energization state changes may be corrected to account for the scanning axis variation in solidification energy scanning speed as follows:

$$SA_{new} = SA_{old} + (SA_{center\ point} - SA_{old}) * C \tag{12}$$

wherein, $SA_{old}$ is a scanning axis (or y-axis) position relative to the scanning axis (or y-axis) reference location (e.g., border 344 in FIG. 11C) at which the energization state changes as determined by placing (mathematically or graphically) a slice 302i of the three-dimensional object onto a build envelope;

$SA_{center\ point}$ is the location of the center point relative to the scanning axis (or y-axis) reference location (e.g., border 344 in FIG. 11C);

$SA_{new}$ is the new, corrected scanning axis (or y-axis) value at which the energization state changes; and C is a dimensionless constant.

The values of $SA_{new}$ may then be converted to CPU ticks to define the string data for solidification. In equation (12) the $SA_{old}$ values comprise original object data items, and the $SA_{new}$ values comprise new object data items. Equation 12 may be used between steps 1164 and 1166 of the method of FIG. 25 or between steps 1186 and 1188 of the method of FIG. 26 to obtain modified object data that is compensated for both the non-orthogonal angle α between the scanning and travel axes and for scanning speed variations along the scanning axis.

The value of the dimensionless constant C in equation (12) may be determined by trial and error. In one example, a plurality of linear sections are solidified along the travel axis (x-axis) direction. The string data on which the linear sections are based are such that each line is equally spaced apart from its neighbors. In the case of a data string that reads String (n)=(FFFFFF, n, 10000, 10500, 11500, 12000, 22000, 22500, 32500, 33000, 43000, 43500), each linear section would be expected to have a scanning axis thickness corresponding to 500 CPU ticks and equal spacings between linear sections equal to 1000 CPU ticks. If the scanning speed varies along the scanning axis direction, the actual solidified linear sections will not be spaced apart by equal amounts as the object data would otherwise dictate. For example, where the scanning speed is faster at the ends of the scan line relative to the center point, the spacings between adjacent linear sections will increase as you move along the scanning axis away from the center point (in either the positive or negative scanning axis direction). C can be calculated by ratioing the distances between any two adjacent strings (and/or by averaging the ratios of adjacent neighbors) or by making adjustments to C and repeating the solidification process until the spacings between linear sections are substantially equal.

Thus, in one method of making a three-dimensional object, a three-dimensional object is sliced into adjacent slices along a build axis (e.g., as shown in FIG. 10). Each slice is then subdivided into a set of linear strips, each extending along the scanning axis direction. A center point is determined by determining the position along the scanning axis direction at which the distance between solidification energy deflected by the rotating energy deflector 92 and the solidifiable material is a minimum. In one variation, each strip is then converted to a set of scanning axis or y-axis values (which may be, for example, linear distances relative to a build envelope border or CPU tick values) at which the solidification energy source 90 energization state changes. Each scanning axis value is then corrected to account for the variation in scanning speed along the scanning axis, preferably by an amount that varies with the distance between the location of the scanning axis value along the scanning axis and the center point, such as by using equation (12). The corrected scanning axis values are then used by the microcontroller to perform the solidification process. In another variation, the set of linear strips is converted into CPU ticks and then corrected, such as by using equation (11).

In many three-dimensional object building processes, there will be several adjacent layers that are identical and which therefore can be represented by identical object layer data. Referring to FIG. 11E, object layer data is depicted in graphical form which may be used to form several layers. In certain cases it is preferable to perform line scanning operations both when linear solidification device 88 is moving from left to right and from right to left along the travel axis (x-axis). This presents no problem when the object is symmetrical about the mid-line of the travel (x-axis) direction. However, when multiple identical asymmetrical layers are formed, the microcontroller unit must read the string data sets in the opposite order when the linear solidification device 88 is moving in opposite directions. For example, the table of FIG. 11F depicts multiple sets of string data which correspond to the object layer data of FIG. 11E. When moving linear solidification device 88 from left to right, the first set of string data at which solidification occurs has a string index of n=20 and a computer memory index value m of zero. The last set of string data at which solidification occurs has a string index of n=60. When linear solidification device 88 reverses direction to go from right to left it cannot perform the solidification starting with computer memory index m=0 and data string index n=20 because that data was defined for the left hand side of FIG. 11E, not the right hand side. Thus, performing line scanning operations based on such data would solidify a pattern that is the reverse of the desired pattern. The microcontroller unit or host computer could calculate and store full sets of data strings for the right to left direction based on the data generated for the left to right operation. However, this operation would consume excessive memory and processor capacity.

In one method of operation, the data for adjacent identical layers is inverted by the host computer and transmitted to the microcontroller unit. In accordance with the method, identical three-dimensional object layer data corresponding to first (even) and second (odd) adjacent layers of solidifiable material used to form the three-dimensional object is provided. The object layer data is subdivided into respective first and second pluralities of object cross-section strips, wherein each object cross-section strip in the first plurality of object cross-section strips has a set of strip data and a strip index value n(even) ranging from 0 to the maximum index value of $N_{max}-1$ in the first plurality of object cross-section strips. Each strip in the second plurality of object cross-section strips has a set of strip data and a corresponding strip index value n(odd), and the strip data corresponding to each respective value of n(odd) for the second plurality of object cross-section strips equals the strip data for the first plurality of object cross-section strips that corresponds to the string index value n(even) equal to $N_{max}-1$ minus the respective value of n(odd). As each odd layer is solidified, the host computer can simply identify the correct even layer data string that corresponds to each odd layer data string and transmit the even layer data string to the microcontroller, thereby avoiding the need to store a set of odd layer data strings. The use of this inversion technique allows data for multiple layers that are solidified in opposite directions to be determined by creating object layer data for only one layer and either inverting (for layers solidified in the opposite travel axis (x-axis) direction) it or using it (for layers solidified in the same travel axis (x-axis) direction) for all subsequent layers having the same cross-sectional shape.

An exemplary inversion used to reduce the storage capacity of a non-transitory computer readable medium required to store three-dimensional object data corresponding to a plurality of object layers may be described as follows: A first set of object layer data is stored on a non-transitory computer readable medium. The first set of object layer data comprises a first set of $M_{max}$ data strings such as those depicted in FIGS. 11D, F, and G. Each data string in the first set may be represented as d(0, m), wherein 0 indicates that the string belongs to the first set, and m is a computer memory index value unique to the string. The index values m range from 0 for the first data string to $M_{max}-1$ (or $M_{total}-1$) for the last string.

A program is stored on the non-transitory computer readable medium (which may be the same or different as the one on which the first set of object layer data is stored) with instructions for calculating a second set of data strings for a second set of object layer data. The layers to which the first and second sets of object data correspond are preferably adjacent one another and define an alternating layer sequence (first set, second set, first set, second set, etc.). The data strings for the second set of object layer data may be calculated using the following equation such that the data strings for the second set of object layer data correspond to those of the first layer of object data in accordance with the following equation:

$$d(l,m)=d(0,M_{max}-1-m) \quad (13)$$

wherein, d (l,m) is the string data for layer 1 at a given value of the computer memory index, m.

Using equation (13), the host computer can simply identify the data string for the $0^{th}$ layer that corresponds to each data string for the $1^{st}$ layer and transmit it to the microcontroller. Neither the host controller nor the microcontroller need store the d (l,m) strings in memory. As mentioned previously, each location along the travel axis (x-axis) direction of build envelope 342 may uniquely correspond (directly or indirectly) to a string index n. The computer memory index is used to avoid storing data strings that are empty because they correspond to locations where solidification will not take place. However, the data strings for the entire build envelope can be related to one another using an equation similar to equation (13) by replacing m with the string index n and replacing $M_{max}$ with the maximum number of data strings for the build envelope, $N_{total}$.

The foregoing data inversion technique is illustrated in FIGS. 11F and G. In the example, $N_{max}$ (as may be calculated by equation (1)) is 101 and the string indices range from 0 to $N_{max}-1$ (i.e., 0 to 100). Thus, when solidifying from right to left (FIG. 11G) along the travel axis (x-axis) the set of string data for the odd layer having a string index of 40 (starting from n=0 at the right-hand build envelope boundary 345 in FIG. 11B) is the same as the set of string data used for the even layer string having the string index n=100−40=60. Thus, the string indices are always started at zero at both the left and right hand boundaries, but the inversion of the sets of string data by the host computer as reflected in FIGS. 11F and 11G avoids the need for recalculating new string data for the odd layer from the object data. Instead, the even layer data can simply be inverted and supplied to the microcontroller unit. In another example, the inversion process can be handled based on the computer memory index value m instead of the string index value n using equation (13). Thus, for example, when solidifying the odd layer (going from right to left) the string data for m=1 can be calculated by taking the even layer data at m=$M_{max}$−1−m(odd)=39 ($M_{max}$ is the total number of computer index values, which is 41, not the maximum index value which is 40). This latter technique avoids the need to read string data for strings at which no solidification occurs and instead requires reading only those strings at which there is solidification, which by definition are those assigned a computer memory index value m. The foregoing data inversion technique may also be used data strings derived from object data modified to compensate for the non-orthogonal angle α between the travel and scanning axes.

As mentioned previously, in certain implementations of the systems described herein a motor movement parameter such as a number of motor steps is used to indirectly indicate when the linear solidification device 88 is at an travel axis (x-axis) location corresponding to a particular linear scan or string data index, n. For a desired index value, n, the number of steps from the relevant build envelope travel axis (x-axis) boundary, 343 or 345 (FIG. 11B), can be calculated using the following formula:

$$\text{Steps} = W(S)(n)(RPM)(F)/60 \tag{14}$$

wherein, Steps is the number of motor steps from the build envelope travel axis (x-axis) boundary to the location at which the line scan having the index value n is performed;

W is a ratio of motor steps for motor 76 per unit length in the travel axis (x-axis) direction in steps/mm;

S is the speed of the motor 76 in mm/second;

RPM is the rotational frequency of the rotating energy deflector in revolutions per minute; and F is the number of facets on the rotating energy deflector.

The variable W can itself be considered a "motor movement parameter" since it depends on a number of motor steps. As indicated previously, W can be estimated from known mechanical relationships between the rotational speed and gear ratio of motor 76 and the diameters of pulleys 82a and 82b. One method of estimating W is to determine the number of estimated steps required to traverse the travel axis (x-axis) length L of build envelope 342 based on such known mechanical relationships. However, due to thermal effects and other non-idealities, the estimated value of W may not be accurate. In cases where solidification is performed bi-directionally with respect to the travel axis (x-axis) (starting from the build envelope boundaries 343 and 345), the error in W can cause misalignment between odd and even layers because the calculated number of steps will not correspond to the desired travel axis (x axis) location believed to correspond to the value of n used in equation (14). For example, if a build process is started from the left to right direction along the travel axis (x-axis) direction, and W is too high, a given value of n will cause solidification to occur farther to the right than desired. As a result, the right-most boundary of the part will be farther to the right than desired. If solidification is then reversed (right to left), the number of steps corresponding to a given value of n will be shifted farther to the left than desired. Thus, when the resulting part is viewed from the same orientation as the one in which it was built (i.e., with the side that was the left side during formation positioned to the left of the side that was the right side during formation), the portions of the part that were solidified in the left to right direction will have a right hand border that is shifted to the right relative to the portions of the part that were solidified in the left to right direction. The left hand border of the portions of the part solidified in the right to left direction will be shifted to the left relative to those solidified in the left to right direction. Conversely, if solidification starts from left to right and W is too low, when viewing the resulting part in the same orientation as the one in which it was built, the right-hand border of the portions solidified in the left to right direction will be shifted to the left relative to the portions solidified in the right to left direction, and the left-hand border of the portion solidified in the left to right direction will be shifted to the right when solidifying from right. As a result, in certain implementations it is desirable to adjust the motor movement parameter (e.g., W) based on test part measurement data. The test part measurement data may comprise the length of an offset dimension or gap between two or more sections of the test part. In certain cases where the data inversion method illustrated in FIGS. 11F and G is used, an offset is created between those sections of identical layers which are solidified in opposite directions along the travel axis (x-axis). The offset is then used to adjust the value of W.

One method of preparing a test part for use in determining the adjustment of the motor movement comprises forming a first series of layers of the test part by moving linear solidification device 88 in a first direction along the travel axis (x-axis) (e.g., left-to-right) and performing linear scan operations in the scanning axis direction. A second series of layers is then formed by moving linear solidification device 88 in an x-axis direction opposite the one used to form the first set of layers (e.g., right-to-left) and performing linear scan operations in the scanning axis direction. In certain implementations, the test part is formed using a ratio between the travel axis speed and the scanning axis speed that is low enough to maintain a scanning axis direction that is substantially perpendicular to the travel axis. In other implementations in which the ratio is higher, the methods of modifying object data to compensate for a non-orthogonal angle α between the scanning axis and travel axis are used to form the test part.

Figure 16A:
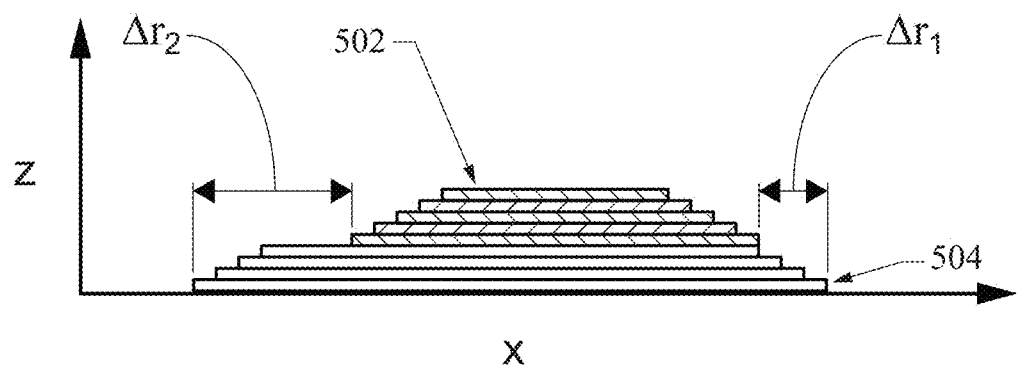
FIG. 16A is a view along the scanning (y) axis of a hemispherical test part used to adjust a motor movement parameter in a system for making a three-dimensional object from a solidifiable material in a closed housing configuration.
Figure 16B:
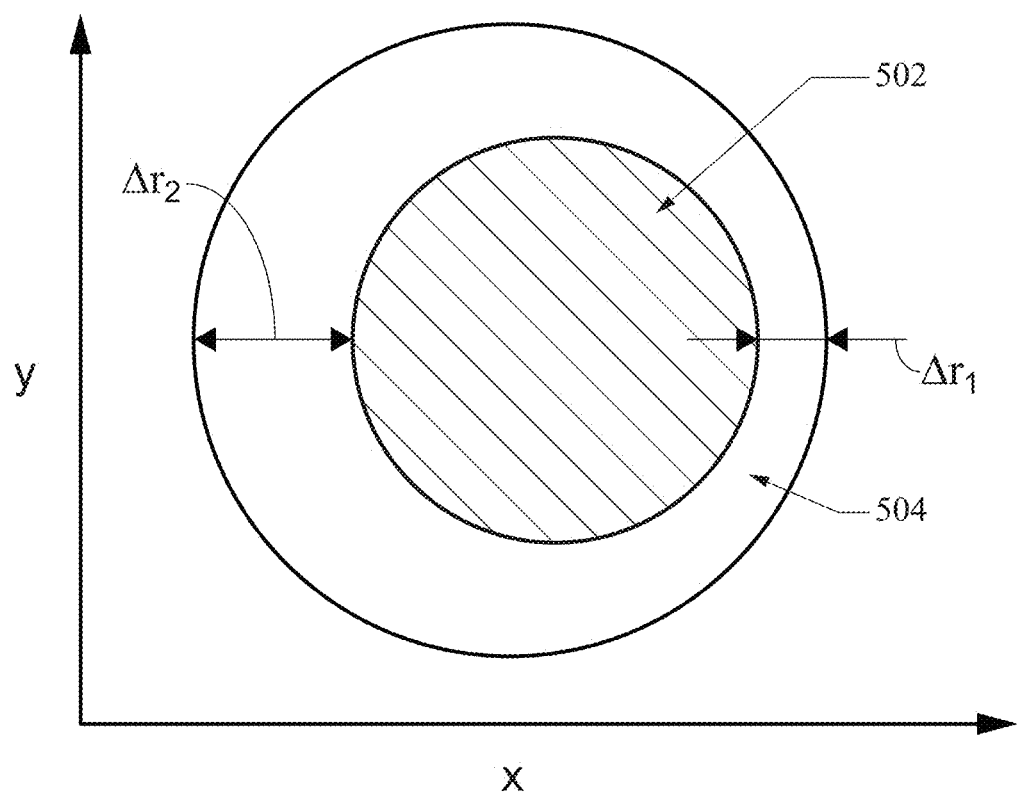
FIG. 16B is a view along the build (z) axis of the test part of FIG. 16A.

The test part may have a variety shapes, but in certain examples a simple rectangular block shape is used. In other examples, and as illustrated in FIGS. 16A and 16B, a hemispherical test part shape is used. In the formation of the test part, an initial value of the motor movement parameter is specified which is believed to yield the correct build envelope 342 length in the travel axis (x-axis) direction. In one preferred example, the motor movement parameter is a number of motor steps for motor 76 that is estimated to correspond to the known length L of build envelope 342. From this data, a predicted value of W can be calculated.

As indicated by equation (14), if the motor movement parameter is in error, the predicted value of W will also be in error, which in turn will cause the number of motor steps (Steps) calculated from equation (14) to be in error. The effects of such an error in W can be exemplified by referring again to the data of FIG. 11F. If a test part is built using that data, the first series of layers will all use the data of FIG. 11F and will be formed in the left to right direction along the travel axis (x-axis). The second series of layers will be formed in the right to left direction along the travel axis (x-axis). As the data indicates, for the left to right layers, the first linear scan going from the left to right direction will be performed at string index value n of 20. If the predicted value of W is greater than the actual value, the first linear scan will be offset farther to the right from the left hand build envelope boundary 343 than desired, as will all of the subsequent linear scans. As a result, all of the left to right (even) layers will be shifted to the right relative to the desired position. When solidification direction is reversed and the data of FIG. 11G is used, the first string at m=0, n=40 will be offset farther to the left from the right-hand build envelope boundary 345 than desired. Thus, when the test part is complete and viewed from the same orientation as its build orientation, the first set of layers formed in the left to right direction will be shifted to the right relative to the second set of layers formed in the right to left direction. The shift will produce a measurable offset dimension.

The test part's measured offset dimension can then be used to correct the value of W used by the microcontroller in accordance with equations (15)-(17):

$$\text{Step Offset} = \Delta L * W \tag{15}$$

$$\text{Corrected Build Envelope Length in Steps} = \text{Steps (Predicted)} + \text{Step Offset} \tag{16}$$

$$W_{corrected} = \text{Corrected Build Envelope Length in Steps}/L \tag{17}$$

wherein, $\Delta L$ is the measured offset dimension (mm) between the first and second sets of test part layers, and a positive value of $\Delta L$ indicates that the left to right layers are offset to the left relative to the right to left layers, while a negative value of $\Delta L$ indicates that the right to left layers are offset to the right relative to the right to left layers;

W is the original, predicted value of W (steps/mm);

L is the build envelope length (mm);

Steps (Predicted) is the original number of steps predicted to correspond to build envelope length L based on motor rotation frequency, gear ratio, and pulley diameter, which equals W*L, where L is the build envelope length in mm; and $W_{corrected}$ is the corrected value of W The value of $W_{corrected}$ can then be used with equation (15) in subsequent part building processes. The foregoing relationships can be generalized with respect to the build directions as follows: If solidification occurs in a first series of layers in a first direction and a second series of layers in a second direction (opposite the first direction), when viewing the part in an orientation (the viewing orientation) that is the same as the one in which it was built (the formation orientation) a value of W that is too low will cause the first set of layers to be shifted in the second direction relative to the first set of layers, and the value of $\Delta L$ used in equation (15) will be positive. Conversely, if the value of W is too high, the first set of layers will be offset in the first direction relative to the second set of layers, and the value of $\Delta L$ in equation (13) will be negative.

The relationship between the "viewing orientation" and the "formation orientation" can best be understood with an example. Each layer will be solidified by forming a series of linearly solidified sections starting from a build envelope origin and ending at a build envelope terminal point. A formation orientation can be selected by selecting an arbitrary coordinate system which will then define a direction going from the origin to the terminal point, such as the "positive x-axis direction" or "left to right." The "viewing orientation" used to measure the offset $\Delta L$ should then be the same as the formation orientation, such that when viewing the object the portion of the solidified object at which solidification began (the origin) has the same directional relationship to the portion of the solidified object at which solidification ended (the terminal point).

In certain examples, $\Delta L$ is measured using a caliper with a minimum measurement capability of 50 microns. In such cases, offset values $\Delta L$ of less than 50 microns cannot be measured, and layers formed in one direction may be offset from those formed in the other direction by up to 50 microns. In some cases, it may be desirable to increase the accuracy of the part building process by measuring smaller offset values $\Delta L$ and adjusting a motor movement parameter (e.g., W) accordingly. One method suitable for this purpose will now be described with reference to FIGS. 16A and 16B. In accordance with the technique, a generally hemispherical test part is built. A first set of layers 504 is formed by solidifying the solidifiable material only when linear solidification device 88 moves in a first (positive) direction along the travel axis (x-axis) (FIG. 11B). A second set of layers 502 is then formed by solidifying the resin only when linear solidification device 88 moves in a second (negative) direction opposite to the one used to form the first set of layers 504. In FIG. 16A, the layers 502 and 504 are viewed by looking in a direction perpendicular to the x-z plane (i.e., along the scanning or y-axis).

In accordance with the method, the completed test part is then placed under a microscope and viewed along the z (height) axis such that the points of origin of the layers are in the same relative positions along the travel axis (x-axis) as during the formation process (i.e., the points of origin of section 502 are farther out in the positive travel axis (x-axis) direction than the points of origin of section 504). Two circular sections 502 and 504 will be visible. If the motor movement parameter W is in error, the inner circle 502 will not be concentric with the outer circle 504, although their diameters parallel to the travel axis (x-axis) should be substantially co-linear. In such cases, two offsets, $\Delta r_1$ and $\Delta r_2$, may be measured between the travel axis (x-axis) extremes of each circular section 502 and 504. As shown in FIG. 16B, the travel axis (x-axis) location of section 502 that is farthest from the scanning axis may be subtracted from the travel axis (x-axis) location of section 504 that is farthest from the scanning axis to yield $\Delta r_1$. The travel axis (x-axis) location of section 504 that is closest to the scanning axis may be subtracted from the travel axis (x-axis) location of section 502 that is closest to the y-axis to yield $\Delta r_2$. If the motor movement parameter is correctly set, the value of $\Delta r_1 - \Delta r_2$ will be zero (or substantially zero). However, if the motor movement parameter is incorrectly set, $\Delta r_1 - \Delta r_2$ will be non-zero. As mentioned above, in the example of FIGS. 16A and 16B section 504 is formed only while linear solidification device 88 moves in the positive travel axis (x-axis) direction, and section 502 is formed only while linear solidification device 88 moves in the negative travel axis (x-axis) direction. The negative value of $\Delta r_1 - \Delta r_2$ indicates that the motor movement parameter (e.g., W) was set too low. Thus, by building additional test parts with increased values of W, the correct value (the one that yields $\Delta r_1 = \Delta r_2$) can be determined and input into the microcontroller for actual (non-testing) part builds. Equations (15)-(17) may be used to calculate a corrected value of the motor movement parameter ($W_{corrected}$) by substituting $\Delta r_1 - \Delta r_2$ for $\Delta L$.

Figure 12:
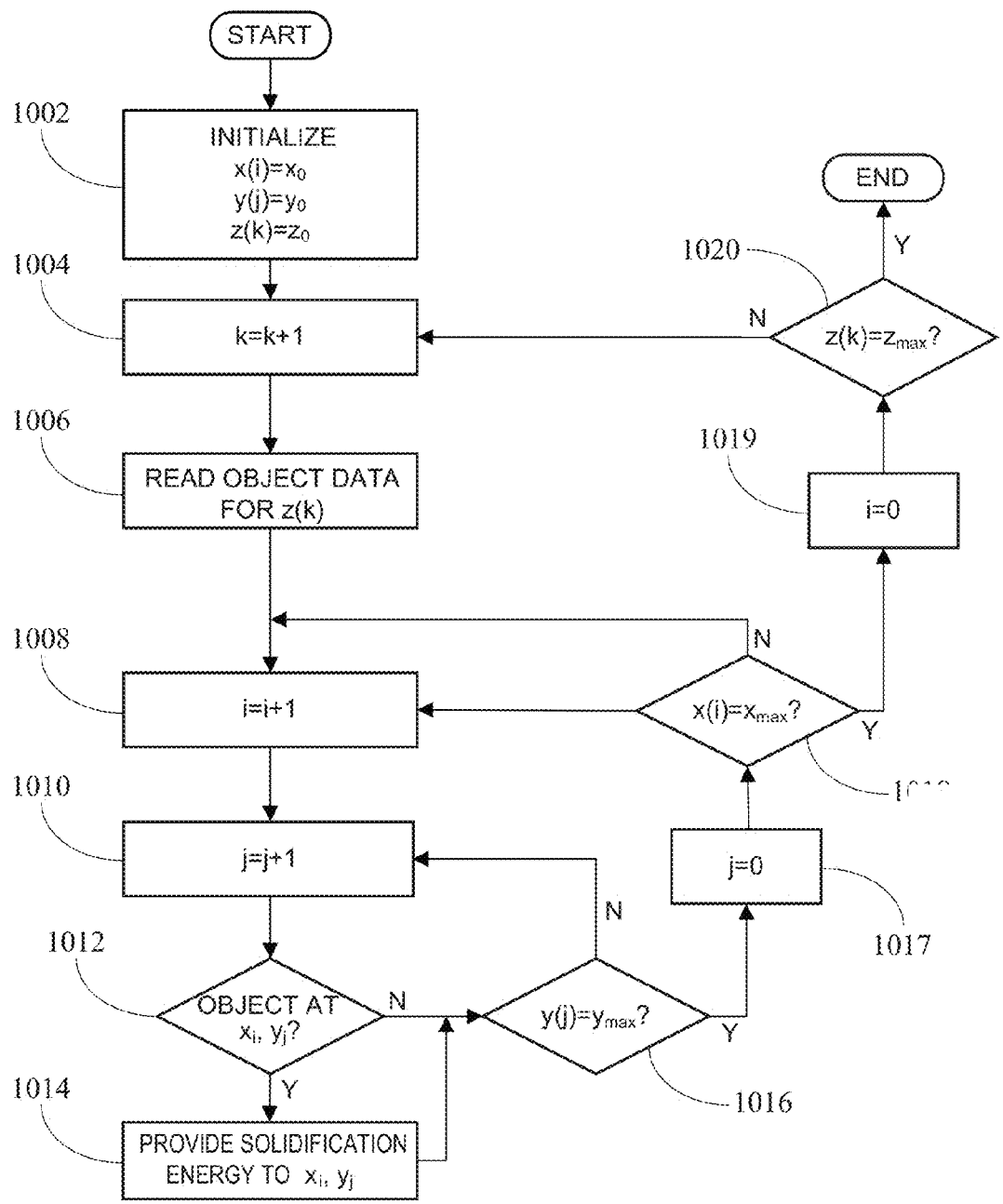
FIG. 12 is a flow chart used to illustrate a method of making a three-dimensional object from a solidifiable material using a linear solidification device.

Referring to FIG. 12, a method of forming a three-dimensional object using a linear solidification device such as linear solidification device 88 will now be described. In a preferred embodiment, the method is embodied in a set of computer readable instructions on a non-transitory computer readable medium which can be executed by a computer processor.

In accordance with the embodiment, at the start of an object build process, the x, y, and z positions are initialized to their starting positions with their indices i, j, and k set to 0, i.e., $x_0$, $y_0$, and $z_0$ (step 1002). In step 1004 the z-axis index (k) is incremented by one and object data for the first object slice at z(1) is read (step 1006). The travel axis (x-axis) index (i) is then incremented by one in step 1008 and the y-axis index (j) is incremented by 1 (steps 1008 and 1010). In step 1012, it is determined whether the x(i), y(j) location on the exposed surface of the solidifiable material corresponds to a region of the object (i.e., a location where solidification is desired based on the object data). If it does, solidification energy is provided to the location in step 1014. As explained previously, in certain implementations, step 1014 involves selectively activating or deactivating solidification energy source 90. In other implementations, step 1014 involves selectively activating location x(i), y(j) on a flexible mask to allow or prevent solidification energy to pass therethrough as the solidification energy source 90 remains continuously activated.

If the determination made at step 1012 indicates that no solidification is to occur at the x(i), y(j) location on the surface of the solidifiable material, control passes to step 1016 where it is determined whether the maximum y-axis position (i.e., the boundary of the build envelope in the y-axis direction) has been reached. If it has not been reached, the y-axis position index (j) is incremented by one, and control returns to step 1010. If the maximum y-axis position has been reached, control transfers to step 1017 at which the y-axis index (j) is reset to 0. In step 1018, it is determined whether the maximum travel axis (x-axis) position (i.e., the boundary of the build envelope in the travel axis (x-axis) direction) has been reached. If it has not, control transfers to step 1008, where the travel axis (x-axis) index is incremented by one. If the maximum travel axis (x-axis) position has been reached, control transfers to step 1019 where the travel axis (x-axis) position index (i) is reset to 0. In certain examples, once the maximum travel axis (x-axis) position is reached, linear solidification device 88 will travel in the opposite direction along the travel axis (x-axis) to solidify another slice of the object (bi-directional solidification), while in other examples, linear solidification device 88 will travel in the opposite direction without performing any solidification and will then solidify the next slice (uni-directional solidification).

In step 1020, it is determined whether the final object data slice ($z_{max}$) has been reached. If it has, the method ends. If the final slice has not been reached, control returns to step 1004, and the z-axis index (k) is incremented by one so that the object data for another slice can be processed. The process repeats until the last slice has been solidified.

The method of FIG. 12 may be modified to compensate for a non-orthogonal angle α between the scanning axis and the travel axis by modifying the object data representative of the three-dimensional object using any of the techniques described previously. The method may also be modified to compensate for scanning speed variations along the scanning axis using the techniques described previously, or to compensate for solidification power variations along the scanning axis using the techniques described below.

Figure 13:
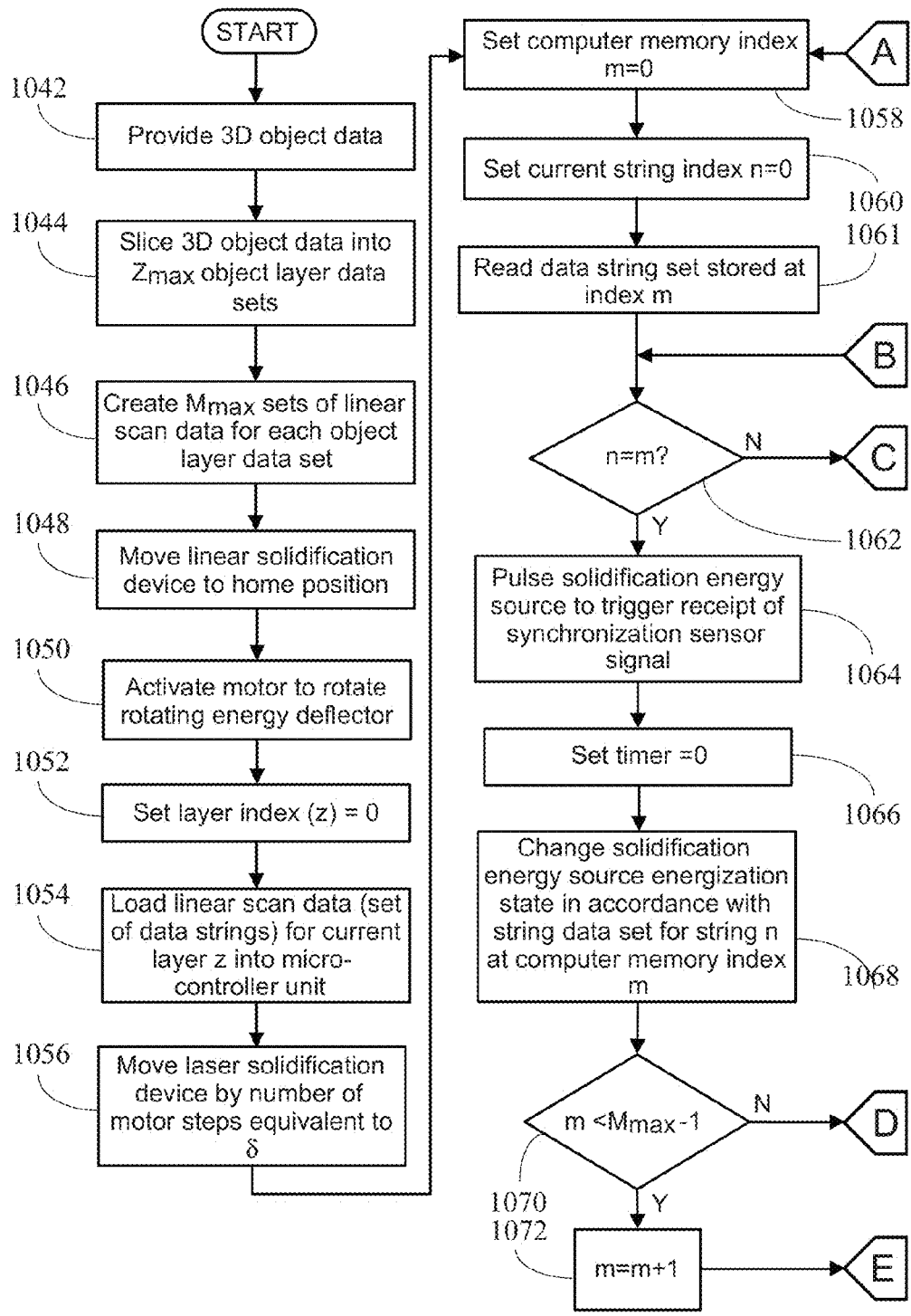
FIG. 13 is a flow chart used to illustrate an alternative method of making a three-dimensional object from a solidifiable material using a linear solidification device.
Figure 14:
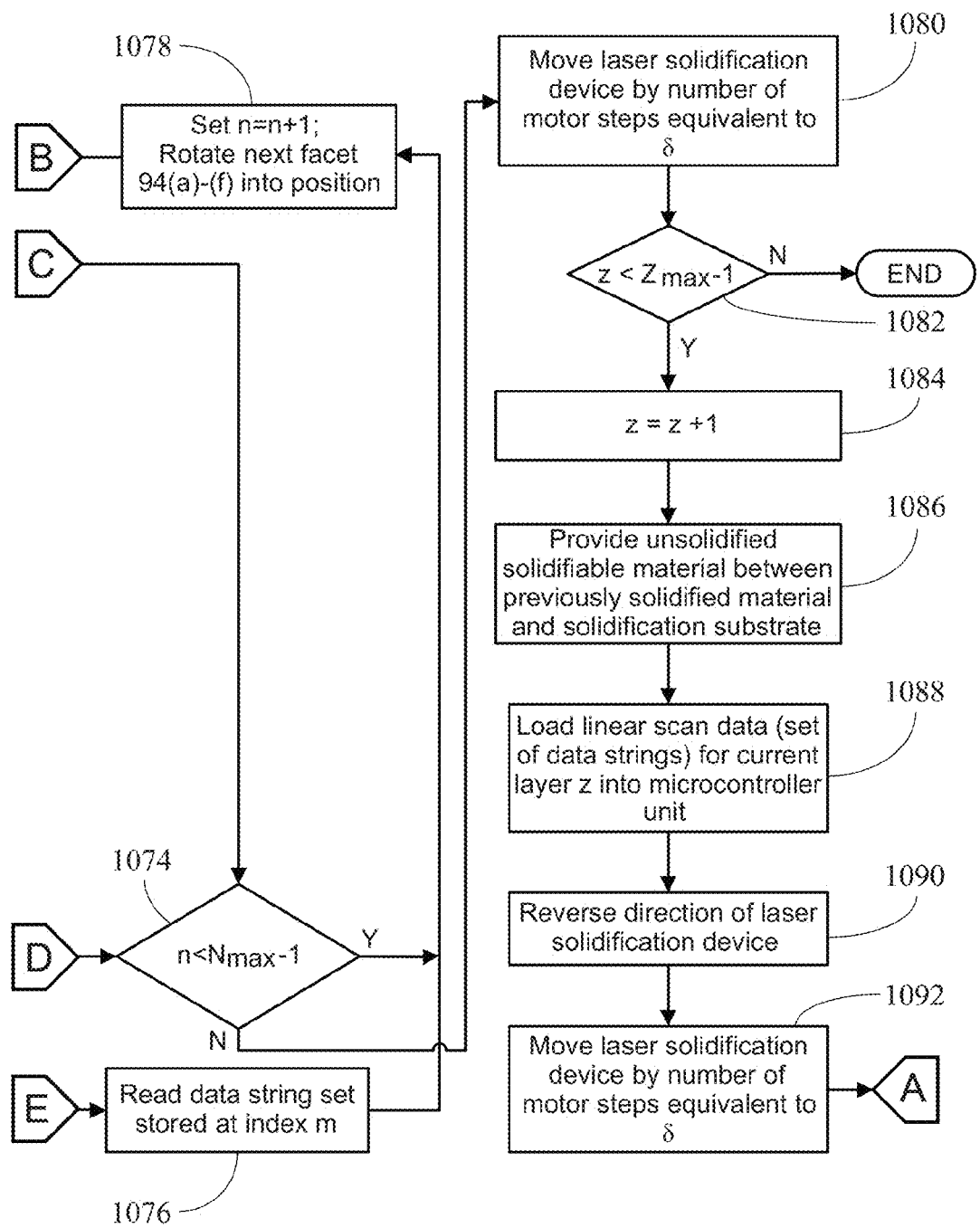
FIG. 14 is a flow chart used to illustrate the alternative method of FIG. 13.

Referring to FIGS. 13 and 14, another method of making a three-dimensional object using a linear solidification device such as linear solidification device 88 (or the previously described variants of device 88) is disclosed. In accordance with the method, three-dimensional object data is provided in step 1042. The data may take a variety of forms such as CAD/CAM data, STL data or other data that defines the shape of the object in three-dimensional space. In step 1044, the data is sliced into a number of object layer data sets $Z_{max}$, wherein each object layer data set corresponds to a particular layer identified by a value of the layer index z that ranges in value from 0 to $Z_{max}-1$. A graphical depiction of such slicing is exemplified by FIGS. 9 and 10. However, the actual slicing method comprises subdividing the three-dimensional object data along a specified axis. In preferred examples, the axis along which the subdividing is done corresponds to the build axis used in the solidification process. Such data slicing techniques are known to those skilled in the art and generally involve identifying the intersection of three-dimensional object data (such as that defined by STL files) with a slicing plane defined by a build axis coordinate. The intersection will define the object contours for the slice.

In step 1046, $M_{max}$ sets of linear scan data (e.g., sets of string data) are created for each object layer data set. Each layer has its own value of $M_{max}$ which refers to the total number of linear scans necessary to create that layer. $M_{max}$ will also be the maximum value of the computer memory index value m for the layer because it represents the number of data storage locations required to store the number of sets of data strings that include object solidification data in the particular layer. In contrast, the entire build envelope 342 (FIG. 11B) may have a different maximum number of data strings ($N_{max}$) associated with it which represents the maximum possible number of linear scans that could be performed in the build envelope 342.

In step 1048, linear solidification device 88 is moved to a home position within the x, y plane which may be defined by the position of an end of travel (EOT) sensor 346 (FIG. 11B). The home position is preferably offset from the left-hand boundary 343 of the build envelope 342 by a specified offset distance $\delta_L$. In certain examples, the left-hand boundary 343 defines an travel axis (x-axis) origin point $x_0$. The offset distance $\delta_L$ may be specified as a motor movement parameter, such as a number of motor steps, in which case the motor steps may be used to determine when the linear solidification device has arrived at the left-hand boundary 343.

In step 1050, motor 118 (FIGS. 1A and 1C) is activated to begin the rotation of rotating energy deflector 92. The layer index (z) is then set to zero to indicate that the object building process is about to begin.

In step 1054 linear scan data for the layer corresponding to the current value of the layer index (z) is loaded into the microcontroller unit that is used operate the motor 118 and motor 76 and which is also used to change the energization state of solidification energy source 90. The linear solidification device 88 is moved through the offset distance δ (which will be $\delta_L$ or $\delta_R$ depending on the direction of travel axis (x-axis) movement) to reach the boundary 343 or 345 of the build envelope. During the movement of linear solidification device 88 through the offset distance δ, the speed of linear solidification device 88 will preferably reach a substantially constant value. In certain implementations, the linear scan data is corrected to account for variations in the scanning speed along the scanning axis, for example, by using equations 10-12 discussed above. In the same or other implementations, the linear scan data is corrected for a non-orthogonal angle between a travel axis and a scanning axis of linear scanning device 88 and/or to correct for solidification power variations along the scanning axis.

In step 1058, the value of the computer memory index m is set to zero. As explained previously, the computer memory index m is an index used to store those sets of string data that have object solidification data in them. In step 1060, the string index n is also set to zero.

In step 1061, the microcontroller reads the set of string data stored at the current value of the computer memory index m. The set of string data preferably includes a string index (n) value (see FIGS. 11D, F, and G), and in step 1062 the string index value provided in the set of string data for the current value of m is compared to the current value of n. When the values are the same, it indicates that the solidification will occur at the travel axis (x-axis) position corresponding to the current string index value (n). When the values are not the same, it indicates that no solidification will occur at the travel axis (x-axis) position corresponding to the current string index value (n) so that no data need be read for that string.

When n=m in step 1062, control proceeds to step 1064. In step 1064 a scanning axis synchronization operation is performed prior to the beginning of a line scanning operation. In one example, the solidification energy source 90 is briefly pulsed to cause sensor 324 (FIG. 1C) to generate a synchronization solidification energy sensor signal, which indicates that the rotational position of rotating energy deflector 92 corresponds to the scanning-axis boundary of the build envelope. A timer (such as one programmed in software) is then initialized (e.g., reset to zero) and started (step 1066). The microcontroller unit compares the timer value to the time values stored in the current set of string data (defined by the current value of the computer memory index m) to determine when to change the energization state of the solidification energy source 90 (step 1068). As discussed previously, in the example of FIG. 15 solidification energy source 90 is pulsed at a fixed lag time ($\Delta_1$) relative to the motor 118 pulses used to drive rotating energy deflect 92 in order to perform synchronization. This synchronization pulse may occur at every string index (n) location regardless of whether it is a location at which solidification will occur. Alternatively, it may be performed only for those locations at which solidification will occur. As also described previously, solidification energy source 90 may be pulsed at a fixed time relative to a CPU clock cycle instead of pulsing relative to the motor 118 pulses to perform synchronization. In one example, a dynamic calibration process of the type described previously is used in which the fixed time is determined by dynamically adjusting the synchronizing energy pulse timing relative to the CPU clock until sensor 324 indicates that the energy pulse has been received. In such cases, a lag time $\Delta_1$ relative to the motor 118 pulses may be used as a starting point for the dynamic adjustment process.

The synchronization of the timer to a rotational position of rotating energy deflector 92 was described previously with reference to FIG. 15. Once the timer has been initialized, the solidification energy source 90 is shut off until the current string of object data indicates that it should be toggled on. Due to system delay, such as that involved in receiving and processing synchronization sensor 324 signals and generating solidification energy source output signals, there may be a delay between the microcontroller's receipt of a rising edge 1104a of a synchronization sensor 324 signal and shutting off the solidification energy source 90.

Sensor 324 (FIG. 1C) has a sensing length that may be traversed if the solidification energy source is left on during the period in which it is in optical communication with mirror 332. As a beam of solidification energy traverses the mirror 332 from top to bottom, it will traverse the sensor 324 from bottom to top. However once solidification energy reaches the bottom of mirror 332, it will begin making contact with the solidifiable material and solidifying it. Preferably, the solidification energy source 90 is deactivated before it would otherwise leave the sensing area of sensor 324 or the area of mirror 332 during a synchronization operation. Otherwise, solidification energy would make contact with and solidify solidifiable resin before indicated by the string data. In certain examples, the delay between the receipt of the rising edge of the solidification sensor 324 input signal and the deactivation of the solidification energy source 90 occurs within a lag time $\Delta_2$ that is no more than about 400 nanoseconds, preferably no more than about 300 nanoseconds, more preferably no more than about 250 nanoseconds, and still more preferably no more than about 200 nanoseconds.

In preferred examples, the lag time $\Delta_2$ is less than the time required for solidification energy to traverse the entire sensing length of sensor 324. The time required for solidification energy to traverse the entire length of sensor 324 may be calculated as follows:

$$\text{time}=(60 \text{ sec/min})(L_s/(L_{BE} \times RPM \times F)) \quad (18)$$

wherein, $L_s$=linear distance of the sensor's sensing area;
$L_{BE}$=length of the build envelope in the scanning axis direction (i.e., the linear length of a full scan);
RPM=rotational speed of rotating energy deflector 92 (revolutions/minute); and
F=number of facets on rotating energy deflector 92.

Referring again to FIG. 13, when the line scanning operation is complete, the current value of the computer memory index m is compared to the maximum index value ($M_{max}-1$) for the current layer (step 1070). If m is less than $M_{max}-1$, the layer is not complete. In that case, control proceeds to step 1072 and the value of the computer memory index m is incremented by one. The set of string data for the new value of m is read in step 1076. In step 1078, the value of the string index n is incremented by one and the rotating energy deflector 92 rotates to the next facet 94(a)-(f). Control then returns to step 1062.

During step 1062 if the string index value n that is stored in the set of string data for the current value of m is not equal to the current value of the string index value n, then no solidification will occur at the travel axis (x-axis) position corresponding to the current value of the string index n. In that case, control transfers to step 1074 (FIG. 4) to determine if the last string $N_{max}-1$ has been reached. If it has been reached, control transfers to step 1080 (FIG. 14). Otherwise, control transfers to step 1078 at which the value of the string index n is again incremented by one. In step 1070 if the current value of the memory index m has reached the layer's maximum value $M_{max}-1$, no further solidification will occur in the current layer and control proceeds to step 1074.

As mentioned previously, in certain examples a microcontroller is used to control the operation of solidification energy source 90 based on object shape data and also may regulate movement of the build platform (not shown). Many commercially available microcontrollers use what are known as "interrupts" to perform tasks such as USB communications, memory refreshing, and reading peripheral devices. During an interrupt, the currently executed task is stopped so that one of these other tasks may be performed. However, in those examples that use string data comprising time values to represent a three-dimensional object, an interrupt will disturb the synchronization of the CPU timer with the position of the rotating energy deflector (or the tilt angle of a laser scanning micromirror) and potentially distort the three-dimensional object. In such examples, it is preferable to cancel software and/or hardware interrupts during a line scanning operation. In one example, a program is stored in the microcontroller which causes the interrupts to be disabled when the method of FIGS. 13-14 is between steps 1062 and 1082. The interrupts may then be enabled when the method reaches step 1084.

In step 1074 (FIG. 14), when the string index value n reaches the maximum string index value $N_{max}-1$, processing of the current layer is complete. Control then proceeds to step 1080 to move linear solidification device 88 through the offset distance δ. If the linear solidification device 88 processed the current layer by moving from left to right (when the build envelope 342 is viewed from above), the offset distance δ in step 1080 will be $\delta_R$. Otherwise, it will be $\delta_L$.

In step 1082 the current value of the layer index (Z) is compared to the maximum layer index value ($Z_{max}$−1). If the last layer has been completed, the build terminates. Otherwise, the layer index is incremented by one (step 1084). In step 1086, a fresh amount of unsolidified solidifiable material is provided between the previously solidified layer and the rigid or semi-rigid solidification substrate 68. In downward building systems, such as the one depicted in FIG. 2, this could be done, for example, by moving the build platform (not shown) downward into a supply of solidifiable material, which would produce a gap between the last solidified layer and the substrate 68 into which fresh unsolidified material can flow. In the case of upward building systems, the build platform (not shown) may be moved upward and fresh unsolidified solidifiable material may be added to a basin placed below the build platform.

In step 1088, linear scan data (i.e., sets of data strings) corresponding to the new layer index value z is loaded into the microcontroller unit. In step 1090, the direction of travel of the linear solidification device 88 along the travel axis (x-axis) direction is reversed. The linear solidification device is moved through the applicable offset distance $\delta_L$ or $\delta_R$ until the applicable build envelope boundary 343 or 345 is reached. Control then returns to step 1058 in FIG. 13 to begin the process of solidifying the new layer.

The process of solidifying solidifiable material with linear solidification device 88 may occur in discrete steps with the formation of discrete object layers or without the use of a layered formation process. In particular, a continuous build process may be used in which build platform 43 moves during the entire build process. Even with continuous build processes, due to possible electromagnetic radiation interruptions, some slight interface layer formation could still occur. Nevertheless, such interface formation can be minimized or even totally eliminated.

The method of FIGS. 13 and 14 may be modified to include the techniques for modifying object data to compensate for variations in scanning speed along a scanning axis, and/or to compensate for a non-orthogonal angle α between a scanning axis and a travel axis using any of the techniques described previously. For example, following step 1044 in FIG. 13, the method of FIG. 25 may be used to shear the object data, thereby yielding sheared object layer data sets which may then be converted into sets of data strings in step 1046. Alternatively, the method of FIG. 26 may be used to convert the object layer data sets obtained in step 1044 of FIG. 13 to sets of data strings by subdividing the object layer data sets into linear strips, each of which has a length direction oriented at the non-orthogonal angle α relative to the travel axis (x-axis).

As mentioned previously with respect to FIG. 29, in certain implementations, the solidification power provided by the linear solidification devices described herein may vary with scanning axis position and/or over time. In such cases, it may be desirable to provide an apparatus and method for making a three-dimensional object that regulates the solidification power received by the solidifiable material.

In one example, a method is provided which comprises moving a solidification energy source 90 (see e.g., FIG. 2) along a first travel (x) axis direction and progressively projecting solidification energy from the solidification energy source 90 onto selected portions of the solidifiable material along a second scanning (y) axis direction as the solidification energy source 90 moves along the first travel axis direction. The solidification power received by the selected portions of the solidifiable material is substantially constant along the second scanning (y) axis direction. In certain preferred examples, the depth of solidification at the selected portions of the solidifiable material is also substantially constant along the second scanning axis direction. In some implementations, the power provided to the solidification energy source 90 is adjusted or modulated to maintain a substantially constant solidification power received by the solidifiable material along the scanning(y) axis.

In accordance with one method, the power supplied to the solidification energy source 90 is modulated by providing a selectively switchable, variable amplitude analog voltage signal to a solidification energy source modulator that is operatively connected to the solidification energy source. The signal is selectively switchable in that it can be selectively placed in electrical communication with the solidification energy source 90. In certain examples, the amplitude of the analog voltage signal is varied based on power compensation data that is indexed to a variable that uniquely corresponds to a particular location along the scanning (y) axis. One such variable is the scanning axis position itself. Another such variable is an elapsed scan time relative to the commencement of scanning at a build envelope border along the scanning axis (e.g., border 344 in FIG. 11B). In certain implementations, a sensor is used to determine if the solidification power provided by the solidification energy source 90 has deteriorated over time, and the power compensation data values are adjusted based on the measured deterioration in order to achieve a desired solidification power received by the solidifiable material. The power compensation data values may be determined by varying the power supplied to the solidification energy source 90 as it supplies solidification energy to each scanning axis location in order to obtain a uniform solidification power received by the solidifiable material at each location. In certain cases, the power compensation data values are variables that directly relate to power, such as voltage or current.

Figure 30:
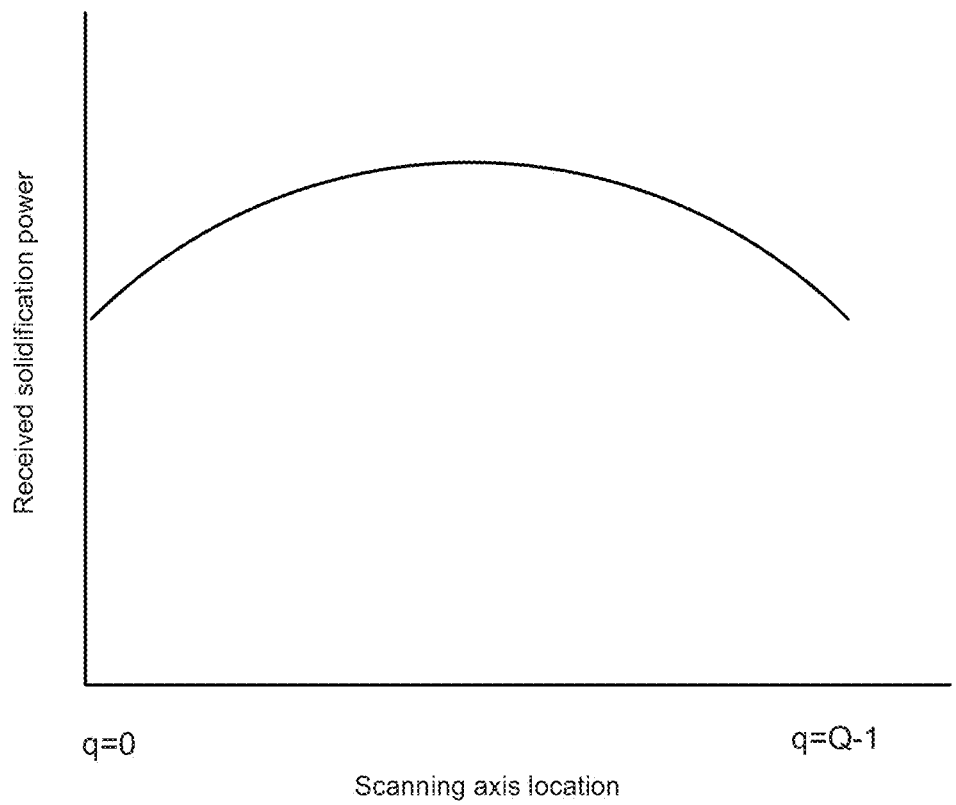
FIG. 30 is a graph depicting the relationship between the solidification power received by a solidifiable material and the location of the solidifiable material along the scanning axis to which solidification energy is projected from a linear solidification device.

Referring to FIG. 30, a graph is provided that depicts the solidification power received by a solidifiable material along a scanning axis direction in accordance with certain examples when the input power to a laser diode solidification energy source 90 is held constant. The left hand side of the horizontal axis is the starting position of a scan line at the scanning axis border 344 (FIG. 11B). The right hand side of the horizontal axis is the ending position of the scan line in the build envelope. The scanning axis may be subdivided into Q locations, with each location having a length and being assigned a location index q ranging in value from 0 to Q−1.

As FIG. 30 indicates, in certain examples, the solidification power received by the solidifiable material follows a generally downward-opening parabolic shape with a maximum in the middle region of a scan line and minimum values at the ends of a scan line. As illustrated most clearly in FIG. 1C, as the solidification energy strikes rotating energy deflector 92 along a particular facet, such as facet 94e, the angle of incidence between the solidification energy and the facet 94e varies as does the angle of incidence between the solidification energy and the solidifiable material (not shown in the figure, but lying underneath F-theta lens 330). When the angle of incidence is about 90 degrees with respect to the solidifiable material, the travel distance of the solidification energy is at a minimum relative to other angles of incidence, and the solidification power received by the solidifiable material is at a maximum.

In certain examples, an apparatus is provided which comprises a linear solidification device that includes a solidification energy source in optical communication with a scanning device. The linear solidification device projects solidification energy to selected portions of a solidifiable material along a scanning axis, and the solidification power received at the selected locations is substantially constant. In certain implementations, at least one controller is provided which controls the solidification power provided to the solidification energy source based on solidification energy source event data (e.g., data indicating whether to activate or deactivate the solidification energy source) and power compensation data. Each item of solidification energy source event data and each item of power compensation data corresponds to a location along the scanning axis. In referring to the "scanning axis" and "y-axis" it should be understood that in certain implementations, the scanning axis and the y-axis are the same and are each orthogonal to the travel (x) axis. In other implementations, the scanning axis may be oriented at a non-orthogonal angle relative to the travel axis. If the scanning axis and y-axis are different, the solidification energy source event data and power compensation data are preferably indexed or corresponded to the same axis. The position along the scanning axis may itself be used to index the solidification energy source event data and power compensation data. However, in certain examples, an elapsed time following the receipt of a sensor synchronization signal is used as an indexing variable.

In additional examples, the solidification energy source is operatively connected to a solidification energy source modulator. A switch is connected to the solidification energy source modulator and receives an analog input signal based on the power compensation data as well as a digital input based on the solidification energy source event data. The switch selectively provides a variable amplitude, analog output signal to the solidification energy modulator as dictated by the digital input signal, which determines whether the switch is open or closed. The at least one controller generates the digital output signal based on object data. The power compensation data values may be provided in a power compensation database that is operatively connected to the at least one controller.

Figure 31:
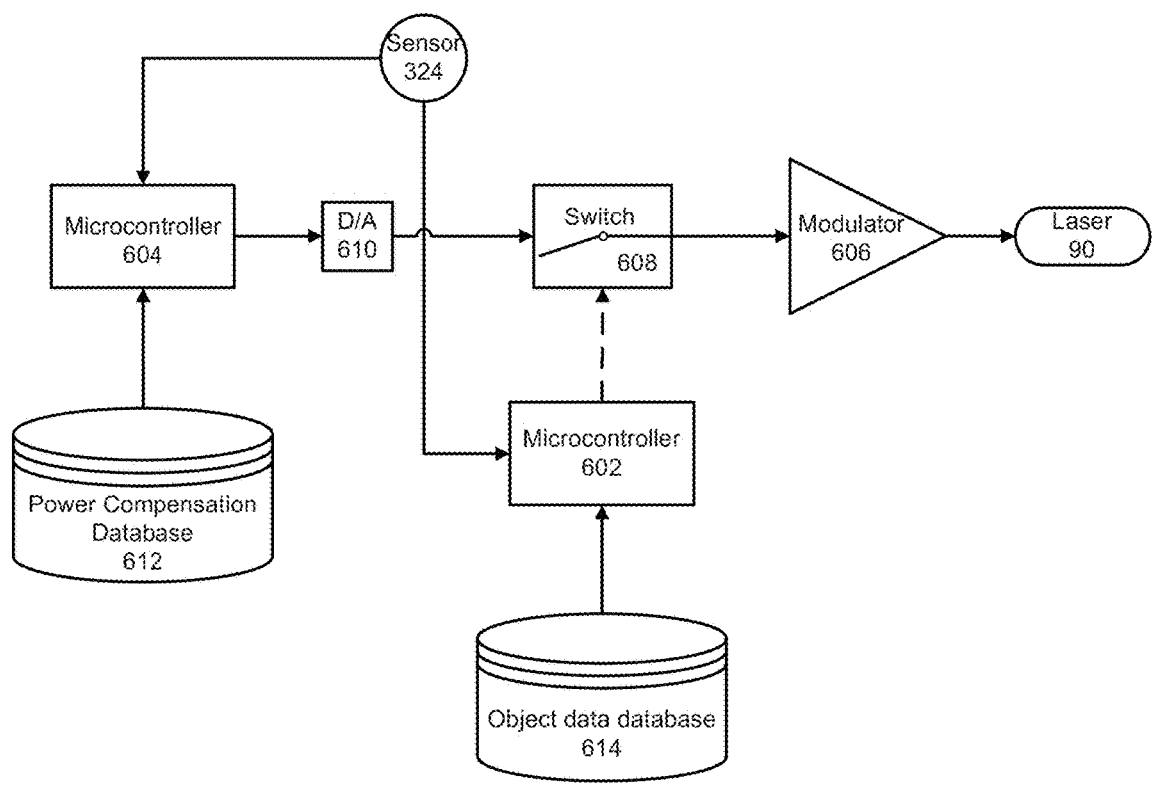
FIG. 31 is a schematic depicting a system for controlling the solidification power received by solidifiable material along a scanning axis direction.

FIG. 31 depicts an exemplary system that may form part of an apparatus for making a three-dimensional object in accordance with the foregoing. The system provides power to a source of solidification energy, wherein the power is compensated to account for positional variations in received solidification power along the scanning (y) axis.

The system of FIG. 31 includes a solidification energy source modulator 606 which receives a variable input signal and generates a variable input power to the solidification energy source 90, which is a laser diode in the illustrated example. Suitable exemplary modulators 606 include fast diode current modulators, such as the FM modulators supplied by MPC (Messtec Power Converter GmbH). The system further includes at least one microcontroller, which in the disclosed example comprises two microcontrollers. First microcontroller 602 is similar to the microcontroller described previously for selectively activating solidification energy source 90 based on object data. Microcontroller 602 is operatively connected to an object database 614 that includes data representative of the three-dimensional object. In certain examples, a program executed by microcontroller 602 converts the object data in database 614 to sets of data strings for each layer of the object being built, such as the data strings illustrated in FIGS. 11D, F, and G. In other examples, the data in object data database 614 comprises the sets of data strings, and an earlier process is used to create them from object data such as CAD/CAM data or the other types of three-dimensional object data described previously. Microcontroller 602 provides a digital output signal to analog switch 608. The digital output signal is indicative of a solidification energy source energization state change event, i.e., either activating or deactivating the solidification energy source 90.

Power compensation database 612 includes data that is used to adjust the power supplied to solidification energy source 90 (depicted as a laser in FIG. 31). The power compensation data values are values that correspond to positions along the scanning axis and which may be used to variably adjust the input power to the solidification energy source 90 to compensate for variations in the solidification power received by the solidifiable material. In certain examples, the power compensation data comprises power compensated electrical current values. In other examples, the power compensation data comprises power compensated voltage values.

The power compensation data may be indexed in a variety of ways. In certain examples, each power compensation data value is associated with a scanning axis position (e.g., in mm relative to the scanning axis border 344 of FIG. 11B). In other examples, each power compensation data value is associated with a time value indicative of an elapsed scan time relative to the time at which scanning begins at the scanning axis border 344.

Based on the power compensation data from power compensation database 612, microcontroller 604 generates a digital output signal that is converted into an analog output signal by digital to analog ("D/A") converter 610. Such converters are well known in the art. The analog signal is transmitted to switch 608 along with the digital signal provided by microcontroller 602. The analog signal provided by digital to analog converter 610 is continuously generated based on the current value of indexing data (e.g., time or scanning axis position) with which the power compensation data is associated in power compensation database 612. However, solidification occurs only at those scanning axis locations where the object data in object data database 614 indicates that solidification is to occur. Switch 608 is configured to transmit the analog signal from the digital-to-analog converter 610 to a solidification energy source modulator 606 only when the digital input signal from microcontroller 602 indicates that solidification is to occur. Thus, switch 608 is an analog switch, the state of which (OPEN or CLOSED) is dictated by the digital input signal provided by microcontroller 602. When switch 608 is closed, the digital to analog converter 610 is in electrical communication with solidification energy source modulator 606 so that the solidification power provided by solidification energy source 90 may be varied based on the power compensation data in power compensation database 612. The solidification energy source 90 only receives sufficient input power to solidify the solidifiable material when the object data calls for solidification. However, the amount of input power provided to solidification energy source 90 is dictated by the power compensation data values in the power compensation database 612.

In certain exemplary implementations, switch 608 provides a selectively switchable, variable amplitude, analog voltage signal. Suitable examples of analog switch 608 include single pole, single throw switches with an analog input, analog output, and an enable input. One such commercially available switch is the NX3L2G66 switch supplied by NXP Semiconductors of Eindhoven, the Netherlands.

One important aspect of operating the system of FIG. 31 is ensuring that at any given time the digital output signal from microcontroller 602 corresponds to the same location along the scanning axis as the analog signal provided by digital to analog converter 610. The digital signal provided by microcontroller 602 at a given time corresponds to a particular scanning axis location as dictated by the corresponding object data string determined from object strip data (see FIGS. 11C-D and related discussion). Thus, it is desirable to ensure that the analog signal provided by digital to analog converter 610 is based on power compensation data that also corresponds to the same scanning axis location. In addition, the power compensation data and solidification source event data are preferably indexed based on the same axis (y axis or scanning axis if they are not the same) or based on elapsed scanning time values that are based on scanning along the same axis.

In one example, each of microcontroller 602 and 604 receives a common synchronizing signal used to generate their respective output signals. The microcontrollers 602 and 604 preferably have CPU clocks that generate clock signals at substantially the same frequency to maintain synchronization between their respective controller outputs. In one example, microcontrollers 602 and 604 have CPUs with the same CPU clock speed (e.g., 66 MHz) in which case each CPU tick for each of the controllers represents a substantially equal unit of time (e.g., 1 millisecond). By synchronizing timers in microcontroller 602 and 604 to a common synchronization signal, the object data strings and power compensation data values may be indexed based on CPU clock values relative to the receipt of the common synchronizing signal.

In certain examples, the common synchronizing signal used to generate the output signals from microcontrollers 602 and 604 is generated when the scanning position of linear solidification device 88 is at scanning axis border 344 (FIG. 11C). In one implementation, each microcontroller 602 and 604 is operatively connected to solidification energy sensor 324 (FIG. 31). When controllers 602 and 604 receive a signal from sensor 324 indicating that solidification energy has been received, internal timers in microcontrollers 602 and 604 are initialized so that the elapsed time of scanning relative to the scanning axis border 344 may be determined. For rotating energy deflectors such as the deflector 92 shown in FIG. 1D, the synchronization signal is generated when the rotational position of the particular facet 94a-94e that is in optical communication with solidification energy source 90 is such that the solidification energy will impinge on reflector 332, which occurs immediately before scanning can begin at the scanning axis border 344 of the build envelope 342 (FIG. 11B).

Power compensation data provided in power compensation database 612 is preferably based on a substantially uniform received solidification power at the surface of the solidifiable material and is preferably indexed by a variable that directly or indirectly corresponds to a unique scanning (y) axis location. Referring to FIG. 32A, an exemplary set of power compensation data is provided. The power compensation data comprises a set of power compensated voltage data. The column on the left indicates a scanning axis location index (q) that corresponds to a location along the scanning (y) axis. As the data indicates, the scanning axis index q also corresponds to the row number of each power compensation data item. As a result, the power compensation data values may simply be stored as a vector of data, wherein the row number of each data item dictates its scanning axis location index. In the example of FIG. 32A, the scanning axis is subdivided into 10 locations, each of which is associated with a scanning axis location index value q ranging from 0 to 9. FIG. 32B depicts another table that relates the scanning axis location index q to a pair of starting and ending scan times. In the example, each scan line is completed in 1 millisecond, and microcontroller 604 has a CPU clock speed of 66 MHz. As a result, a single scan line is completed in 66,000 CPU ticks. Assuming that the scanning axis locations are equal in length, each scanning axis location may be scanned in about 6600 Hz. The table of FIG. 32B allows each power compensation data value in FIG. 32A to be related to a particular scanning time period following the receipt of a synchronization signal from sensor 324. Thus, when the CPU clock is at 20,000 ticks (location index q=3), the voltage generated by the microcontroller 604 and digital to analog converter 610 will be 455 mV. As indicated by the sequence of values in FIG. 32A, higher voltages are generated at the beginning and end of a scan line to compensate for the relatively lower received solidification power at those locations as compared to the middle of a scan line (FIG. 30). The particular configuration and arrangement of data tables in power compensation database 612 is not important. The table configuration of FIGS. 32A and 32B is merely exemplary and is one way of indexing power compensation data values to a variable that corresponds to scanning axis positions. In another example, a single table with the $t_{start}$ and $t_{end}$ values of FIG. 32B and the voltage values of FIG. 32A could also be used.

Figure 33:
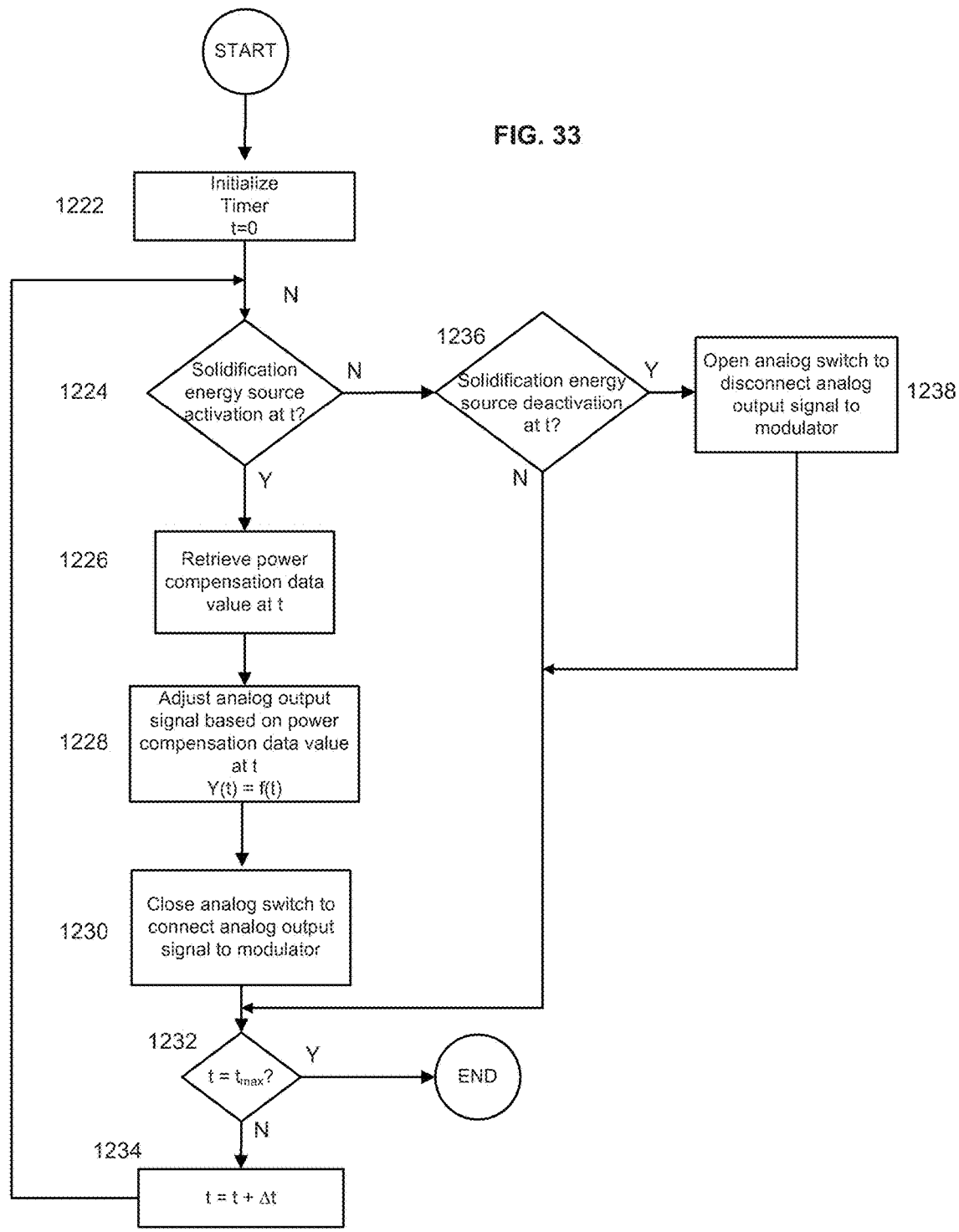
FIG. 33 is a flow chart depicting a method of making a three-dimensional object by progressively solidifying selected portions of a solidifiable material along a scanning axis, wherein the solidification power received by the selected portions remains substantially constant along the scanning axis.

Referring to FIG. 33, a method of making a three-dimensional object that provides a substantially constant received solidification power along a scanning axis will now be described. FIG. 33 depicts a method of performing a single scan along the scanning axis. In one example, the method could be used as step 1068 in FIG. 13 for each such scan in a full object build process.

In accordance with the method, a timer is initialized in step 1222 based on the receipt of a synchronizing signal. The initialization of the timer preferably corresponds to a rotational position of one of the facets 94a-94f of rotating energy deflector 92 that would transmit solidification energy to the scanning axis border 344 (FIG. 11B) if solidification energy source 90 were activated. In the case of linear solidification device 88 of FIG. 1C, receipt of a signal from sensor 324 may trigger the initialization of the timer. If the system of FIG. 31 is used, two timers (one for each of microcontroller 602 and 604) may be initialized in step 1222. In that case, one timer would be used for steps 1224, 1230, 1236, and 1238, and another timer would be used for steps 1226 and 1228. If two timers are used, they preferably are based on clocks with substantially the same clock frequency.

In step 1224 the current data string (e.g., any of the rows in FIG. 11D) is evaluated to see if it shows a solidification energy source activation event at the current value of the timer. For example, in the first row of FIG. 11D, activation of the solidification energy source 90 occurs at 22000 CPU ticks following the receipt of a signal from sensor 324. If activation is indicated, in step 1226 power compensation data is retrieved for the current time value as indicated by the relevant timer. Thus, in the example of FIGS. 32A and 32B, a timer value of 22000 CPU ticks corresponds to a scanning axis location index of 3 (FIG. 32B), which in turn corresponds to a voltage of 455 mV. In step 1228, an analog output signal is adjusted based on the power compensation data value. The signal Y if a function of elapsed scan time (t). In the example of FIG. 31, microcontroller 604 would generate a digital output signal of 455 mV which would then be converted to an analog signal by digital to analog converter 610.

In step 1230 an analog switch (e.g., switch 608) is closed to connect the analog output signal for digital to analog converter 610 to the solidification energy source modulator 606. In certain examples, the analog switch 608 is closed based on data in an object data string that indicates the activation of solidification energy source 90. For example, microcontroller 602 in the system of FIG. 31 would receive the first data string in FIG. 11D from object data database 614. The data string indicates that at a timer reading of 22000 CPU ticks, a solidification energy source activation event is to occur. In response to this data, microcontroller 602 would generate a digital output signal that would close analog switch 608 and place digital to analog converter 610 in electrical communication with modulator 606. As a result, modulator 606 would supply 455 mV to solidification energy source 90.

Referring again to FIG. 33, if no solidification energy source activation event is indicated for the current time in step 1224, control transfers to step 1236 where it is determined whether a solidification energy source deactivation event is to occur. For example, referring to the first row in FIG. 11D, a solidification energy source deactivation event occurs at 44000 CPU ticks. In that case, the analog switch (e.g., switch 608 in FIG. 31) is opened so that the solidification energy source 90 is deactivated. In the system of FIG. 31, the microcontroller 602 would generate a digital signal at 44000 CPU ticks that would open switch 608, thereby deactivating the solidification energy source 90. Following the opening of the analog switch 608, control is transferred to step 1232 where the timer is incremented by a time unit corresponding to its clock frequency (e.g., one tick or a multiple thereof if CPU ticks are used). Similarly, if no deactivation event is indicated in step 1236 control also transfers to step 1232 to determine if the end of the scan has been reached (i.e., if the current timer value equals the time $t_{max}$ to complete a full scan). If two timers are used (one in each of the two microcontrollers 602 and 604 in FIG. 31), they would both be incremented in step 1232. If the maximum scan time has been reached (as may be indicated by the receipt of another synchronization signal from sensor 324), the method ends for the current scan line (if additional scans are required, the method may then be repeated). Otherwise, control transfers to step 1234 to increment the timer and then to step 1224 to see if at the new time, a solidification energy source activation event is indicated by the current data string.

FIGS. 36A-C further illustrate the operation of the system of FIG. 31. The horizontal axis of each figure represents the scanning time during the scanning of a single line. The left-most point on the horizontal axis indicates a scanning position at the scanning axis border 344 (FIG. 11C). The right-most point on the horizontal axis indicates a scanning position at the opposite scanning axis border. FIG. 36A shows the analog signal generated by digital to analog converter 610. Whereas FIG. 30 shows a downward-opening, generally parabolic curve with a maximum, FIG. 36A shows an upward-opening generally parabolic curve with a minimum. The analog signal of FIG. 36A is intended to have a canceling affect so that as the received power indicated by FIG. 30 increases, the power supplied to solidification energy source 90 decreases (and vice-versa), with the net effect being to provide a substantially constant solidification power received by the solidifiable material along the scanning axis.

As indicated previously, the analog signal provided by digital to analog converter 610 is only supplied to the solidification energy source modulator 606 when the operative object data indicates that solidification is to take place. When solidification is to take place, a digital signal from microcontroller 602 closes analog switch 608. FIG. 36B illustrates an exemplary wave form for the digital signal generated by microcontroller 602. In the illustrated example, three solidification events occur along the scan line of interest.

The net effect of using the switch 608 with the analog signal from digital to analog converter 610 and the digital signal from microcontroller 602 is to provide a wave form as shown in FIG. 36C to the modulator 606. As the figure indicates, during the first solidification energy source 90 activation period, the voltage supplied to modulator 606 progressively decreases. During the second activation period, the voltage supplied to modulator 606 shows a slight increase, and in the final activation period, the voltage supplied to modulator 606 shows a more marked and progressive increase. In preferred examples, the signal of FIG. 36C provides a substantially uniform solidification power to the solidifiable material during all three activation periods, which in turn, provides a substantially constant solidification depth during all three activation periods. As a result, the solidification depth of those select portions of the scan line that are solidified remains substantially constant along the length of the scan line.

Figure 34:
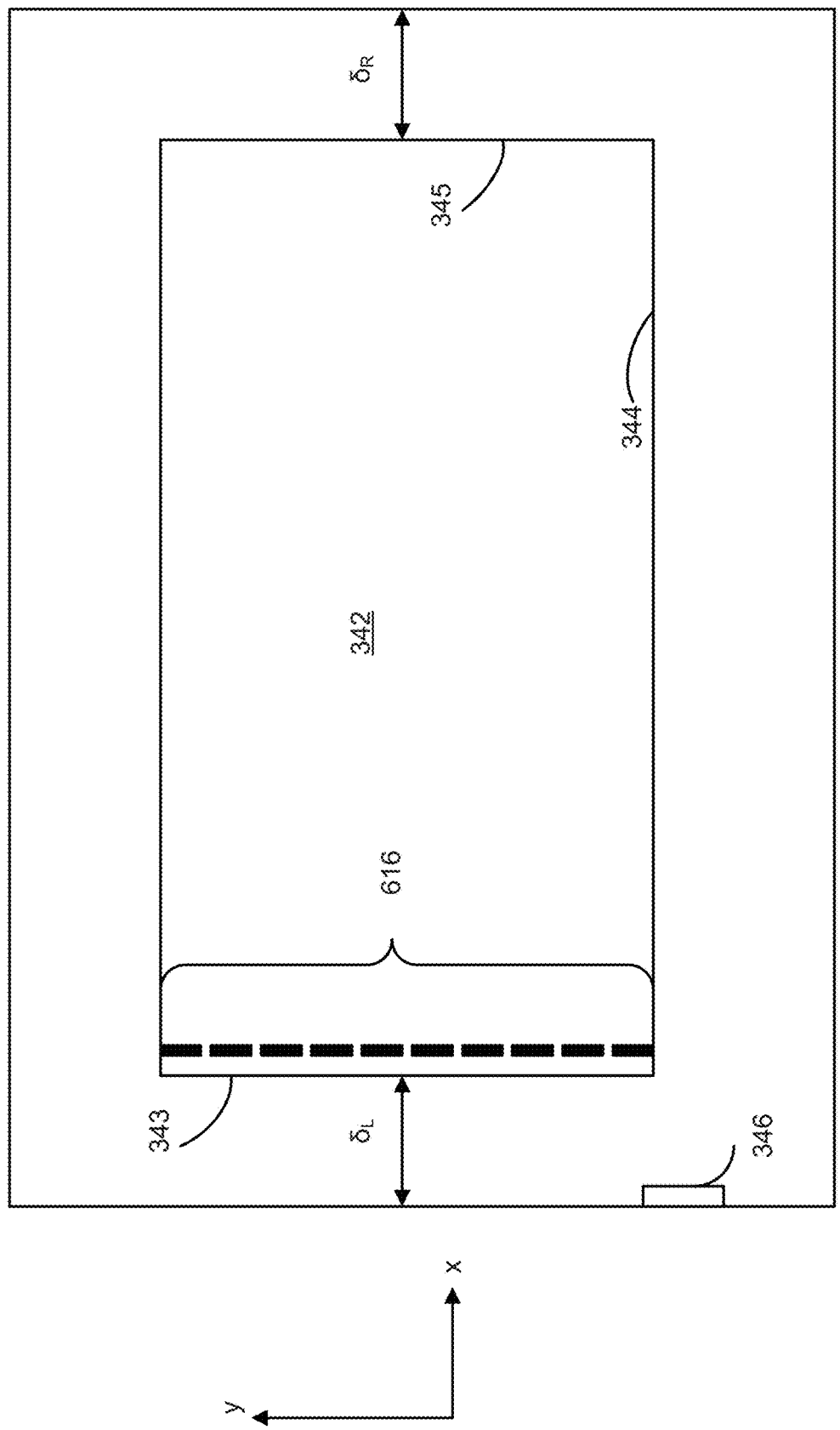
FIG. 34 is a depiction of a build envelope viewed from above depicting regions receiving test solidification power in the form of dashes extending along a scanning axis direction.
Figure 35:
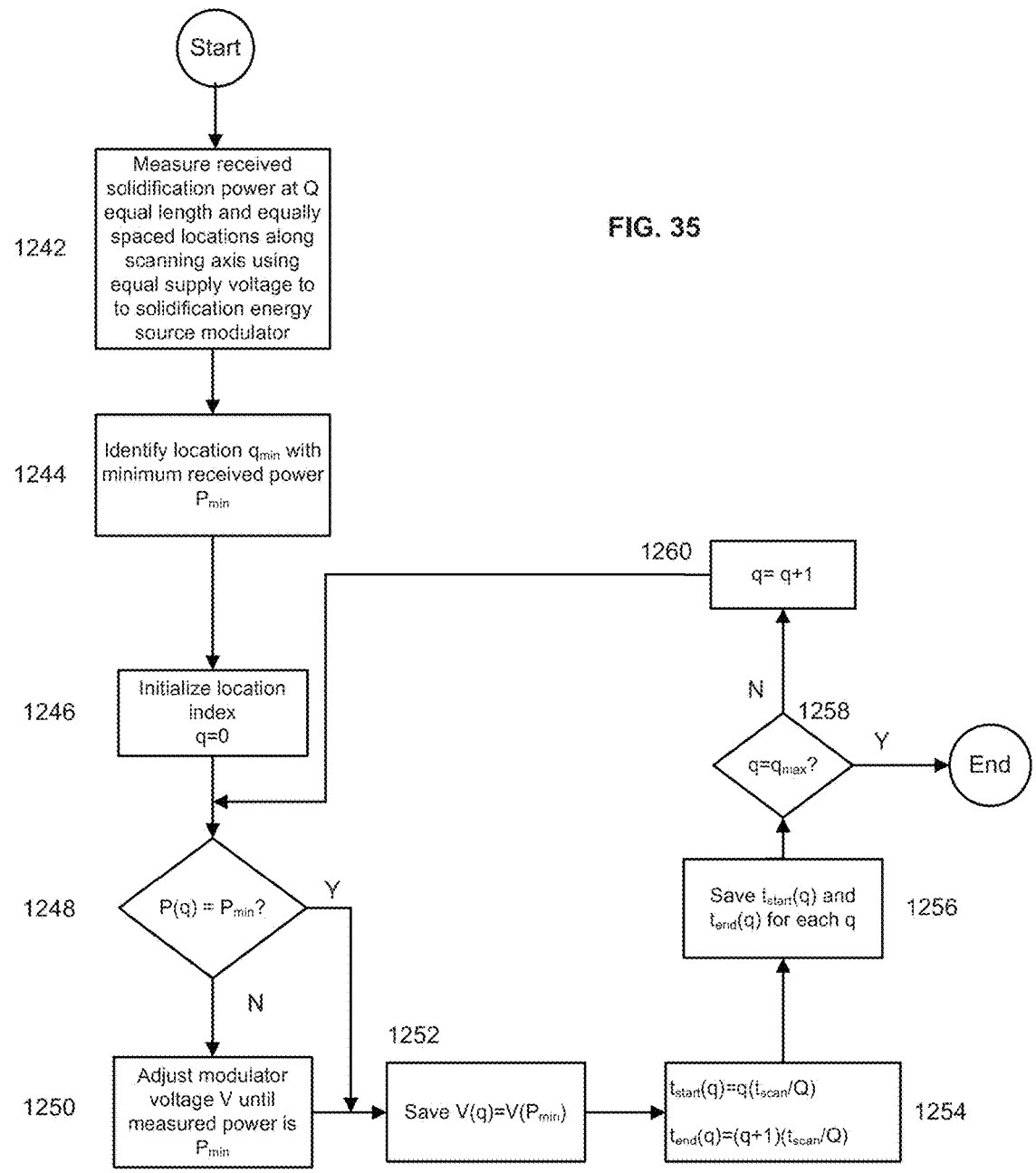
FIG. 35 is a flow chart depicting a method of generating a power compensation database relating power compensated voltage values to indexed scanning axis locations.
Figure 36:
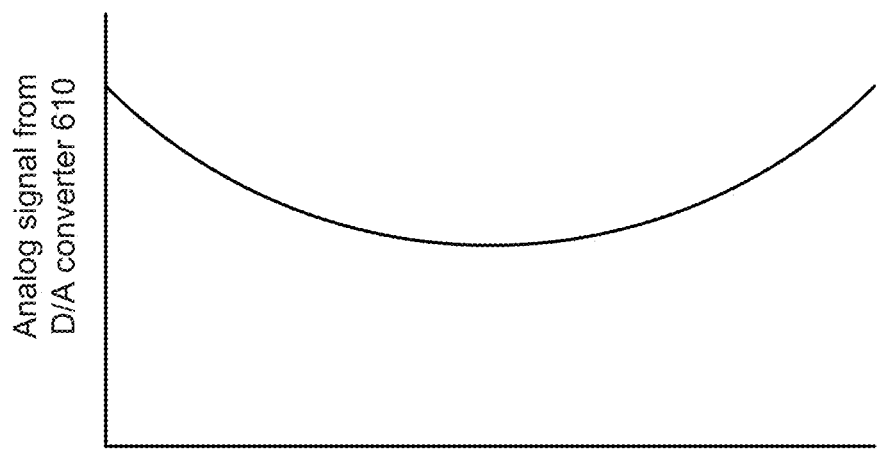
FIG. 36A is a graph depicting a signal generated by the digital to analog converter of FIG. 31 used to illustrate an exemplary method of manufacturing a three-dimensional object wherein the solidification power received by a solidifiable material remains substantially constant along a scanning axis direction.
FIG. 36B is a graph depicting a signal generated by microcontroller 602 of FIG. 31 used to illustrate an exemplary method of manufacturing a three-dimensional object wherein the solidification power received by a solidifiable material remains substantially constant a long a scanning axis direction.
FIG. 36C is a graph depicting a signal generated by switch 608 of FIG. 31 used to illustrate an exemplary method of manufacturing a three-dimensional object wherein the solidification power received by a solidifiable material remains substantially constant a long a scanning axis direction.
Figure 36:
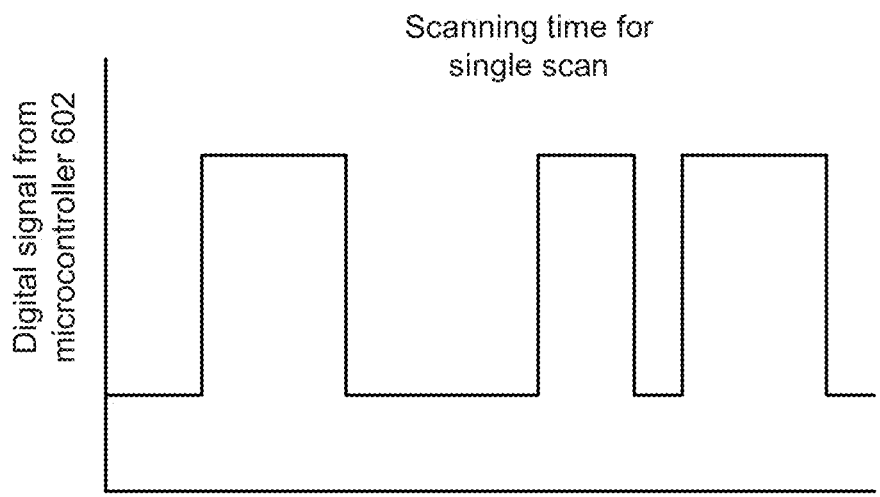
Figure 36:
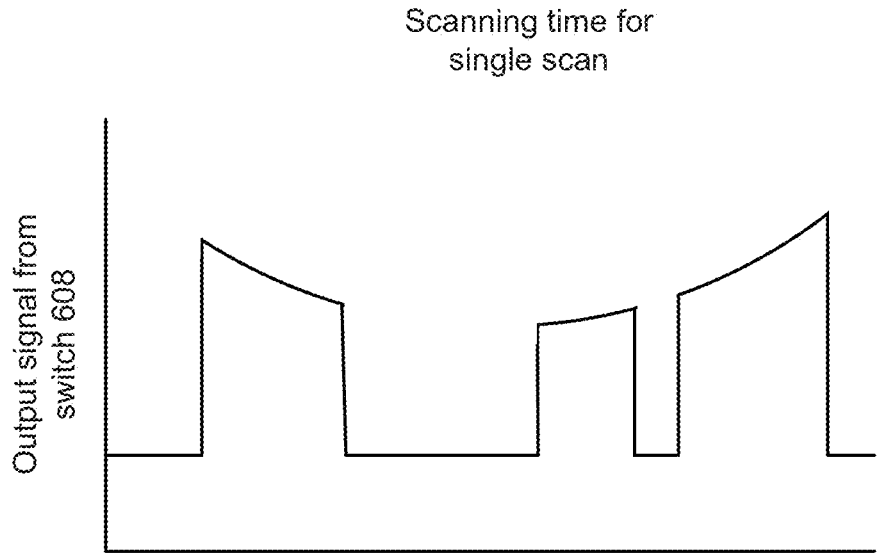

Referring to FIGS. 34 and 35, an exemplary method of generating power compensation data for the power compensation database 612 will now be described. FIG. 34 depicts a top plan view of a source of solidifiable material comprising a build envelope and lateral offset regions as shown previously in FIG. 11B. In step 1242 (FIG. 35) solidification energy is projected by linear solidification device 88 onto a substrate (instead of the solidifiable material) along a plurality of Q strips or dashes 616 (FIG. 34) of equal length which are spaced apart by equal distances. The supply power provided to modulator 606 is held constant during this step by holding the supply voltage at a fixed value $V_{supply}$ and holding the supply current constant. At each location, a measurement of the received solidification power is made using a light meter. One suitable exemplary light meter is a LaserCheck light meter supplied by Coherent, Inc. Each strip 616 may be assigned a location index value, q, with the first strip at the scanning axis border 344 having a location index value of 0 and the last strip at the opposite scanning axis border having a location index value of Q−1.

In step 1244, the scanning axis location index $q_{min}$ having the lowest received power value ($P_{min}$) is identified. In some cases, multiple locations may have the same minimum received solidification power $P_{min}$. In step 1246, the location index q is initialized to begin a process of generating adjusted supply voltages $V_{adjusted}(q)$ for each of the location index q values. In step 1248, it is determined whether the current location defined by the index q is one at which the minimum power $P_{min}$ was observed. If so, control transfers to step 1252 and the supply voltage $V_{supply}$ is stored at a database location (e.g., a table row) corresponding to the index q in power compensation database 612. If the measured solidification power at the current location index value is greater than $P_{min}$, the voltage supplied to modulator 606 is adjusted until the value $P_{min}$ is observed at that location. The adjusted supply voltage $V_{adjusted}(q)$ is then stored at a database location (e.g. a table row) corresponding to the current value of the location index q in the power compensation database 612 in step 1252. This step yields a set of power compensated voltage values that may be stored in tabular form as shown in FIG. 32A. In step 1254, the starting and ending scan times ($t_{start}(a)$ and $t_{end}(q)$) for each location index value q are determined in accordance with the following equations:

$$t_{start} = q(t_{scan}/Q) \qquad (19)$$

$$t_{end} = (q+1)(t_{scan}/Q) \qquad (20)$$

wherein, $t_{scan}$ is the time required to complete a scan along the entire scanning axis (y-axis) length of build envelope 342 (FIG. 34);

q=current location index value;

Q=total number of indexed locations (e.g., strips or dashes in FIG. 34) along the scanning (y) axis;

$t_{start}$=starting time at which scanning reaches the location identified by location index q; and $t_{end}$=end time at which scanning reaches the end of the location identified by location index q.

In step 1256, the values of $t_{start}$ and $t_{end}$ are saved for each location index value q, thereby providing a table such as the exemplary table of FIG. 32B. Steps 1254 and 1256 need not be performed within the sequence of steps of FIG. 35 but could also be separately performed.

In step 1258 the current index value q is compared to the maximum value $q_{max}$ to see if the final scanning axis location has been reached. If it has, the method ends. Otherwise, in step 1260 the location index q is incremented and control transfers to step 1248, repeating the process until power compensation data values (voltages) are obtained for each indexed location along the scanning axis. Thus, in certain examples, the method of FIG. 35 yields the tables of FIGS. 32A and 32B. However, other formats may be used for storing and retrieving power compensation data in power compensation database 612 wherein the power compensation data values are indexed to a variable that uniquely corresponds to a scanning (y) axis location.

It should be noted that the object data used to direct the output of microcontroller 602 may be generated using any of the techniques described previously. In one example, three-dimensional object data is provided and is sliced into a plurality of layer data. Each set of layer data is then mapped onto build envelope 342 and subdivided into object cross-sectional strip data (FIG. 11C) such that each set of layer data comprises a plurality of object cross-sectional data strips arranged along the travel axis (x) direction in which the linear solidification device 88 moves during the process of making a three-dimensional object. Each of these data strips may then be converted into data strings such as those shown in FIGS. 11D, F, and G. In certain examples, the microcontroller 602 may use object data that has been further modified to account for scanning speed variations along the scanning axis direction. For example, the modified object data provided by the methods described previously with respect to FIGS. 17-20 may be used by microcontroller 602 to determine the digital signal (e.g., open or closed) provided to switch 608. Also, the modified object data generated by the travel axis correction methods for correcting for non-orthogonal angles between the travel (x) axis and the scanning (y) axis which were described previously with respect to FIGS. 21A-28 may be used by microcontroller 602 to generate the digital output signal provided to switch 608. In other examples, the object data used by microcontroller 602 may be modified object data generated by using both travel axis correction and scanning axis speed correction.

Certain types of solidification energy sources such as laser diodes are known to progressively lose solidification power over time. Thus, in certain cases, it may be desirable to further adjust the power supplied to the solidification energy source 90 to account for its decreased ability to convert a given supply power to solidification power that can actually be used to solidify a solidifiable material. In one example, solidification energy sensor 324 is configured to provide an analog power measurement instead of simply providing a digital signal indicating that solidification energy has been received. One suitable sensor that can provide such an analog signal is a 404 nm, 500 mW photodiode supplied by Opnext under the part number HL40023MG. The solidification power detected by solidification energy sensor 324 may then be used to adjust the values of the power compensation data in power compensation database 612.

In one example, a power reading obtained from solidification energy sensor 324 following the solidification of each layer of solidifiable material is used to adjust the power compensation data values. The adjustment of the power compensation data values in turn causes the adjustment in the supply power provided to the solidification energy source 90 to compensate for the declining power output of the solidification energy source 90. In one implementation, a target solidification power for solidification energy sensor 324 is stored at the beginning of an object build process, and the power compensation data values are based on and correspond to the target solidification power. After solidifying each layer of solidifiable material, a solidification power measurement is made by sensor 324, and the measured power is compared to the target power. Each power compensation data value is then adjusted according to the relationship between the current power measurement and the target power measurement. In one example, as each layer is completed, the sensor 324 power is compared to its target value and a new set of power compensation data values is calculated by multiplying each power compensation data value in the initial set (that corresponds to the target power) by the ratio of the target power to the measured power). The new set of power compensation data values is then used in the solidification of the next layer.

Several techniques can be used to determine whether a layer has been completed for purposes of adjusting the power compensation data values. For example, end of travel sensors may provide a signal indicating that the linear solidification device 88 has completed the traversal of the build envelope 342 in either or both directions along the travel axis. The receipt of a signal from the end of travel sensor may be used to determine whether to make an adjustment to the power compensation data values based on a reading from the sensor 324. In another example, the current value of a scan index (see Equation 2, above) may be compared to the maximum number of scans $N_{max}$ in the build envelope to determine if a layer has been completed. A motor movement parameter for motor 76 may be used to determine the current value of the scan index as described by equation 2.

In accordance with one example, the data tables of FIGS. 32A and 32B are provided in the power compensation database 612 prior to beginning an object build process. A target solidification power of 400 mW is set based on the desired solidification depth for each layer. Following the solidification of each layer, the power measured by sensor 324 is compared to the target power of 400 mW. In one example, a power of 380 mW is measured. In that case, each voltage value in the table of FIG. 32A would then be multiplied by the ratio of 400 mW/380 mW=1.05 by executing a program resident in microcontroller 604. The new values would then be saved in power compensation database 612 and used in the solidification of the next layer. However, in preferred examples, if the solidification energy source 90 reaches a supply voltage or current limit, the power compensation data values would not be increased. In certain preferred examples, the ratio of target power to sensed power determined following the solidification of each layer is multiplied by the initial voltage values corresponding to the target solidification power of 400 mW to arrive at a new set of voltage values for the next layer. Thus, for each layer, the power compensation data values are scaled to an initial set of power compensation data values that correspond to the initial target solidification power.

As shown in FIG. 1D, solidification energy sensor 324 is contained within the housing 96 of linear solidification device 88. Thus, in certain cases, the power measured by sensor 324 may not be directly indicative of the power received by the solidifiable material, including because in certain implementations the solidification energy passes through F-theta lenses 328 and 330 (FIG. 1D), solidification substrate 68, and/or film 224. In accordance with one method, a power meter is placed below the linear solidification device 88 and a reading is made immediately following the receipt of solidification energy by sensor 324. The ratio (received power factor) of the received power (as measured by the meter) and the sensed power (as measured by sensor 324) is calculated to yield a received sensor solidification power. The received power factor can then be used to determine an actual received power value based on power readings from sensor 324 by dividing the sensor 324 power reading by the power factor. In certain examples, the target power value that is initially set and on which the tables of FIGS. 32A and 32B are based is a received power value indicative of the solidification power received by the solidifiable material. The target received power is divided by the power factor to arrive at a target sensor 324 power to which subsequent sensed power values may be compared. In one example, a target received power of 400 mW is determined based on the desired solidification depth for each layer. If the received power factor is 0.9, the target sensor 324 power would be 400 mW/0.9=444 mW. The target received power of 400 mW and the target sensed power of 444 mW correspond to the initial power compensation data values shown in FIG. 32A. After each layer is solidified, the power measured by sensor 324 is compared to the target sensor 324 power of 444 mW, and the voltage values in the table of FIG. 32A are multiplied by the ratio of the target sensor power of 444 mW to the power sensed by sensor 324 to arrive at a new set of voltage values for the upcoming layer. Thus, if the sensor 324 senses a power of 420 mW following the solidification of a layer, each voltage value in FIG. 32A would be multiplied by the ratio of 444 mW/420 mW. The modified voltage values would then be used to solidify the next layer.

The methods of FIGS. 33 and 35 and the system of FIG. 31 may be used with a variety of different apparatuses that use scanning techniques to make three-dimensional objects. The techniques are independent of the build direction and the processes for supplying solidifiable material and separating solidified material from solidification substrates. For example, the apparatus depicted in FIG. 2 is used in a "right side up" process in which the three-dimensional object is progressively built upwards on the build platform as the platform is progressively immersed downward in a solidifiable material. In such apparatuses, the linear solidification device 88 is positioned above the solidifiable material and projects solidification energy downward. However, in other processes, the object is built "upside down" on the build platform as the platform moves progressively upward away from a tray holding the solidifiable material using an apparatus such as the one depicted in FIG. 20A of U.S. patent application Ser. No. 13/534,638, the relevant portions of which are hereby incorporated by reference. In such an apparatus, the linear solidification device 88 is positioned beneath the solidifiable material and projected solidification energy upward. The utility of the power compensation techniques described herein is also independent of the techniques used to separate solidified material from a solidification substrate or film and may also be used with systems that use doctor blades or vacuum recoaters to provide a level surface for solidification. For example, in the system of FIGS. 2-8 solidifiable material is solidified in contact with a film 224 that is in contact with a substantially transparent and/or translucent solidification substrate 68. Peeling members 204a and 204b are used to separate solidified material from the film 224. In other suitable systems, solidifiable material is solidified in contact with a resilient coating at the bottom of a tray or basin that holds solidifiable material. The techniques may also be used with film transfer imaging systems that use scanning devices to provide solidification energy.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method of making a three-dimensional object from a solidifiable material, comprising:
moving a solidification energy source along a first direction;
progressively projecting solidification energy from the solidification energy source onto selected portions of the solidifiable material along a second direction while the solidification energy source moves along the first direction;
modulating the power provided to the solidification energy source to control the solidification power received by the selected portions of the solidifiable material along the second direction, wherein the step of modulating the power provided to the solidification energy source comprises providing a selectively switchable, variable amplitude analog voltage signal to a solidification energy source modulator, and the power of the solidification energy received by the selected portions of the solidifiable material onto which the solidification energy is projected is substantially constant along the second direction.

2. The method of claim 1, wherein the step of modulating the power provided to the solidification energy source comprises varying the amplitude of the selectively switchable, variable amplitude analog voltage signal based on an elapsed time from the receipt of a sensor synchronization signal.

3. The method of claim 2, further comprising providing a power compensation database comprising a plurality of power compensation data entries, wherein each power compensation data entry corresponds to an elapsed time from the receipt of the sensor synchronization signal and defines the amplitude of the selectively switchable, analog voltage signal at the elapsed time.

4. The method of claim 3, further comprising sensing a solidification power received by a solidification energy sensor and adjusting the plurality of power compensation data entries based on the sensed solidification power.

5. The method of claim 4, wherein the step of moving a solidification energy source along a first direction comprises moving the solidification energy source along the first direction across a build envelope, and the step of adjusting the plurality of power compensation data entries based on the sensed solidification power occurs following each traversal of the solidification energy source across the build envelope.

6. The method of claim 3, further comprising the step of generating the power compensation data entries by projecting test solidification energy onto a surface at a plurality of locations along the second direction while maintaining a substantially constant supply power to the solidification energy source and measuring received test solidification power at the plurality of locations.

7. The method of claim 6, further comprising identifying a location among the plurality of locations having the smallest measured received test solidification power, wherein the step of generating the power compensation data entries further comprises adjusting the supply power to the solidification energy source for the plurality of locations until the received solidification power at each location equals the smallest measured received test solidification power.

8. The method of claim 1, further comprising generating a digital signal based on solidification energy source event data corresponding to the three-dimensional object, wherein the digital signal determines whether the analog voltage signal is in electrical communication with the solidification energy source.

9. The method of claim 1, wherein the step of modulating the power provided to the solidification energy source comprises providing a selectively switchable, analog voltage signal to a solidification energy source modulator, the selectively switchable, analog voltage signal has an amplitude that varies to vary the power provided to the solidification energy source, the selectively switchable analog voltage signal is switched based on a digital signal corresponding to solidification energy source event data, and the selectively switchable analog voltage signal and digital signal are synchronized to a common solidification energy sensor signal.

10. The method of claim 1, wherein the solidification energy source is a selectively activatable laser diode.

11. The method of claim 10, wherein the step of progressively projecting solidification energy from the solidification energy source onto selected portions of the solidifiable material along the second direction while the solidification energy source moves along the first direction comprises selectively activating the selectively activatable laser diode as the selectively activatable laser diode moves along the first direction.

12. The method of claim 11, wherein the step of progressively projecting solidification energy from the solidification energy source onto selected portions of the solidifiable material along the second direction while the solidification energy source moves along the first direction further comprises rotating a polygonal mirror in a plane perpendicular to the first direction while selectively activating the selectively activatable laser diode as the selectively activatable laser diode moves along the first direction.

13. The method of claim 1, wherein the solidifiable material is a photopolymer or cross-linkable material.

14. The method of claim 1, wherein the step of moving the solidification energy source along the first direction comprises moving a linear solidification device along the first direction, wherein the linear solidification device comprises a selectively activatable laser diode in optical communication with a rotating polygonal mirror.

15. The method of claim 14, wherein the selectively activatable laser diode is an ultraviolet laser diode.

16. The method of claim 1, wherein the step of progressively projecting solidification energy from the solidification energy source onto selected portions of the solidifiable material along the second direction while the solidification energy source moves along the first direction further comprises projecting the solidification energy through a transparent and/or translucent solidification substrate.

17. The method of claim 16, wherein the step of progressively projecting solidification energy from the solidification energy source onto selected portions of the solidifiable material along the second direction while the solidification energy source moves along the first direction further comprises projecting the solidification energy through a film in contact with the solidifiable material.

18. The method of claim 1, wherein the step of progressively projecting solidification energy from the solidification energy source onto selected portions of the solidifiable material along the second direction while the solidification energy source moves along the first direction further comprises selectively activating the solidification energy source in accordance with data strings, and each data string comprises a plurality of time values.

* * * * *